United States Patent [19]

Klinner

[11] Patent Number: 4,499,712
[45] Date of Patent: * Feb. 19, 1985

[54] CROP ENGAGING APPARATUS AND METHODS

[75] Inventor: Wilfred E. Klinner, Milton Keynes, England

[73] Assignee: National Research Development Corporation, London, England

[*] Notice: The portion of the term of this patent subsequent to Aug. 16, 2000 has been disclaimed.

[21] Appl. No.: 378,492

[22] Filed: May 14, 1982

Related U.S. Application Data

[63] Continuation-in-part of Ser. No. 173,136, Nov. 30, 1979, Pat. No. 4,398,384.

[30] Foreign Application Priority Data

May 15, 1981 [GB] United Kingdom ............... 8114981

[51] Int. Cl.³ .............................................. A01D 14/02
[52] U.S. Cl. .................................. 56/16.4; 56/DIG. 1; 56/1
[58] Field of Search ................. 56/14.5, DIG. 1, 16.4, 56/16.5, 1, 192, 13.6, 126, 128, 130, 364

[56] References Cited

U.S. PATENT DOCUMENTS

| | | | |
|---|---|---|---|
| 476,234 | 5/1892 | Meyers | 56/130 |
| 1,972,680 | 9/1934 | Cushman | 56/DIG. 1 |
| 3,487,612 | 1/1970 | Keller et al. | 56/DIG. 1 |
| 3,890,770 | 6/1975 | Milliken | 56/DIG. 1 |
| 4,035,992 | 7/1977 | Moosbrucker | 56/DIG. 1 |
| 4,398,384 | 8/1983 | Klinner | 56/14.5 |

FOREIGN PATENT DOCUMENTS

| | | | |
|---|---|---|---|
| 150189 | 5/1953 | Australia | 56/128 |
| 217670 | 8/1958 | Australia | 56/126 |
| 662303 | 12/1951 | United Kingdom | 56/DIG. 1 |

Primary Examiner—Robert P. Swiatek
Assistant Examiner—Kris R. Schulze
Attorney, Agent, or Firm—Cushman, Darby & Cushman

[57] ABSTRACT

Two cooperating rotors are mounted for counter rotation about parallel axes for passage of crop between the rotors. At least one rotor has stiff, resilient, outwardly directed crop engaging elements having sharp tips on the outer ends for treating crop. The rotors rotate with the outer perimeters of the rotors overlapping and with regular inter-meshing of crop engaging elements on one rotor with crop engaging elements on the other rotor. Crop engaging elements of one rotor press crop into gaps between crop engaging elements on the other rotor so that the crop is laid across the sharp tips of the elements to treat the crop by a spiking action. The crop engaging elements may be outwardly extending fins, or transversely extending ribs of discs perpendicular to the axis of rotation. The crop engaging elements may have specified yielding characteristics, being yieldable in a preferred direction and being yieldable predominantly at a region spaced from the outer tip. Each fin may be inclined relative to the direction of crop flow to impart lateral movement to the crop. Transverse ribs may be radially sprung to avoid damage. Outwardly extending fins may have reclined, stepped profiles to improve crop engagement and release.

35 Claims, 82 Drawing Figures

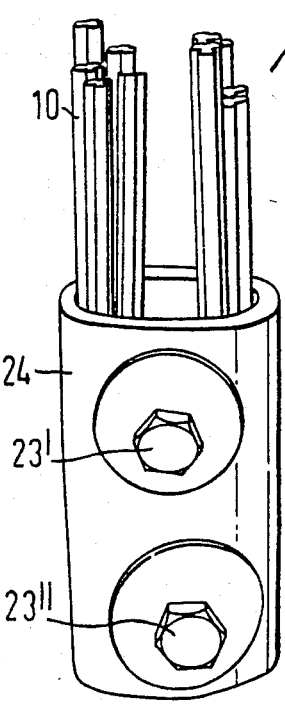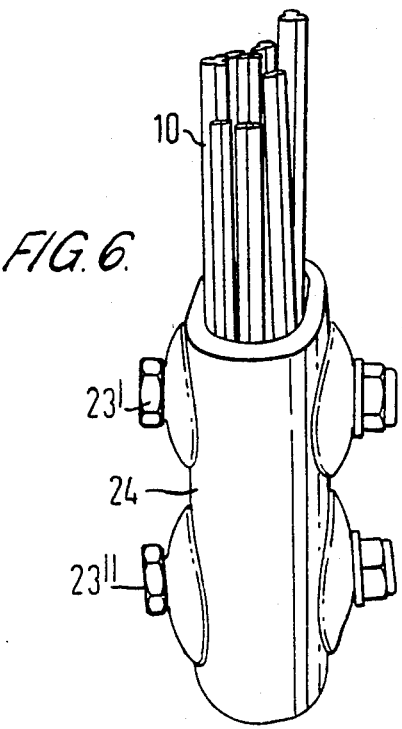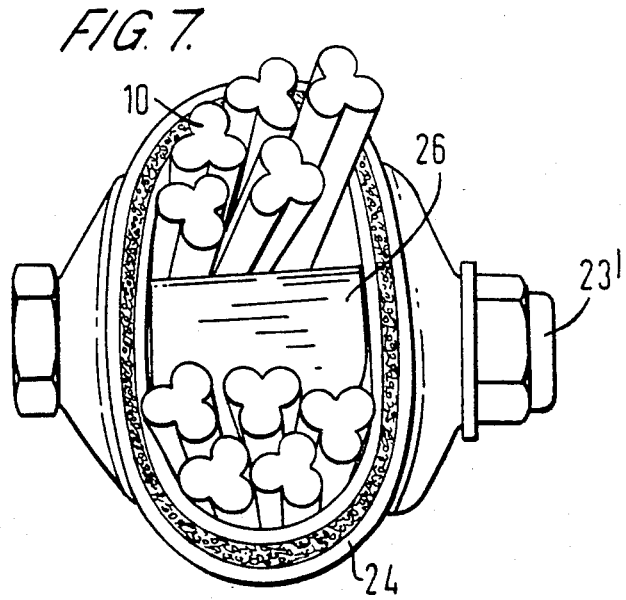

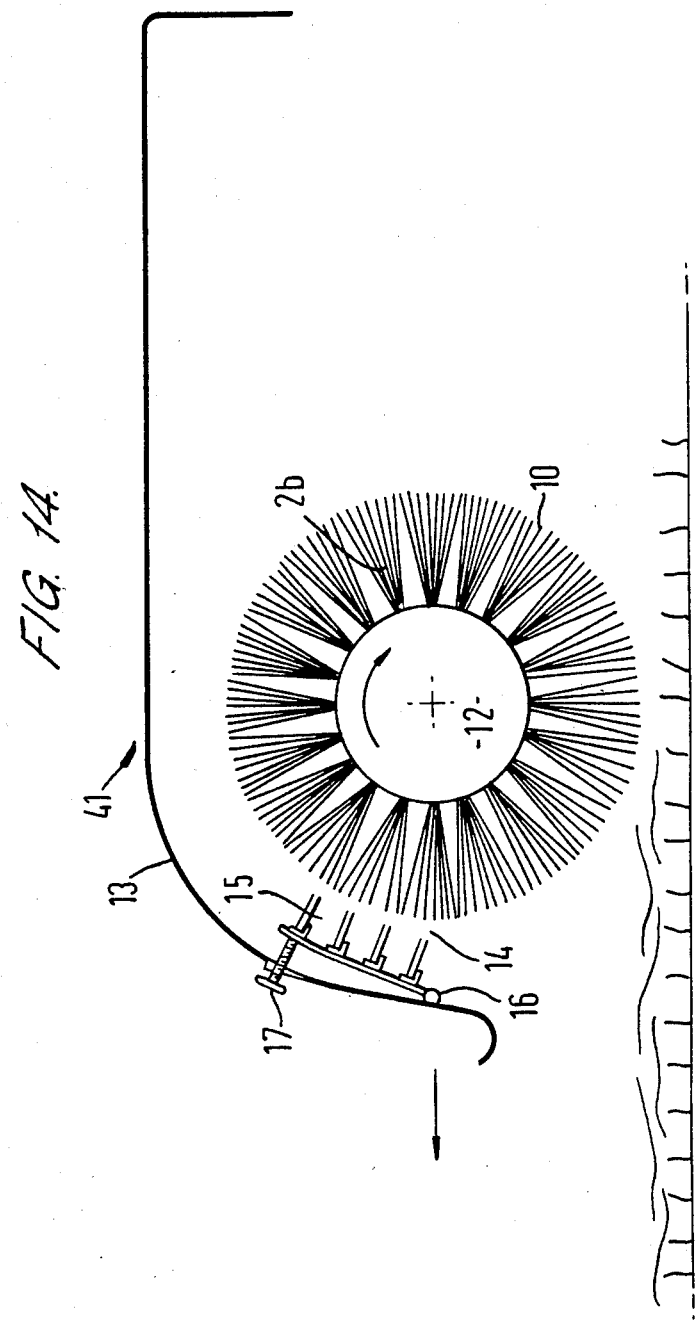

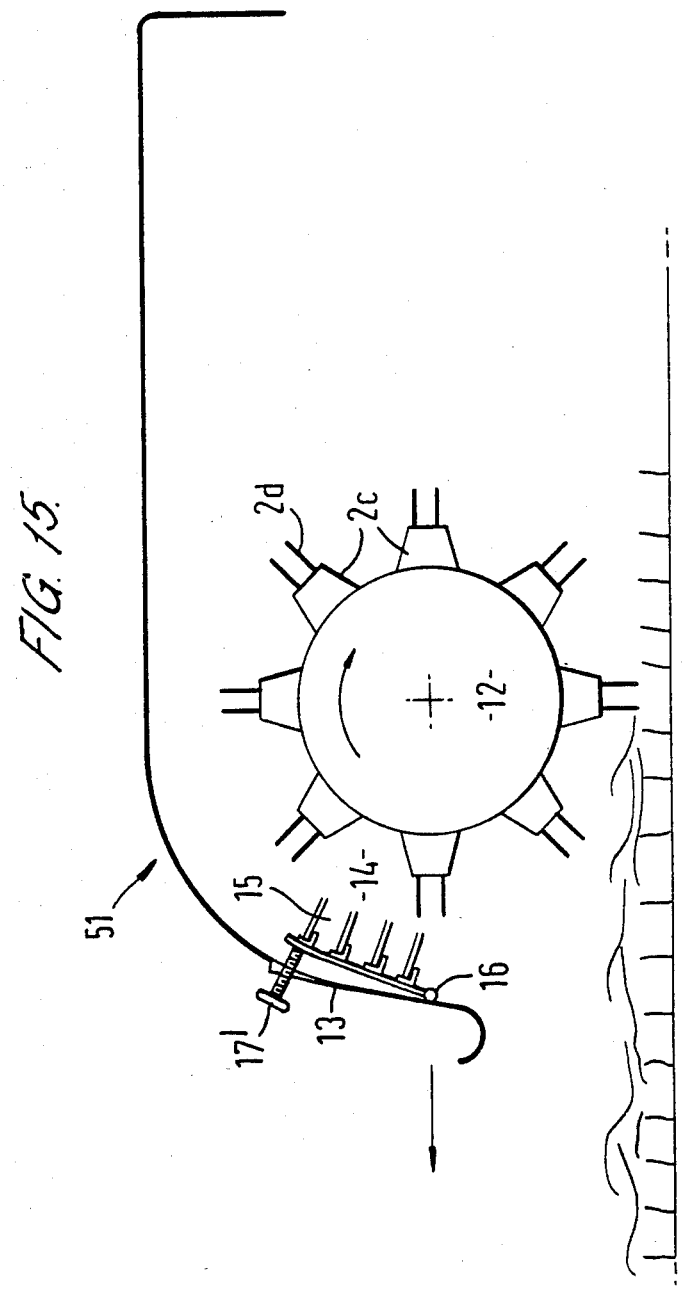

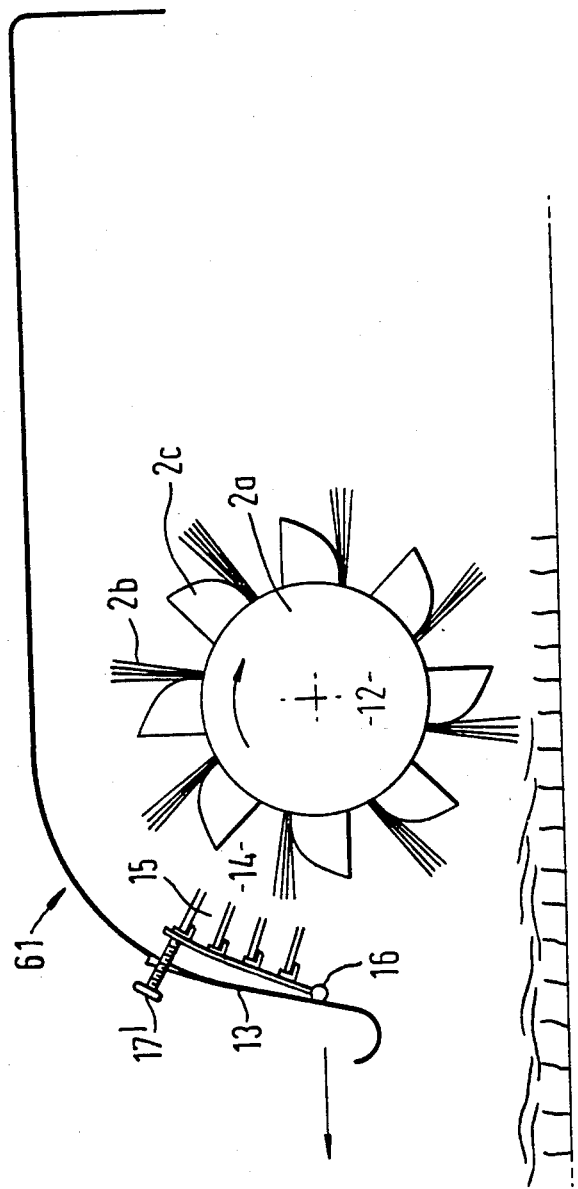

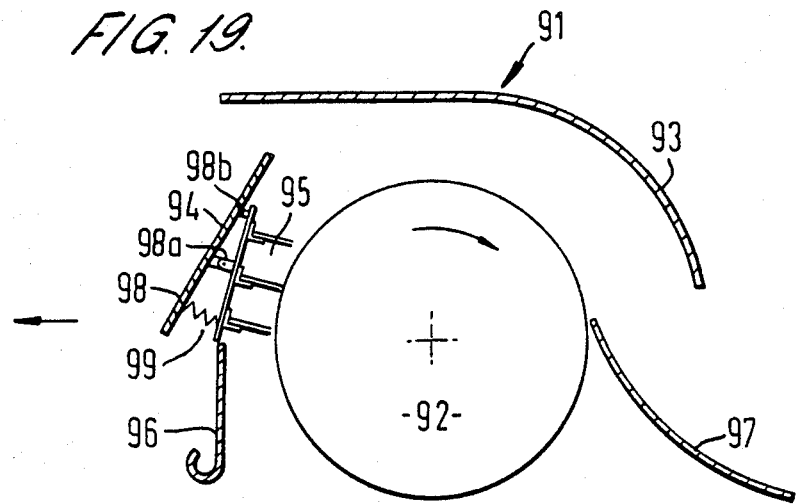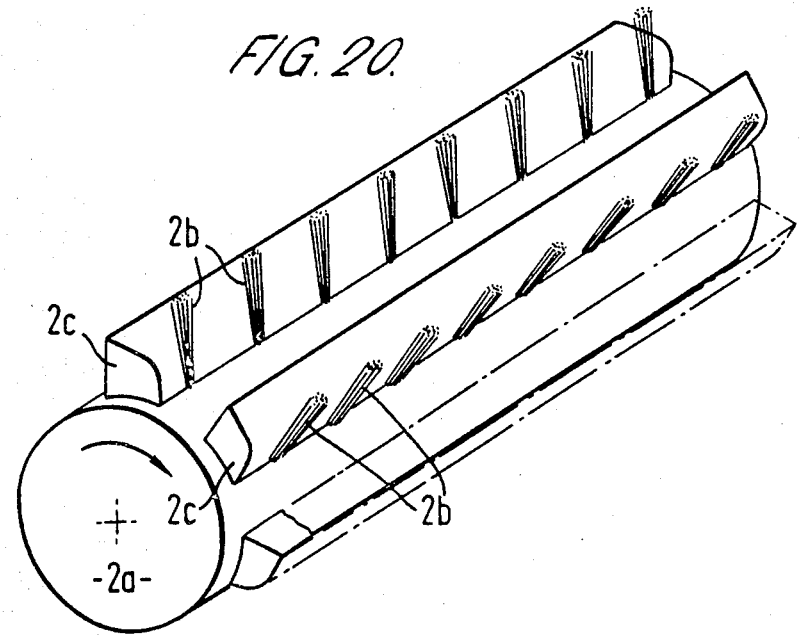

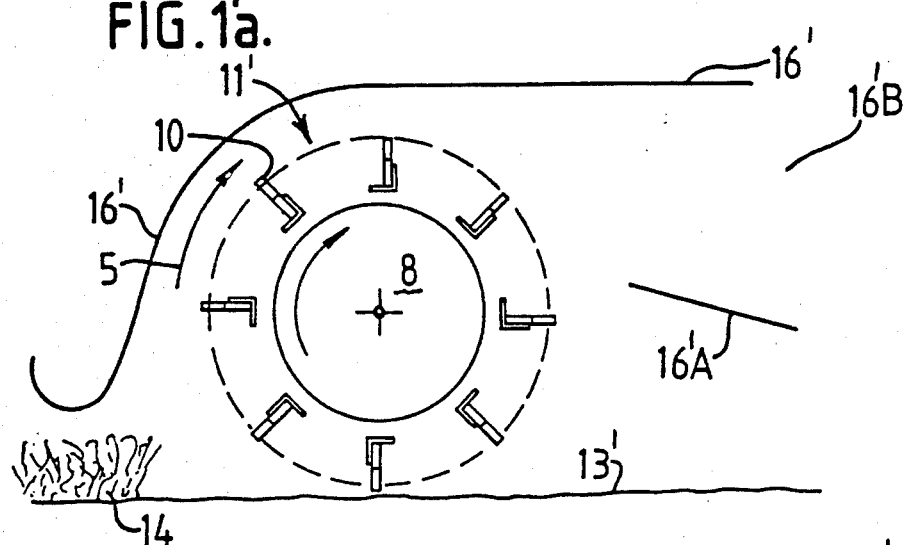
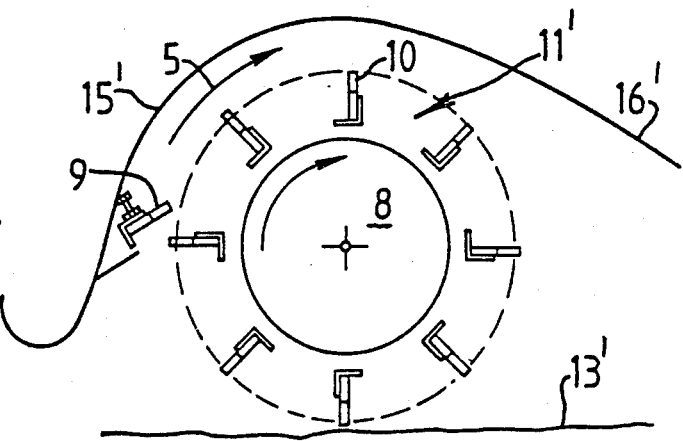
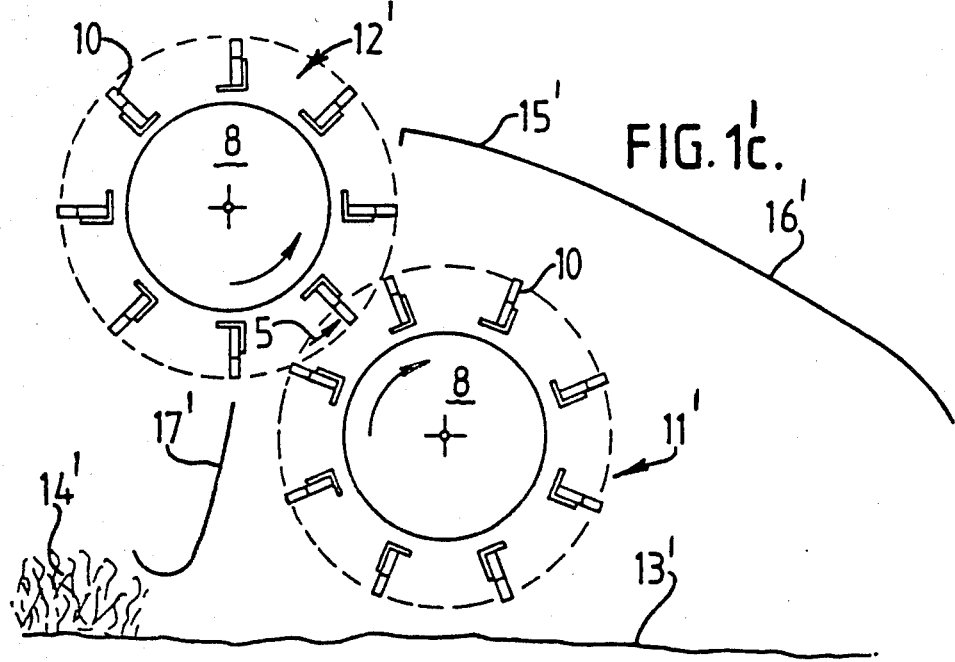

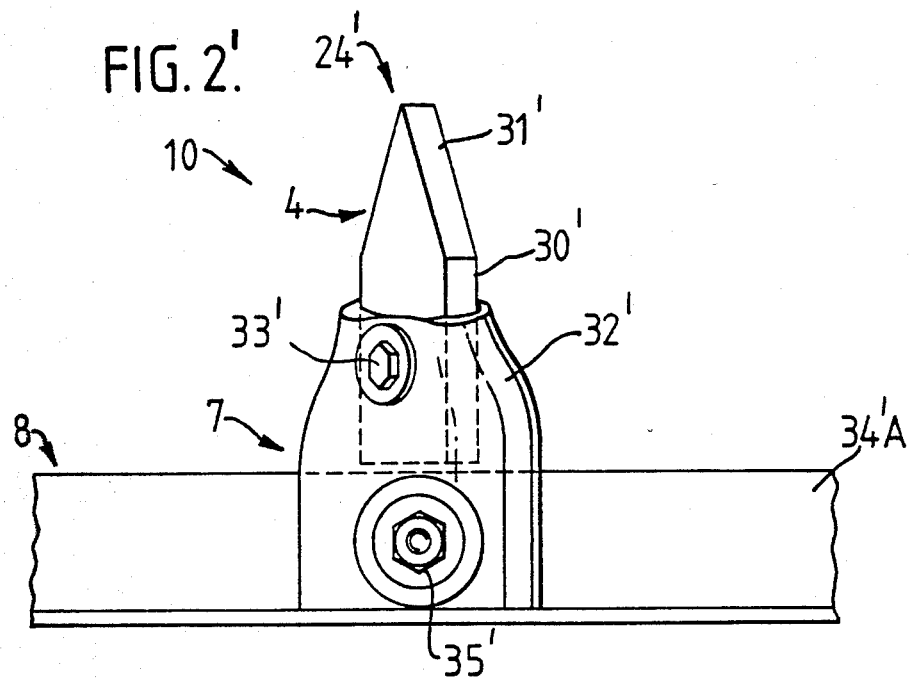
FIG. 2'.
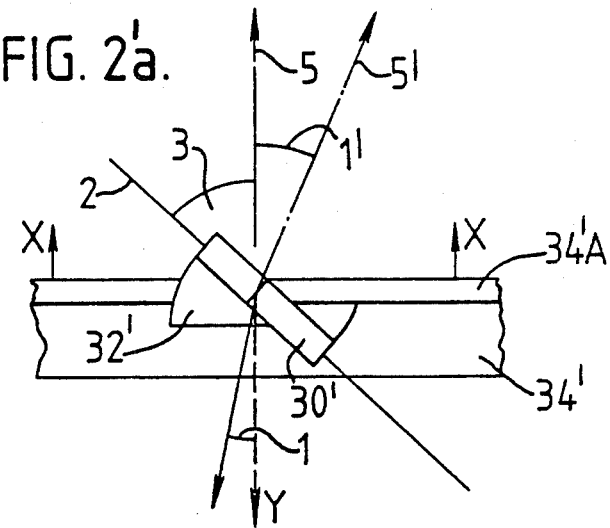
FIG. 2'a.

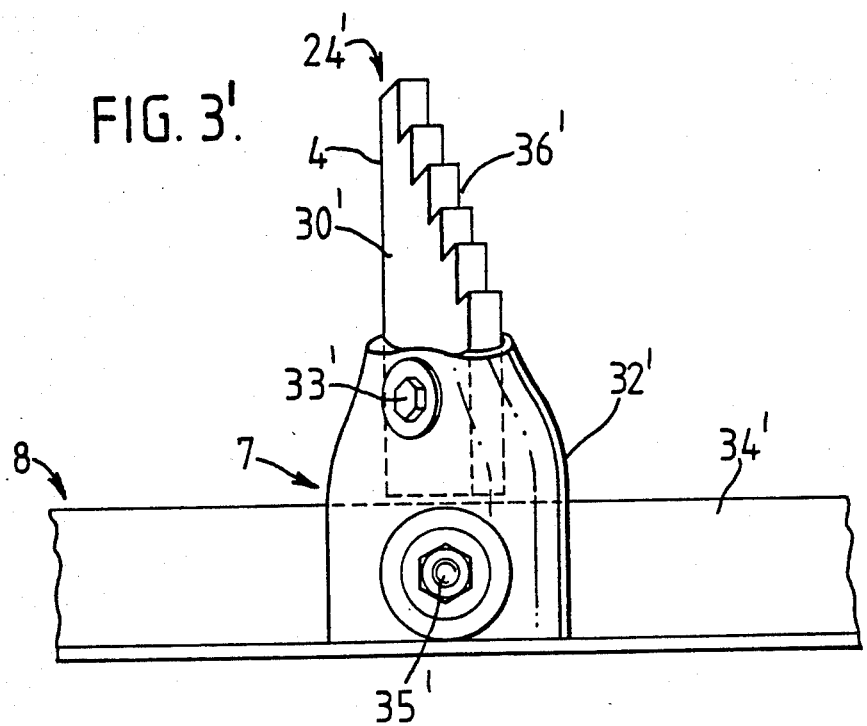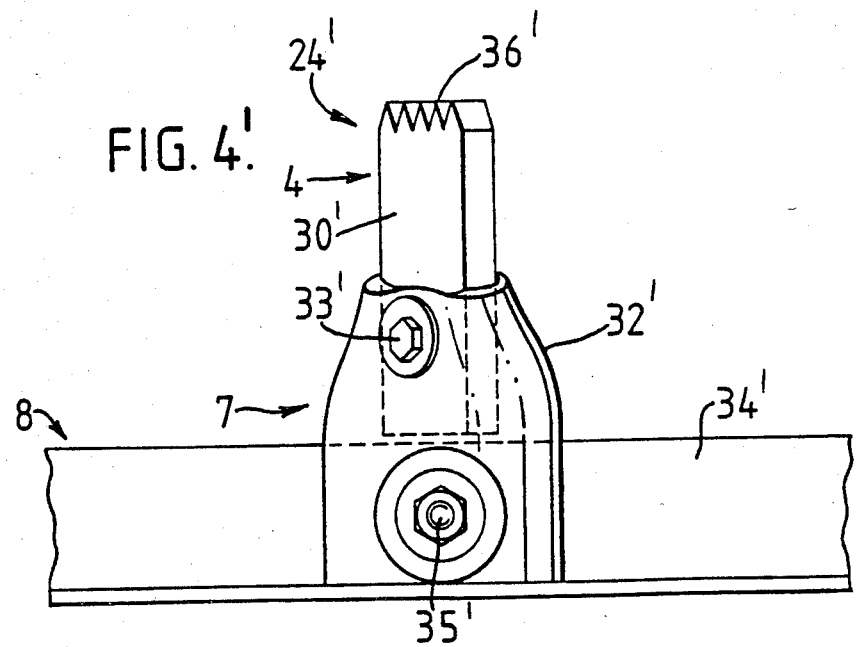

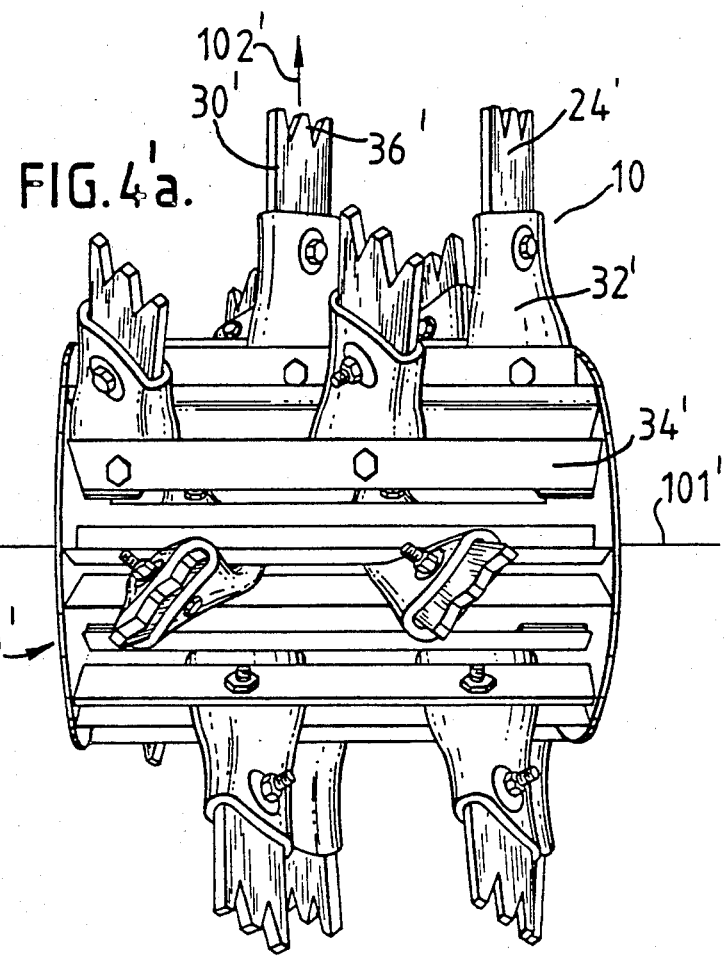
FIG.4'a.
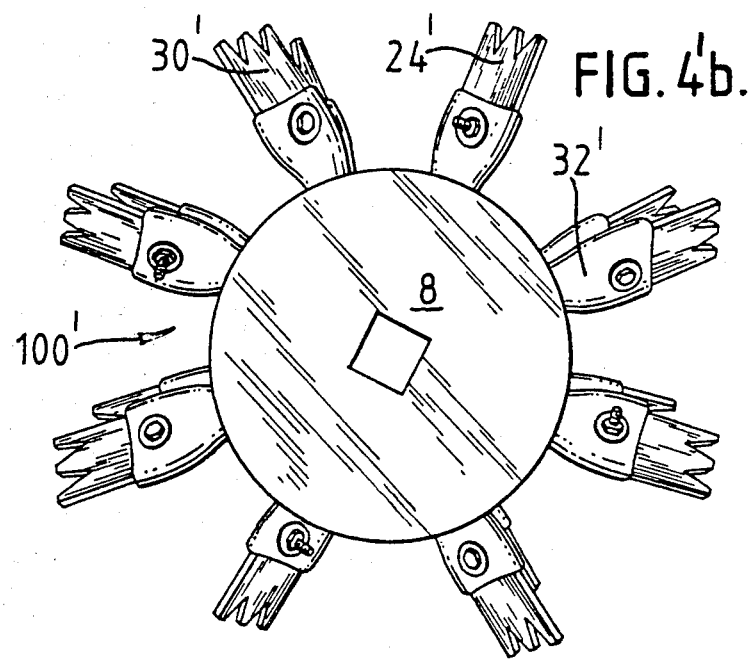
FIG.4'b.

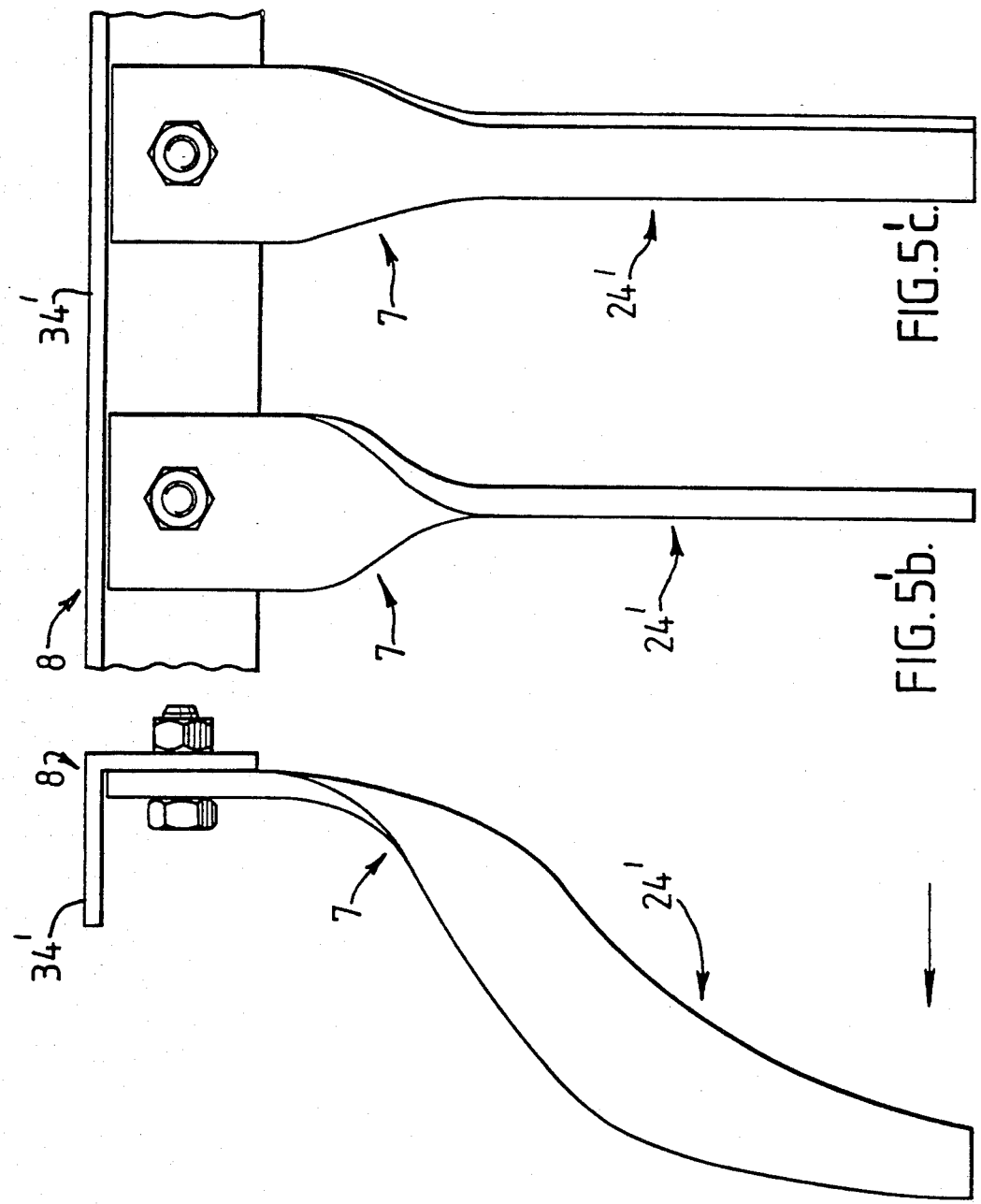

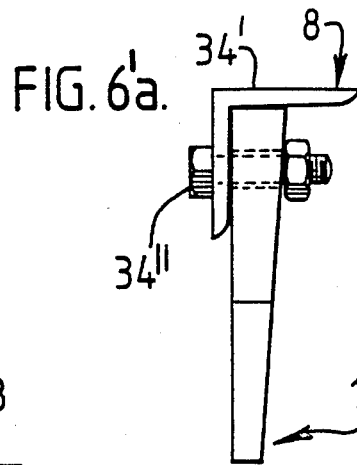
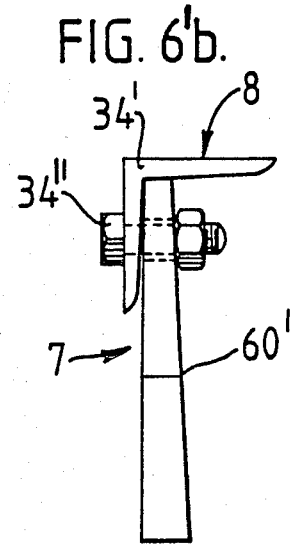
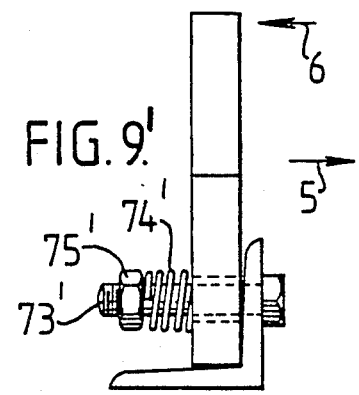
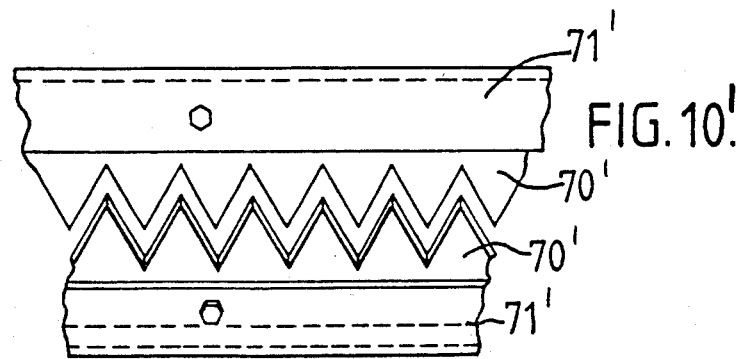

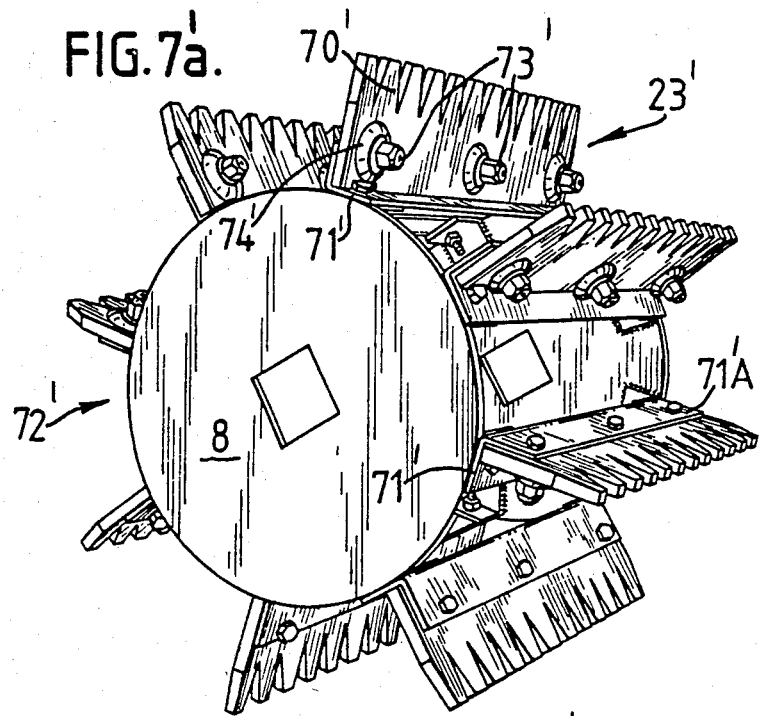
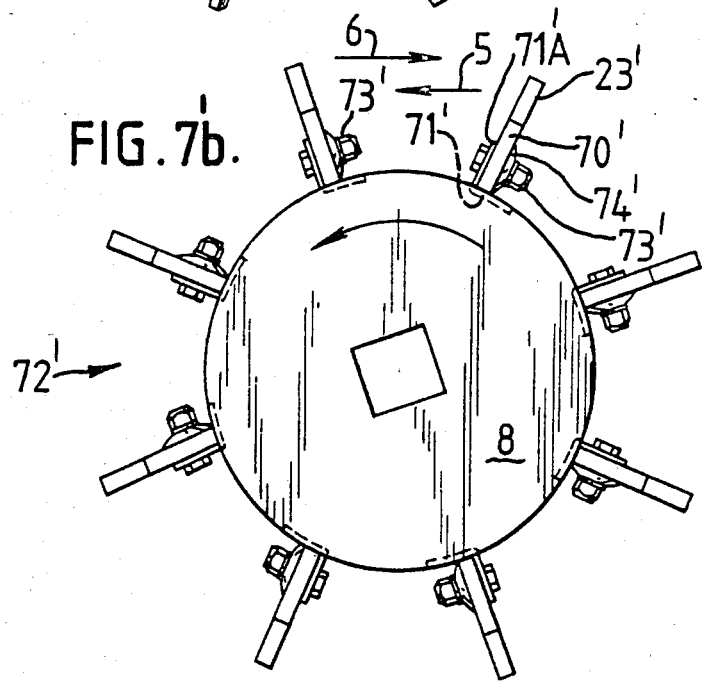

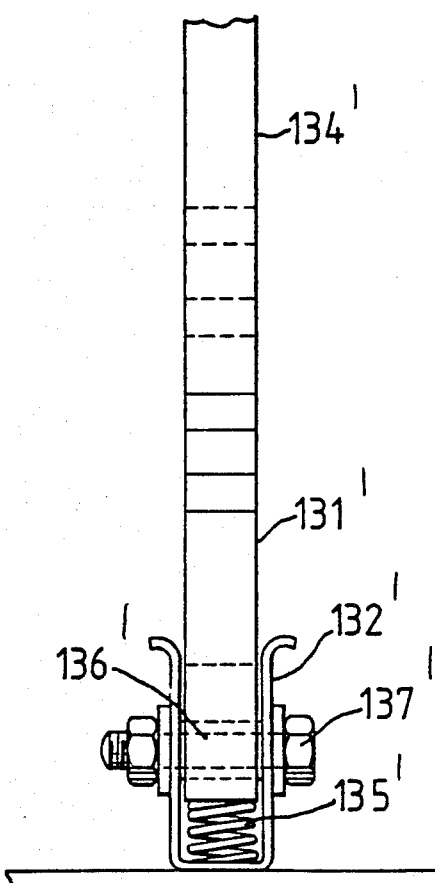
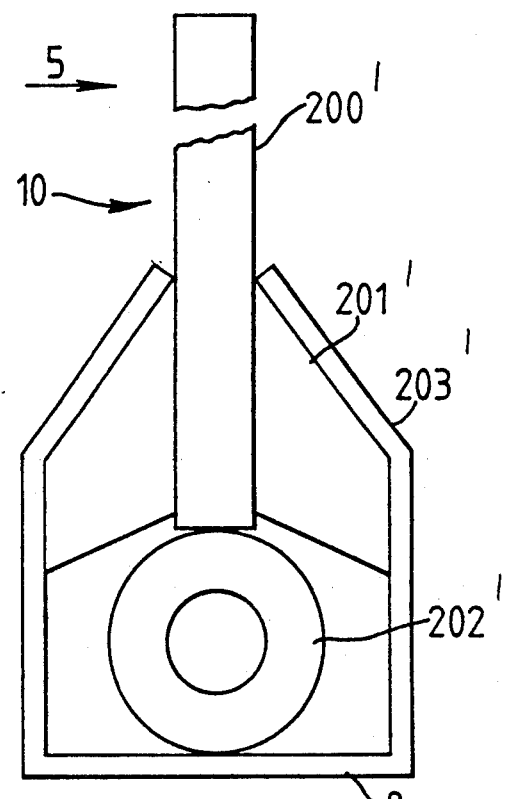
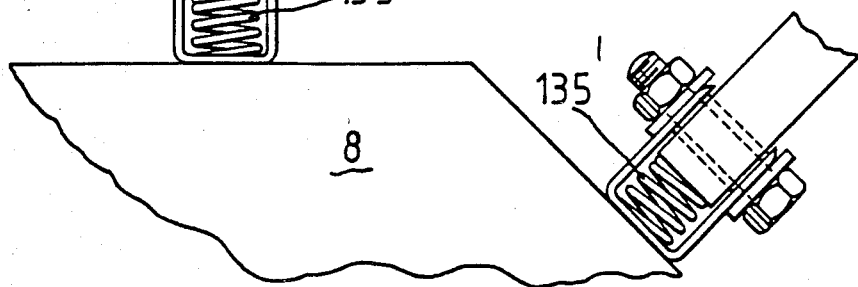

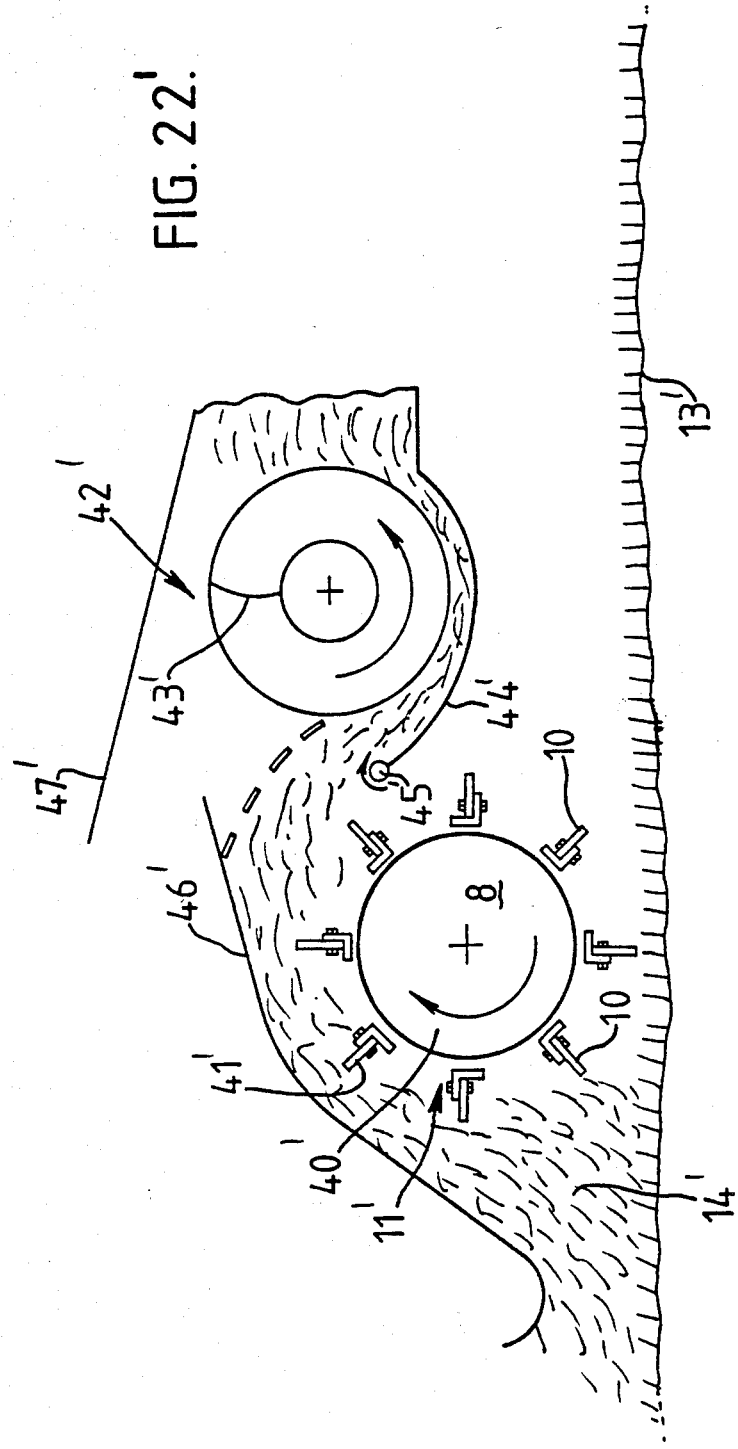

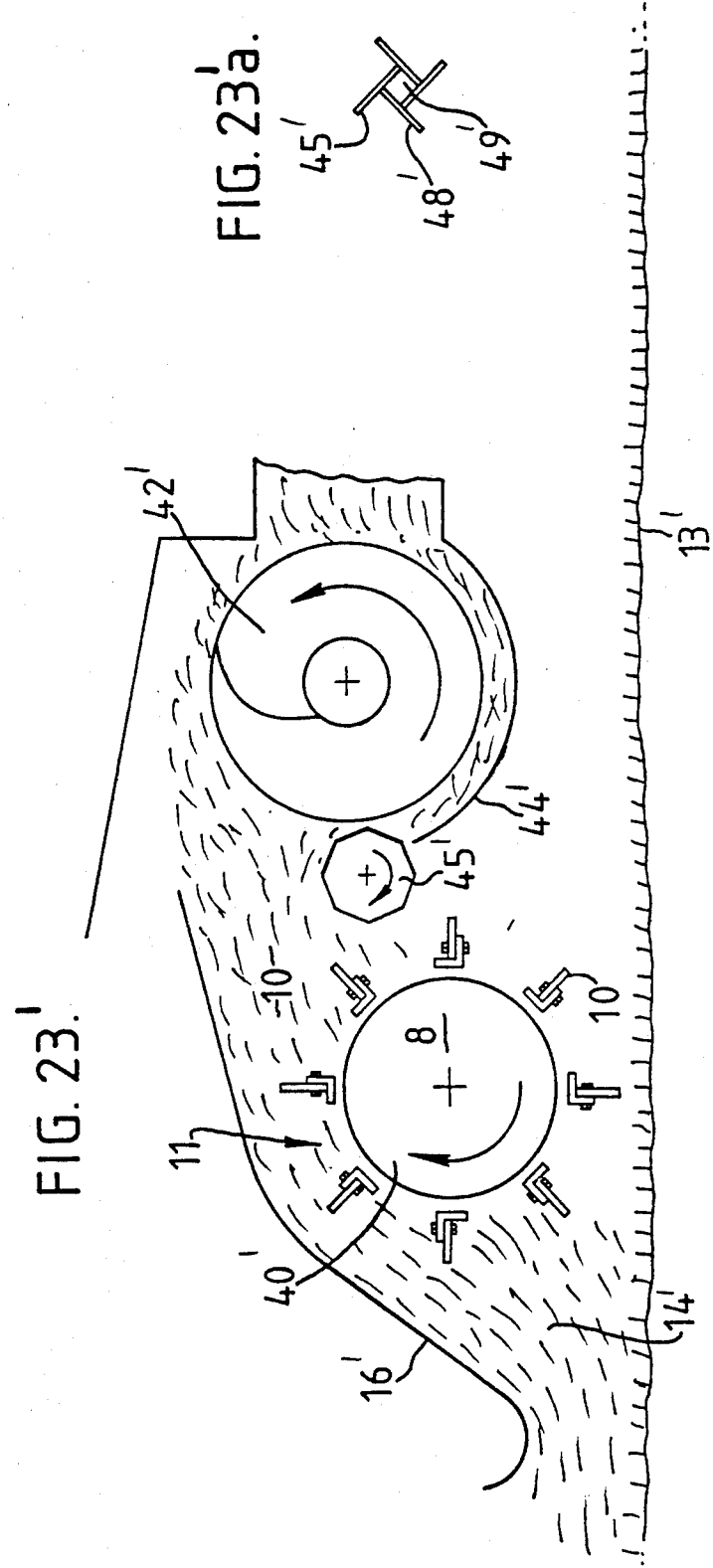

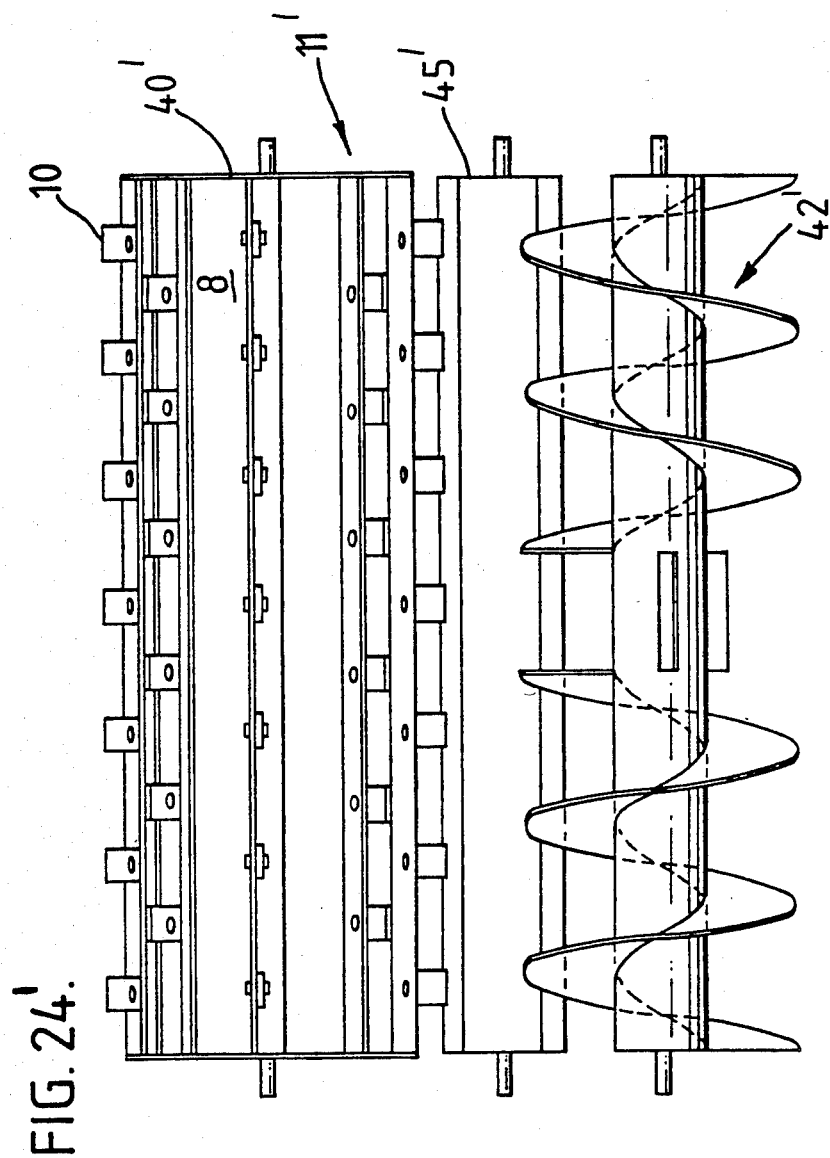

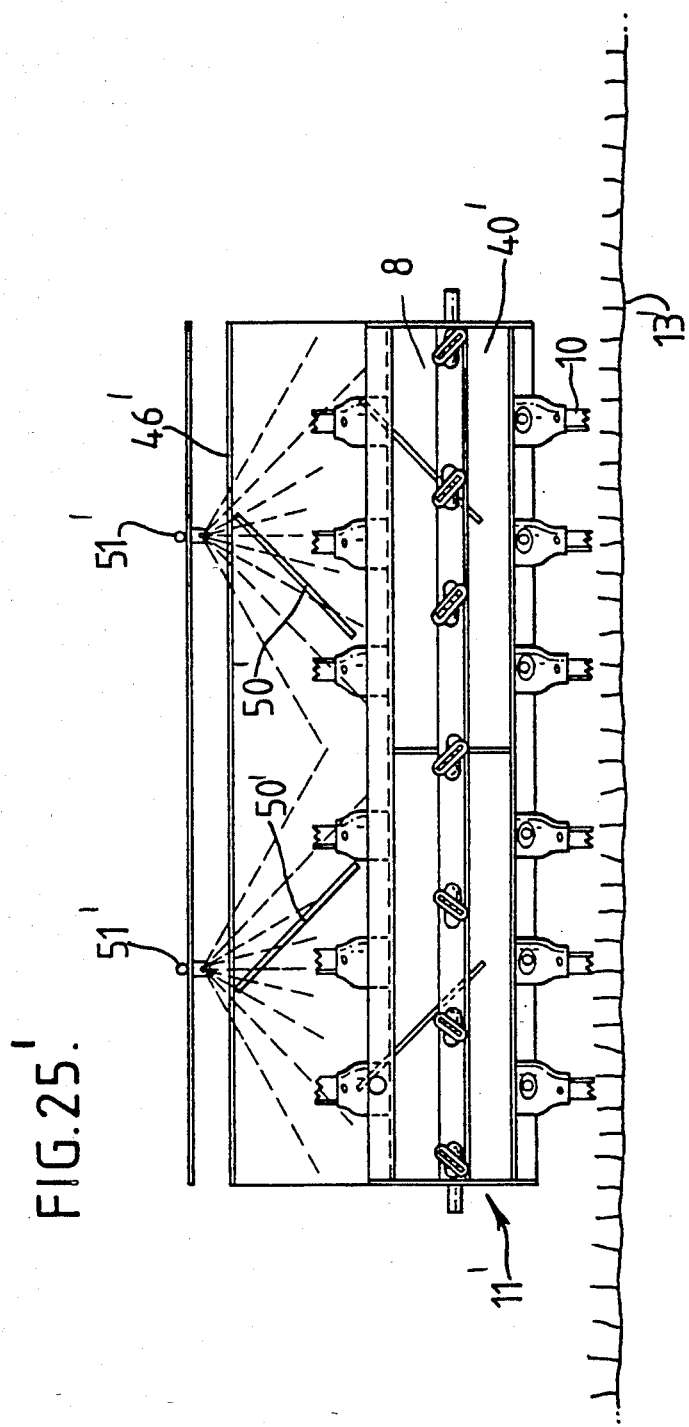

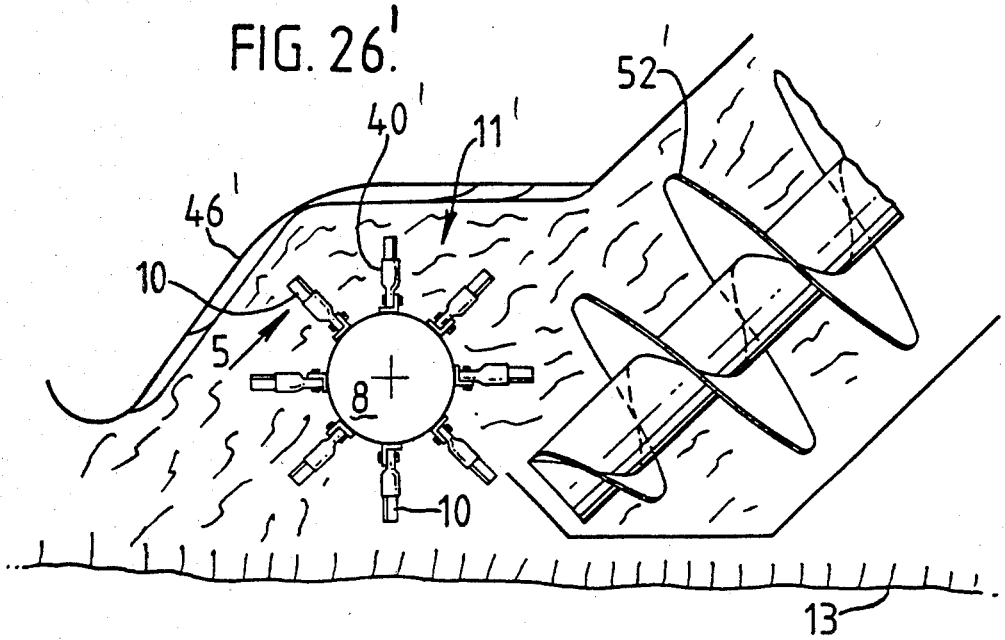
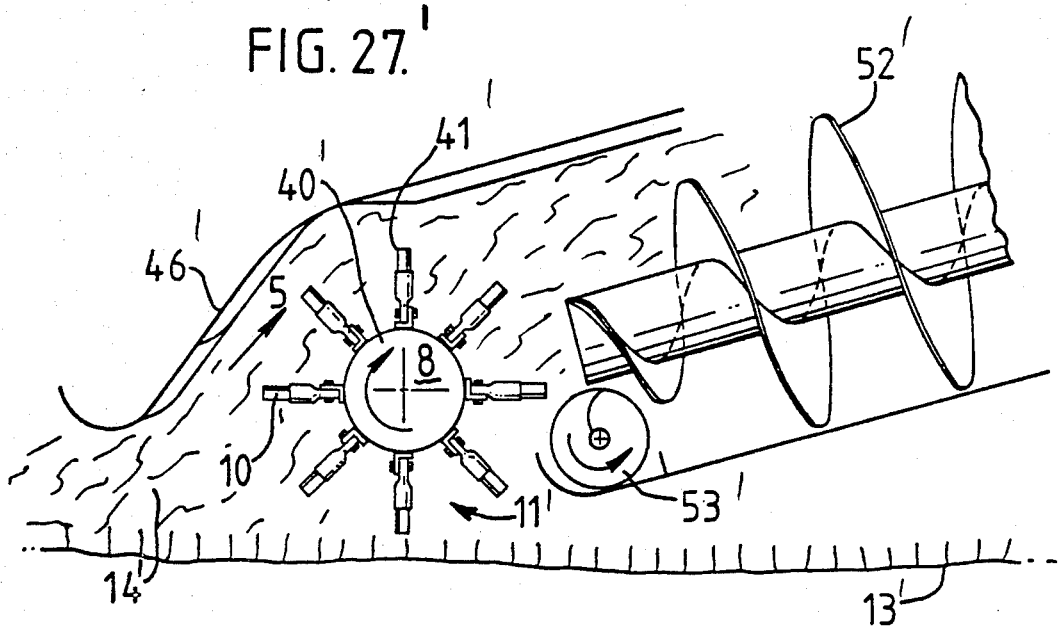

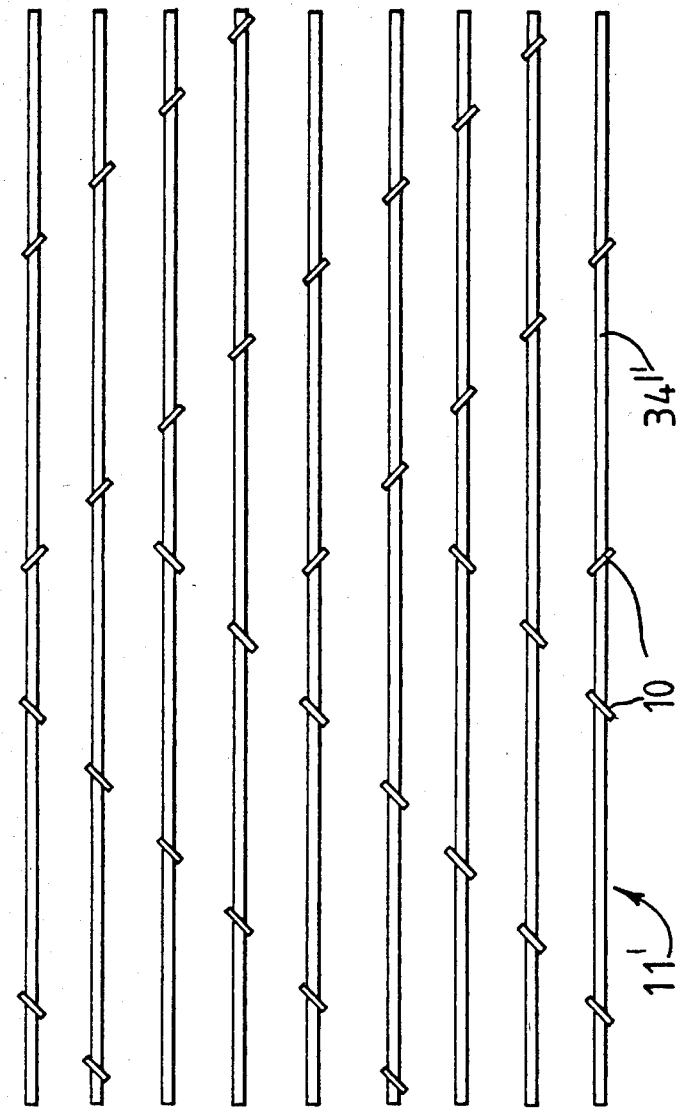

CROP ENGAGING APPARATUS AND METHODS

This application is a continuation-in-part of Ser. No. 06/173,136, now U.S. Pat. No. 4,398,384, filed 11/30/79.

BACKGROUND OF INVENTION

The present invention relates to the treatment of crops especially, but not exclusively, the conditioning of grasses, and provides an improved crop-treatment apparatus and method.

Forage crops such as grasses which are surplus to immediate requirements are usually cut and field dried to provide animal fodder, particularly hay or silage, for the feeding of animals when fresh forage crops are not available. In temperate, especially maritime climates, the crops are at risk between cutting and harvesting (i.e. the field exposure time) because the adverse effects of light and rain and micro-organism activity can produce appreciable nutrient and dry matter losses. Accordingly, it is important to minimize the field exposure time to reduce the risk of such losses. However, the crops cannot be harvested until they have dried to a sufficiently high dry matter content for safe storage as animal fodder. In the case of hay, a dry matter content of about 80% is usually required.

The speed at which surface and sap moisture evaporate from the cut crop during field exposure depends inter alia on the physical condition of the crop. The principal barrier to moisture loss is the cuticle and the layer of epicuticular wax on the crop surface, and it is now common practice in agriculture to mechanically treat the crop in order to damage this barrier. Such mechanical treatment, which may take the form of crushing, lacerating, bruising, splitting, bending or scuffing the stem and leaves of the crop, is known as "conditioning". A variety of conditioning devices have been used or proposed (e.g. as in UK Patents Nos. 588,439 (Chilton), 662,303 (Goodall), 1,368,682 (Bucher Guyer) and 1,322,165 (NRDC) but none are entirely satisfactory. In particular, known conditioning devices often cause undesirable damage to the crop, resulting in high dry matter losses; are unsatisfactory (by reason of their complexity, weight and/or cost) for use with crop cutters (i.e. mowing machines) of greater than 3.5 m width; and usually have metal components which are liable to break during use and damage forage harvesters collecting the field dried crop.

Desirably a crop conditioning device should satisfy the following criteria:
1. Minimize fragmentation of the crop;
2. Compensate for changing crop density;
3. Limit physical damage to the cuticular barrier to leave the structural strength and resistance to leaching substantially intact;
4. Allow adjustment for conditioning of different crops and for different treatment requirements;
5. Minimize susceptibility to damage by extraneous objects, particularly stones, and to blockage by the crop;
6. Uniformly treat the crop; and
7. Provide a loosely structured swath or windrow having good resistance to settling.

In addition, the device should be relatively inexpensive to manufacture and maintain and readily adaptable to mowing machines of any width.

DESCRIPTION OF PRIOR ART

In a previously constructed experimental crop conditioning implement (of which the inventor named in this application was a co-inventor, and which is described in our published UK Patent Specification No. 1,322,165 with reference to FIGS. 1 to 5 of that specification) a conditioning rotor was provided with conditioning elements which consisted of elongated flat strips of rubber fixedly secured to an inner, tubular rotating member of the rotor. In operation, the conditioning elements were thrown outwardly by centrifugal force to operating positions at an angle to radii of the rotor.

This machine suffered from a number of disadvantages, including the lack of abrasiveness and of penetration into the crop layer of the wide rubber strips, and the considerable power required to drive the rotor at a rate sufficient to maintain the relatively heavy rubber strips in an outwardly directed operating position. Other disadvantages were that when a rubber strip became deflected from its operating position, the restoring effect provided by the material of the rubber strip itself to return the strip to its operative position was small, the return to the operative position being effected mainly by centrifugal force. Consequently, the time taken for the strip to restore to its operative position was significant and during the return time the strip was ineffective for conditioning. Another disadvantage was that under the effect of centrifugal force, the rubber strips lengthened by creep, and fouled the adjacent components of the apparatus. Thus the effective diameter of the rotor was not constant, being unduly diminished by deflection of the strips, and being enlarged in time by creep of the rubber of the strips.

A second embodiment described in our UK Specification No. 1,322,165 sought to alleviate these problems by providing rigid metal flails pivoted to a central rotating member of the rotor. In this case, as mentioned in the specification, the conditioning elements gained their effective resilience by virtue of the pivoting of the flails against centrifugal force, the material of the flails having no resilience at all. In the case of the rubber strips described in the first embodiment of our UK Patent No. 1,322,165, the material of the strips was yielding in itself, but in both embodiments described in the specification the elements could not be returned to their operative positions without the effect of centrifugal force.

Our published U.S. Pat. No. 3,977,165 (containing much subject matter common with our UK Patent No. 1,322,165) describes further forms of pivoted flails, and mentions a flail in the form of a flat leaf spring. Advantages are outlined of not relying primarily on restoring conditioning elements to their operative positions by the effect of centrifugal force, but the patent suggests that the solution lies in the use of rigid conditioning elements pivoted to yield in the face of objects more solid than crop, and restored to their operative positions by the use of resilient mountings at or in the region of the pivot, for example by blocks of rubber. Such a solution is made the subject of our published UK Patent No. 1,493,574, and this solution has found considerable acceptance in agricultural machinery. Despite this acceptable performance, certain problems remain with metal conditioning elements in connection with the weight of the rotor, (especially if used with very wide cutting implements) and the danger to cattle and following machinery of any portions of conditioning elements broken and remaining in the field. It has therefore been found that despite the generally acceptable performance of the conditioning elements set out in our last mentioned patent, there is a requirement for a conditioning rotor of equal or better performance, which is lighter and can have the conditioning elements made of materials which do not harm cattle or following machines such as crop harvesting machines if portions of conditioning elements are left in the field after accidental breakage.

It is also known, for example in UK Patent No. 588,439 (Chilton) and UK Patent No. 1,368,682 (Bucher Guyer), to provide a conditioning rotor having non-yieldable, outstanding, radial conditioning elements which mesh with a comb or multiple comb structure which is stationary relative to the rotating conditioning elements. The conditioning effected by such intermeshing elements in severe, and consists mainly of fracture and tearing of the crop. Fixed element conditioning rotors also do not have the facility of yielding in the face of objects heavier than crop to avoid breakage. The intermeshing of the comb or combs with the fixed element conditioning rotor of these patents is achieved by arranging the outstanding conditioning elements or spokes of the rotor in an orderly manner leaving a clear path between adjacent rows of spokes around the rotor, the comb or multiple comb structure being arranged to have its teeth interdigitating with the rotating spokes.

It is also known to windrow crop by a rotor having light, spring steel tines, and during this operation some conditioning is effected. The steel tines are yieldable to a degree by virtue of the resilience of the metal, but in normal practice are mounted by pivotal mountings, by coil spring mountings, or by other resilient mountings, in such a manner that the predominant factor in the yieldability of the tine is its pivoting or hinging effect about the mounting at the base of the tine. Such metal tines are known to be liable to break at the base and in such a case the piece of metal in the field is liable to cause damage to cattle or to following machinery. Also where spring steel tines have been used in tedding rotors, the primary function has been tedding i.e. turning and fluffing up the crop, and the degree of conditioning effected has been small. One reason for this is that only a small proportion of the total crop can come into direct contact with the tines.

In an alternative form of conditioning apparatus, (which operates by a different mode of operation from previously described machines), the crop is collected by a conveying reel and fed at speed into a pair of opposed conditioning rotors having the same diameter as each other and being driven in opposite senses but at the same speed as each other. The rotors inflict damage on the crop by compressing the crop between the rotors and crushing and breaking the crop. Such rotors belong to a general class of conditioning devices known as crimping rollers which in some arrangements may for example comprise rubber rollers having longitudinal ridges and edges on the opposed faces of the rollers. In the operation of such a device the crop is presented to the nip of the rotors as a rapidly moving stream of crop, and during the movement of the crop between the rotors there is substantially no relative velocity between the crop passing between the rotors and the faces of the rotors engaging the crop. The conditioning is achieved by compression by the opposed rotor faces, rather than by relative movement between the conditioning rotors and the crop.

It is one particular object of the present invention to provide crop conditioning apparatus which allows the achievement, at least in its preferred embodiments, of advantages of operation and manufacture over previously known crop conditioning devices, and which, at least in its preferred embodiments, is free of many if not all of the disadvantages of known crop conditioning apparatus.

There have also been known previously a number of forms of crop conveying rotors having outwardly directed crop conveying elements. One form of such crop conveying elements has been provided by rotors generally in the form of paddle wheels with flat rib-like conveying elements extending transversely across the width of the conveying rotor. Such paddles were sometimes straight edged, and sometimes shaped with serrations or other patterns. Examples of previous disclosures of such rotors are to be found in U.S. Pat. No. 3,676,988 (Bucher-Guyer) which shows in FIG. 9 a horizontal conditioning rotor provided with beater bars 4b formed with saw-teeth shaping. Another prior patent, UK Pat. No. 1140284 (Landbruksteknisk) shows in FIG. 2 at 15 a feed roller the free edges of which are said to be preferably waved or saw-toothed. Also in UK Pat. No. 1214840 (Vissers) there is disclosed a paddle wheel type of conveying rotor which it is said may be made of sheet metal or of synthetic plastics material, rubber or like flexible elastic material.

SUMMARY OF INVENTION

The present invention may be regarded as having one main general aspect, and three main, preferred aspects.

In accordance with the main general aspect of the present invention, there is provided apparatus for treating crop comprising two cooperating rotors mounted for counter rotation about parallel axes for passage of crop between the rotors, at least one rotor comprising a crop treating rotor having a plurality of stiff, resilient, outwardly directed crop engaging elements having sharp tips on the outer ends thereof for treating crop, and the other rotor having a plurality of stiff, resilient, outwardly directed crop engaging elements, the arrangement being such that in operation the rotors rotate with the outer perimeters of the rotors overlapping and with regular inter-meshing of crop engaging elements on one rotor with crop engaging elements on the other rotor in such a manner that the crop engaging elements of the said other rotor tend to press crop into gaps between the crop treating elements on the said one rotor which has the sharp tips so that the crop is laid across the outer ends of the elements on the said one rotor for treating the crop at least predominantly by a spiking action.

There is also provided in accordance with the main general aspect of the invention a method of treating crop comprising the steps of passing crop between two cooperating rotors mounted for counter rotation about parallel axis, at least one rotor comprising a crop treating rotor having a plurality of stiff, resilient, outwardly directed crop engaging elements having sharp tips on the outer ends thereof for treating crop, and the other rotor having a plurality of stiff, resilient, outwardly directed crop engaging elements, rotating the rotors with the outer perimeters of the rotors overlapping and with regular inter-meshing of crop engaging elements on one rotor with crop engaging elements on the other rotor, and utilising the crop engaging elements on the said other rotor to press crop into gaps between the crop engaging elements on the said one rotor which has the sharp tips, so that the crop is laid across the outer ends of the elements on the said one rotor for treating the crop at least predominantly by a spiking action.

In accordance with a first main preferred aspect, at least one of said two rotors comprises a brush-like structure having a multiplicity of stiff, resilient, elongate conditioning elements for conditioning the crop by an action consisting predominantly of surface damage to the crop, the elements being yieldable in response to engagement with the crop, and being yieldable at least predominantly by bending of the elements along at least part of the crop engaging portions of the lengths thereof, and the elements being sufficiently stiff to return to their undeflected dispositions when free from engagement with crop at least predominantly by virtue of the stiffness of the elements.

Within this first preferred aspect there may conveniently be arranged apparatus in which the conditioning elements are arranged in rows transverse to the direction of crop movement between the rotors, and in which the rotors are arranged to be rotated in operation with transverse rows of elements on one rotor intermeshing into transverse gaps on the other rotor.

In one preferred form, there may be provided crop conditioning apparatus comprising a frame having a passage for crop to be conditioned, and first and second conditioning devices positioned substantially opposite each other on opposed sides of the crop passage, in which each crop conditioning device is in the form of a rotor and comprises a brush-like structure having a multiplicity of stiff, resilient, elongate conditioning elements for conditioning the crop by an action consisting predominantly of surface damage to the crop, the elements being yieldable in response to engagement with the crop, and being yieldable at least predominantly by bending of the elements along at least part of the crop engaging portions of the lengths thereof, and the elements being sufficiently stiff to return to their undeflected dispositions when free from engagement with crop at least predominantly by virtue of the stiffness of the elements and in which the rotors are arranged to be rotated in contra rotation with the same peripheral speed at the tips of the elements, and the rotors are sufficiently close and the elements sufficiently stiff to cause conditioning of the crop predominantly by a spiking action of the tips of the elements in which the stiff elements of each rotor force crop onto the tips of the stiff elements of the other rotor.

There may also be provided in accordance with this preferred form a method of conditioning crop comprising the steps of passing crop between two rotors one of which comprises a brush like structure having a multiplicity of stiff, resilient, elongated conditioning elements, which are yieldable in response to engagement with the crop, and are yieldable at least predominantly by bending of the elements along at least part of the crop engaging portions of the lengths thereof, the elements being sufficiently stiff to return to their undeflected dispositions when free from engagement with crop at least predominantly by virtue of the stiffness of the elements, rotating the rotors in contra rotation with the same peripheral speed, and conditioning the crop by the elements of the said one rotor predominantly by a spiking action in which the other rotor forces crop onto the tips of the stiff conditioning elements of the said one rotor.

In accordance with a second main preferred aspect (of the invention in its said general aspect), the crop engaging elements of each rotor are arranged in elongate formations which traverse the general direction of crop flow, the arrangement being such that in operation the rotors rotate with the outer perimeters of the rotors overlapping and with regular inter-meshing of one or more of the elongate formations of each rotor with one or more elongate formations of the other in such a manner that the crop engaging elements of one rotor press crop into gaps between the elongate formations on the other rotor.

Within this second preferred aspect there may conveniently be arranged apparatus in which on at least one rotor each element comprises a rib-like element extending transversely across the direction of crop flow to a greater extent than it extends outwardly from the axis of rotation of the rotor, the said rib-like elements constituting the said elongate formations.

In one preferred form there may be provided apparatus for treating crop comprising two cooperating rotors mounted for counter rotation about parallel axes for passage of crop between the rotors, one of said rotors comprising a crop treating rotor having a plurality of stiff, resilient, outwardly directed crop engaging elements having sharp tips on the outer ends thereof for treating crop, the tips being arranged in rows transverse to the general direction of crop flow, the other of said rotors having a plurality of stiff, resilient, outwardly directed crop engaging elements, each said element comprising a rib-like element extending transversely across the direction of crop flow to a greater extent than it extends outwardly from the axis of rotation of the rotor, the arrangement being such that in operation the rotors rotate with the outer perimeters of the rotors overlapping and with regular inter-meshing of the rows of tips of the crop engaging elements on the said one rotor with the rib-like crop engaging elements on the said other rotor in such a manner that the rib-like elements of the said other rotor tend to press crop into gaps between the rows of sharp tips of the crop treating elements on the said one rotor so that the crop is laid across the outer ends of the elements on the said one rotor for treating the crop at least predominantly by a spiking action.

In accordance with a third main preferred aspect (of the invention in its said general aspect) the crop engaging elements of each rotor are arranged in elongate circumferential formations which are generally transverse to the axis of rotation of the rotor, the arrangement being such that in operation the rotors rotate with the outer perimeters of the rotors overlapping and with regular inter-meshing along the axis of the rotor of one or more of the elongate formations of each rotor with one or more elongate formations of the other in such a manner that the crop engaging elements of one rotor press crop into gaps between the elongate formations on the other rotor.

Within this third aspect, there may conveniently be arranged apparatus in which on at least one rotor crop engaging elements comprise disc-like elements positioned generally transverse to the axis of rotation of the rotor and spaced apart along the length of the rotor, the said disc-like elements constituting the said elongate circumferential formations.

Various preferred and optional features of the invention will now be described with reference to the three main preferred aspects set out above, taken in turn.

Consideration will first be given to the first main preferred aspect of the invention, in which at least one of the rotors comprises a brush-like structure.

Where reference is made to the elements being sufficiently stiff to return to their undeflected dispositions at least predominantly by virtue of the stiffness of the elements, it is to be appreciated that the base of an element may be secured to a support member of the conditioning device by a mounting which has itself a degree of resilience, for example by being clamped to a support member by clamping means including resilient material. Such a resilient mounting may contribute to the return of an element to its undeflected disposition, but it is a feature of the present invention that the elements are sufficiently stiff to return to their undeflected dispositions predominantly by virtue of the stiffness of the elements. Where, as will be described hereinafter, the elements are mounted in tufts with a plurality of elements set closely together, it will be appreciated that adjacent elements will assist each other in the return to an undeflected disposition when free from engagement with crop, but again it will be appreciated that this return is effected predominantly by virtue of the stiffness of the elements. Similarly where, as will be described hereinafter, the conditioning device comprises a rotary device, the return of the elements to their undeflected dispositions may be assisted by the effects of centrifugal force, but again the elements are returned predominantly by virtue of the stiffness of the elements.

In practical embodiments it has been found advantageous for the overlap between the tips of the opposed elements to be up to 30 mm, most preferably up to 20 mm.

It is preferred that the elements of the or at least one of the conditioning devices (where more than one conditioning device is provided) have a population and distribution such that substantially no crop can pass the conditioning device without receiving conditioning treatment by the elements. Although in some arrangements the elements may be provided in a generally uniform distribution across the conditioning device, it will be appreciated that this is not necessary in order to fulfill the previously stated requirements. For example where one conditioning device is a rotary device, the elements may be arranged in groups spaced apart along rows parallel to the axis of the rotor and angularly spaced around the rotor. These rows may each contain gaps through which crop can pass, but the groups of elements can be staggered in position from one row to the next around the rotor so that the gaps in one row are effectively blocked by one or more groups of elements in succeeding rows. Conveniently the groups of elements can be arranged in a spiral pattern, but other patterns may be used. The net effect of this preferred feature is to ensure that as the rotor rotates, no gap is presented to the crop through which the crop can pass without receiving conditioning treatment.

Conveniently the elements may be arranged in a brush of conventional form, that is to say in which groups of elements are mounted together in tufts, and the positions of the tips of the elements are to at least some extent random. However other forms of brush will readily be apparent, and in particular the brush may comprise elements which are disposed in a regular, non-random, pattern.

In accordance with other features of the invention with will be described more fully hereinafter, it may be arranged that the elements are sufficiently stiff to penetrate and move through at least part of a stream of crop moving through the passage. It may also be arranged that the elements condition the crop by an action which consists predominantly of surface abrasion of the crop. It may further be arranged that the elements are yieldable by bending substantially along the whole of the free lengths thereof.

In one form, the tips of the elements may be distributed substantially uniformly and the population of the elements at the tips may lie in the range 1 to 20 elements per sq.cm., preferably in the range 4 to 16 elements per sq.cm. In another form the elements may be arranged in spaced-apart tufts of elements and the population of the elements in each tuft at the tips may lie in the range 1 to 20 elements per sq.cm., preferably in the range 4 to 16 elements per sq.cm.

Conveniently each tuft may be formed of one or more lengths of element material doubled over and secured to a supporting base in the region of the fold of the doubled over element length or lengths. Alternatively the conditioning elements may be constructed by moulding or otherwise performing plastics or other resilient material.

Also conveniently each element or group of elements in a tuft may be supported and protected at the base thereof by a sleeve of resilient material. Such a sleeve may provide a resilient mounting for the elements such as has already been referred to.

In order to reduce the risk of the elements being dislodged or breaking in use, it may be convenient in some arrangements that their bases are protected by respective shrouds against impact by material, especially extraneous material such as stones. The shroud suitably can be constituted by an upstanding wall located forwardly (with respect to the movement of the crop relative to the element) of the respective element or element row and projecting for only the lower part of the element length. It is also advantageous to provide in some circumstances a support rearwardly (with respect to the movement of the crop relative to the element) of the respective element or element row to limit the extent to which the element can bend and thereby reduce the risk of fatigue. Said support can readily be provided by an upstanding wall constituting a shroud for the next following element or element row. In addition or alternatively to the provision of a support to limit element bending, there can be provided stone guards having orifices or recesses to receive respective elements or tufts on limited bending of the latter whilst deflecting stones and other extraneous lumps of matter.

As has been mentioned there are a number of different configurations of the brush which can be used. In some arrangements the conditioning device may have a plurality of parallel element rows extending laterally, particularly substantially perpendicularly, to the direction of relative movement between the crop and the elements. Where the elements or element tufts are spaced apart, the spacing may be, for example, 20 to 150 mm, especially 40 to 130 mm.

As has been explained, the yieldability of the elements depends chiefly on the conditioning action required, and by way of example, the yieldability of an element may be such that application of a load of 125 grams at the tip of the element produces a displacement of the tip of about 3 mm when the element has a free length of 75 mm, and a displacement in the range 6 to 10 mm, preferably about 8 mm, when the free length is 100 mm.

The elements can be bristles or rods having, for example, a circular cross-section and a diameter in the range 2 mm to 8 mm, especially 3 mm to 6 mm. The elements can be of solid or hollow circular or other cross-sectional shape e.g. triangular, rectangular or square, but the presently preferred cross-section is trilobate (i.e. clover leaf or trefoil shape). The elements, especially those of a smaller diameter, can be crimped in order to increase their stiffness and/or can be bunched together to form tufts, as has been mentioned. Conveniently the free bendable length of each element lies in the range 10 to 300 mm, preferably in the range 25 to 250 mm and most preferably in the range 75 to 125 mm. Within each bunch the length and stiffness of the elements may differ, to extend the conditioning effect into different crop layers and graduate the severity of treatment and the rate at which crop is conveyed.

A preferred range of element cross-sections can conveniently be described by a feature that the ratio of the sides of a rectangular envelope containing a cross-section of an element does not exceed 4 to 1, preferably not exceeding 2 to 1. Another criterion which can be used to establish suitable element dimensions, is that the maximum cross-sectional dimension of an element is preferably in the range 1 to 20 mm, preferably 3 to 10 mm.

Where the or a conditioning device comprises a rotary conveying device, it is preferred that there is provided drive means for driving the rotary conveying rotor at a rotational speed of 400 to 1700 r.p.m., most preferably 500 to 1000 r.p.m.

A particularly important preferred feature is that with a rotary conveying device there is provided drive means for driving the rotary conveying device at a rotational speed such as to provide a tip velocity of 10 to 50 m per second at the tips of the elements, most preferably a velocity in the range 20 to 30 m per second, especially a velocity of 24 m per second. Conveniently such a rotary conveying device has a diameter in the range 350 to 700 mm, especially 450 to 600 mm.

The elements can be formed of any suitable materials, especially synthetic materials such as plastics materials. Plastics materials are preferred because detached or broken elements left in the field or in the crop are less likely to injure livestock should any animal ingest them. Suitable plastics materials include polypropylene and nylon. However in general suitable materials comprise nylon, polypropylene, glass fibre, or carbon fibres, either alone, or when impregnated, studded, layered or tipped with metallic or mineral abrasives, including for example silicon carbide.

The said frame of the apparatus of the invention may be stationary, but more usually the said frame is a mobile frame mounted for movement over the ground and the apparatus is arranged for collection of crop during movement of the frame over the ground and for depositing of conditioned crop onto the ground after the conditioning action. Where a mobile frame is used, the or at least one of the conditioning devices may be arranged to pick up previously cut crop lying on the ground, or alternatively the apparatus may include cutting means for cutting crop growing on the ground, the apparatus being arranged for the or at least one of the conditioning devices to engage crop cut by the cutting means.

A guide means defining the crop passage conveniently is provided by a hood or housing enclosing the aforementioned conditioning components of the device at least along the path of the crop.

The crop conditioning device of the invention can be located at a stationary crop conditioning location, for example, in a plant for artificially drying crops. In this case, the cut crop would be harvested immediately after cutting or after only limited field drying and then transported to the plant for further drying. The cut crop would be passed through the conditioning device before passage through a drier. More usually however, the crop conditioning device would be employed in the field to condition the crop immediately or shortly after cutting. Accordingly, it is preferred that the device comprises a frame adapted to be moved translationally over the ground. Conveniently, the frame can be a wheeled frame, although the frame can be provided with other ground-engaging means, for example skids, if desired. The frame can be self-propelled or mounted on or towed by a tractor or other vehicle. Alternatively the frame can be fully mounted or semi-mounted on a tractor. The drive for the driven parts of the device such as a conveying rotary brush usually will be provided from a power take-off from the engine providing motive power for the frame or the vehicle.

When a mobile crop conditioning device of the invention has a conveying rotary brush, said brush can be adapted to pick up cut crop from the ground. Other means of picking up the crop can be provided if desired or required. However, the mobile crop conditioning device preferably is included in a combined mower-conditioner in which a crop cutter device cuts the crop and immediately delivers it to the crop conditioning device for conditioning and subsequent discharge onto the ground in a swath or windrow. The brush mechanism of the crop conditioning apparatus is particularly suitable for inclusion in such a combined mower-conditioner in that it can be constructed in a relatively lightweight and simple manner at a width tailored to suit any mower and provides a loosely structured swath or windrow with good resistance to settling. Any type of cutter device, including drum, disc, belt and reciprocating bar cutters, can be employed subject only to providing a cut crop capable of being conditioned by the crop-conditioning device.

Consideration will now be given to various preferred or optional features of the invention which may be particularly applicable with regard to the said second and third main aspects of the invention, in which the crop engaging elements on at least one of the rotors are arranged in elongate formations, either transverse to the direction of crop flow, or in circumferential formations transverse to the axis of rotation of the rotor.

There may be provided a crop engaging device for conveying and/or treating crop, comprising support means, a plurality of outwardly extending crop engaging elements mounted on the support means for engaging crop flowing past, or conveyed, by the device, each crop engaging element having a principal plane which traverses the general direction of crop flow, each crop flow engaging element being formed of stiff resilient material and being arranged to be yieldable preferentially in a selected preferred direction relative to the general direction of crop flow, the said preferred direction of yielding including at least a component along the direction of principal load on the element due to the crop flow, each crop engaging element being yieldable at least predominantly by yielding movement at a region spaced from the distal, crop-engaging, region of the element, and the yielding arrangement having sufficient stiffness for the elements to be capable of returning after yielding to their undeflected dispositions at least predominantly by virtue of the resilience of the yielding arrangement.

The yielding of the crop engaging elements may be due to the resilient nature of the material from which the elements are formed, or may be due to an additional yielding arrangement by pivoting, springing or otherwise, or may be due to a combination of such yielding effects.

The elements may be returned after yielding to their undeflected dispositions by a combination of the yielding arrangement together with centrifugal force.

The invention finds particular application where the crop engaging elements are formed of thick stiff resilient and generally flat material (for example thick stiff resilient sheet-like material), conveniently of synthetic plastics material.

The shape of each crop engaging element may vary between a rib-like element extending transversely across the direction of crop flow to a greater extent than it extends outwardly from the support means, for example in the form of an elongate sheet-like member extending across the width of a crop-flow channel. Alternatively each crop engaging element may comprise an outwardly directed fin-like element extending outwardly from the support means to a greater extent than it extends transversely across the direction of crop flow.

In general the device in this aspect finds application in four main forms, as follows:

(i) a crop engaging device in which the yielding movement of the crop engaging element is provided by a separate mounting means mounting the crop engaging element onto a support, i.e. a rotor, such a form being provided for example by a flexible sleeve in which an outwardly directed fin is mounted;

(ii) a crop engaging device in which each crop engaging element comprises an outwardly extending fin in which the plane of the fin is twisted over part of the extent of the fin, the twist of the fin providing a region capable of the required yielding movement;

(iii) a crop engaging device in which each crop engaging element is a flat outwardly directed element generally transverse to the direction of crop flow, and in which the thickness of the flat element is reduced at or near the region where the element is secured to a support such as a rotor support; and (iv) a crop engaging device in which each crop engaging element comprises a relatively wide generally flat rib (for example a sheet-like member) extending a substantial distance transverse to the direction of crop flow and secured to a support by means allowing a pivoting or rocking motion of the entire sheet-like rib against a spring securing means.

In one aspect the invention may be considered as embracing outwardly directed crop engaging elements ranging in width from a wide sheet-like rib across the width of a crop-flow channel, to a series of outwardly extending fins having a greater outwardly extending length than width transverse to the direction of crop flow, in which where the elements are of greater width, more provision must be arranged for separate yielding means such as pivoting and spring like arrangements to allow a relatively stiff wide rib to pivot, and where the elements tend towards individual outwardly directed fins, less provision need be made for springing and pivoting arrangements, and more yielding effect may be provided by the inherent resilience of the elements themselves.

There will now be set out a number of specific features in accordance with this aspect of the invention which may be preferred or convenient in putting the invention into use.

The said principal plane of each engaging element of the device preferably traverses the general direction of crop flow at an angle in the range 30° to 90°. In some arrangements the said angle may be about 45°, and in others the said angle may be about 90°.

The said preferred direction of yielding of each crop engaging element of the device may be inclined to the direction of principal load on the element due to crop flow at an angle in the range 0° to 45°, and it is preferred that in many arrangements, for example where the elements are wide transverse rib-like elements, that the preferred direction of yielding lies generally along the direction of principal load on the element due to crop flow.

In one particularly preferred form, each crop engaging element of the device may be mounted in and secured to a flexible sleeve, the sleeve being fixedly secured to the said support means of the device and being arranged to allow yielding of the element by flexing of the sleeve.

Conveniently, the crop engaging element may be a generally flat element, and the element may be secured to the sleeve by a first coupling member, such as a bolt, which passes through the sleeve and deforms the sleeve by compressing the walls of the sleeve against the element, the sleeve being secured to the said support means of the device by a second coupling member, such as a further bolt, which passes through the sleeve and deforms the sleeve by compressing the walls of the sleeve against the support means, the said preferential yielding of the crop engaging element being achieved by virtue of the deformation of the sleeve by at least one of the coupling members, usually by a combination of the deformation produced by both coupling members.

In accordance with a further feature, the sleeve may be flattened in a first plane in the region of the said support means of the device by virtue of the securement of the sleeve to the support means, and may be flattened in a second plane in the region of the element by virtue of the securement of the sleeve to the element, the said first plane being inclined relative to the second plane in a disposition equivalent to rotation about an axis generally along the length of the sleeve.

Turning to an alternative general form of the yielding arrangement, each crop engaging element may be secured to the support means of the device by a coupling member, such as a bolt, which allows movement between the element and the support means, for example by the bolt being a loose fit in a hole through the element, there being provided resilient biassing means, such as a spring or flexible bush or washer, which biasses the element towards an outwardly extending operating position, the arrangement allowing yielding of the element by rocking or pivotting movement of the element relative to the support means against the action of the biassing means.

Conveniently, where the element is a generally flat element, the element may be secured to a cooperating flat surface of the support means by the said coupling member, which is arranged to pass through the element, the said resilient biassing means acting to bias the element towards the flat surface and the element being yieldable by a rocking motion away from the flat surface against the effect of the biassing means.

In yet another form of the yielding arrangement, the said preferential yielding of each crop engaging element may be provided by virtue of variation in shape and/or thickness of the element. For example, where each element is a fin-like element having a length in the outward direction from the support means greater than its width transverse to the direction of crop flow, the plane of the fin-like element may be twisted over part of the extent of the element, the twist of the element providing a region capable of a yielding movement which differs directionally from that inherent in the base and tip regions of the element. In another example, each crop engaging element may be a generally flat element having a reduced thickness at or near the region where the element is secured to the support means, the region of reduced thickness providing a required yielding movement.

Where a crop engaging device according to the invention takes the form of a conditioning device, one advantage is that more effective conditioning can be provided by the selective yielding of the elements in a predetermined direction. The conditioning effected can be more severe than has previously been thought to be acceptable, but such severe conditioning is now thought to be acceptable firstly because of good crop alignment which can be achieved with devices according to the invention, which tends to provide longitudinal lesions in the crop rather than fragmentation, and secondly it is thought that fragmentation is more acceptable due to more efficient crop pick-up by pick-up rotors embodying the present invention.

Another considerable advantage of the present invention lies in the balance between providing adequate protection for the crop engaging elements by allowing yielding in the face of objects more solid than the crop, whilst at the same time retaining the crop engaging elements in the outwardly extended operational position without the need to rely upon centrifugal force. Crop engaging rotors which rely upon centrifugal force to maintain the crop engaging elements in the operative position tend to require fast speeds and, consequently, high power consumption from drive devices. Moreover, the risks of propelling extraneous objects and causing injury and damage are greater.

Another advantage which arises with devices embodying the inventive concepts of the present specification is that there may be provided crop engaging elements of a flat or planar nature in which the principal plane of each element is inclined to the general direction of crop flow.

In accordance with the invention in this aspect, there may be provided a crop engaging device for conveying and/or treating crop, comprising support means, a plurality of outwardly extending crop engaging elements mounted on the support means for engaging crop flowing past, or conveyed by the device, each crop engaging element being a generally flat element formed of stiff resilient material and each element having a principal plane which traverses the general direction of crop flow, each element being arranged to be presented to the crop with its principal plane inclined to the direction of crop flow in such a manner as to impart a lateral movement to crop flowing past or conveyed by the device.

Conveniently the said principal plane of each element traverses the general direction of crop flow at an angle in the range 30° to 60°, for example an angle of about 45°.

In some arrangements a number of succeeding elements presented to the crop along the direction of crop flow have the same sense of inclination, so as to impart an overall movement laterally to crop engaged by the device, or alternatively succeeding elements, or grous of elements, presented to the crop along the direction of crop flow may have alternating directions of inclination so that the overall effect on the crop is merely to move it to and fro laterally without significant overall lateral displacement.

The invention in this aspect has particular application where the device is in the form of a rotor. The principal plane of each crop engaging element may have the required inclination by being inclined to that plane which contains the general direction along which the element extends outwardly, and which contains or is parallel to the axis of rotation of the rotor. It may be arranged that in respect of each element the general direction along which the element extends outwardly lies along a radius of the axis of rotation of the rotor and the principal plane of the element is inclined to a plane containing the said radius and containing the said axis of rotation.

In the aspect being considered, the invention has particular application where each element is a fin-like element having a length in the outward direction from its base greater than its width transverse to the direction of crop flow. In some arrangements the plane of the fin-like element may be twisted over part of the extent of the element.

Each of the inclined crop conveying elements of the device may be mounted in and secured to a flexible sleeve, the sleeve being fixedly secured to the said support means of the device and being arranged to allow yielding of the element by flexing of the sleeve, the said sleeve being flattened in a first plane in the region of the base by virtue of the securement of the sleeve to the support means, and being flattened in a second plane in the region of the element by virtue of the securement of the sleeve to the element, the said first plane being inclined relative to the second plane in a disposition equivalent to rotation about an axis generally along the length of the sleeve, the element being secured to the sleeve by a first coupling member which passes through the sleeve and flattens the sleeve by compressing the walls of the sleeve against the element, and the sleeve being secured to the support means by a second coupling member which passes through the sleeve and flattens the sleeve by compressing the walls of the sleeve against the base.

As is the case with most embodiments of the present invention, it is preferred that each element is formed from thick, stiff, resilient, and generally flat, sheet like material, preferably synthetic plastics material.

In some preferred arrangements each element extends outwardly substantially radially of a rotor, although in other arrangements the element may be inclined to a radius of the rotor.

Optionally the outer end of each element may be serrated. The outer ends may be terminated in a surface generally perpendicular to the longitudinal axis of the fin, or in a surface inclined to the longitudinal axis of the fin, or may be terminated in an arrow shaped point.

In one aspect of the invention, the shape of the outer end of a crop engaging element provides an independent inventive feature which finds application whether or not applied in combination with other features of the invention.

In accordance with this aspect of the invention there is provided a crop engaging device for conveying and/or treating crop, comprising support means, a plurality of outwardly extending crop engaging elements mounted on the support means for engaging crop flowing past, or conveyed by the device, each crop engaging element being a generally flat element formed of stiff resilient material and each element having a principal plane which is aligned so as to include at least a component along the general directions of crop flow, each element having a profile which includes at the outer end of the element, at least at the leading edge of the element, a series of steps, the element being presented to the crop with each succeeding step in the series positioned at a greater distance from the base of the element than the preceding step.

Preferably the series of steps extends across the whole of the width of the element, leading from one edge of the element to the other, and conveniently the steps are in the form of saw tooth serrations.

This aspect of the invention has particular application where the said principal plane of each element is inclined to the general direction of crop flow at an angle less than 60°, and often the principal plane of the element will be aligned along the general direction of crop flow. Also this aspect is particularly applicable where each element comprises a fin-like element extending outwardly from the base to a greater extent than it extends transversely across the direction of crop flow.

A crop engaging rotor such as has been set out finds application in a number of fields, for example as a pick-up rotor for picking up cut crop from the ground, and/or as a crop conditioning rotor for effecting conditioning of crop by surface damage to the crop. Such a rotor may be used in isolation or in co-operation with other rotors of the same type, or in co-operation with other conditioning or conveying rotors, or with stationary guide vanes or other crop engaging devices.

It may be arranged that only one of the rotors of the present invention has sharp outwardly directed tips, or each of the rotors may have sharp outwardly directed tips on the outer ends of the crop engaging elements thereof.

Conveniently one of the rotors may be regarded as a crop treatment rotor and the other rotor can be regarded as a feeding rotor. In one preferred form, each elongate formation on the feeding rotor is formed by a single crop engaging rib-like element, for example which consists of a single sheet of stiff resilient material, conveniently synthetic plastics material. Optionally the distal edge of each crop engaging element on the feeding rotor is serrated or otherwise shaped to assist engagement of crop by the element.

Conveniently the first rotor may comprise a brushlike structure and in one form such a conditioning rotor may consist of a brush of synthetic plastics brush elements. However it will be appreciated that other forms of crop treatment elements may be used, for example each crop treatment element may comprise an outwardly directed elongated fin of sheet material, having the plane of the sheet material generally transverse to the direction of crop flow.

The orientation of the elongate formations on the or both rotors may vary, but embodiments divide generally into two forms, according to whether the elongate formations on the rotors are substantially transverse formations generally along the direction of the axes of rotation of the rotors, or are substantially circumferential formations formed generally in planes transverse to the axis of the rotor, conveniently at right angles to the direction of the axis of the rotor, although in some cases the elongate formations on one rotor may be at right angles to the axis of the rotor, but the elongate formations on the other rotor may be inclined at an angle to the perpendicular to the axis of the rotor. In some embodiments the crop engaging elements may be arranged in rows on one rotor, but may be arranged less uniformly on the other rotor, provided that there are provided appropriate gaps between the crop engaging elements for the required inter-meshing of the two rotors.

Where the said elongate formations on the rotors are substantially circumferential formations formed generally in planes transverse to the direction of the axes of the rotors, it is particularly preferred that the feeding rotor comprises a plurality of disc like members spaced apart along the axis of the rotor, each disc like member forming one of the said elongate formations of the feeding rotor.

In accordance with a further aspect of the present invention, there may be provided apparatus for treating crop comprising two rotors positioned opposite each other and mounted for counter rotation about parallel axes for passage of crop between the rotors, each rotor having a plurality of outwardly extending crop engaging elements, one rotor comprising a plurality of disc-like elements, constituting the crop engaging elements of that rotor, positioned generally transverse to the axis of rotation of the rotor and spaced apart along the length of the rotor, and a central core of the rotor on which the disc-like elements are mounted and which is of sufficient size to prevent significant wrapping of crop around the core, the rotors being positioned sufficiently closely for one of the rotors to press crop against the other rotor to effect treatment of the crop.

It may be arranged that each, or only one, of the rotors comprises a series of disc-like elements as set out above. Each element on the said other rotor may comprise a fin-like element extending outwardly from the base to a greater extent than it extends transversely across the direction of crop flow, or alternatively the other of the two rotors may be a brush-like structure of the kind set out with regard to other aspects of the invention.

The crop engaging elements on the said other rotor may be arranged in some preferred forms in one or more helical or part helical formations leading around and along the rotor.

Although the crop engaging elements have been referred to as disc-like elements, the outer circumference is not necessarily circular. For example each disc-like element may have an outer perimeter in the general shape of a polygon. Also each disc-like element may be serrated or otherwise shaped to assist engagement of crop by the disc-like element. Furthermore each disc-like element may have a relative shallow depth outstanding from the core, so that the disc-like elements are constituted by annular ring-like elements, and the term disc-like is to be taken to include such elements.

Preferably the rotors are positioned sufficiently closely for the outer perimeters of the rotors to overlap with disc-like elements on one rotor intruding into gaps between crop engaging elements on the other rotor.

Preferably the disc-like elements are positioned perpendicular to the axis of the rotor, and are formed of stiff resilient material, conveniently synthetic plastics sheet material. Such a crop engaging rotor finds application in a number of fields, for example as a pick-up rotor for picking up cut crop from the ground, and as a crop conditioning rotor for effecting conditioning of crop by surface damage to the crop. Such a rotor may be used in isolation or in co-operation with other rotors of the same type, or in co-operation with other conditioning or conveying rotors.

In some arrangements, the spacing between adjacent disc-like elements varies across the width of the rotor, the disc-like elements being closer together at regions of the apparatus at which in operation the volume of crop flow is greatest.

Considering again the invention in its second main preferred aspect, at least one of said rotors may comprise a plurality of outwardly extending crop engaging elements each comprising a rib-like element of stiff resilient material extending along the direction of the rotor axis and lying substantially in a radial plane, in which each rib-like member is yieldable inwardly towards the rotor axis upon encountering an object likely to damage the element or an excessive crop load, and is urged outwardly by bias means to a normal operating position.

In a particularly preferred form, each rib-like element has at its base a widened portion having sloping sides, the base of the rib-like element being captive in a housing which cooperates with the said sloping sides of the rib-like element to centre the rib-like element to a required outwardly directed operating position while allowing the rib-like element to tilt when moved inwardly against the bias means.

It is particularly to be appreciated that the various crop engaging elements and devices set out is accordance with the various aspects of the present invention, may be usefully incorporated as appropriate in the various overall combinations of crop pick-up and crop conditioning machinery which has been set out hereinbefore and/or which is to be set out by way of example hereinafter. It is to be appreciated that there are also provided in accordance with the present invention various methods of conveying and/or treating crop having the various features set about with regard to the apparatus according to the invention.

INTRODUCTION OF DRAWINGS

Embodiments of the invention will now be described by way of example with reference to the accompanying drawings in which:

FIGS. 5, 6 and 7 show side, end and plan views respectively of a modified form of a tuft of conditioning elements forming part of the apparatus shown in the preceding Figures;

Figure 1:
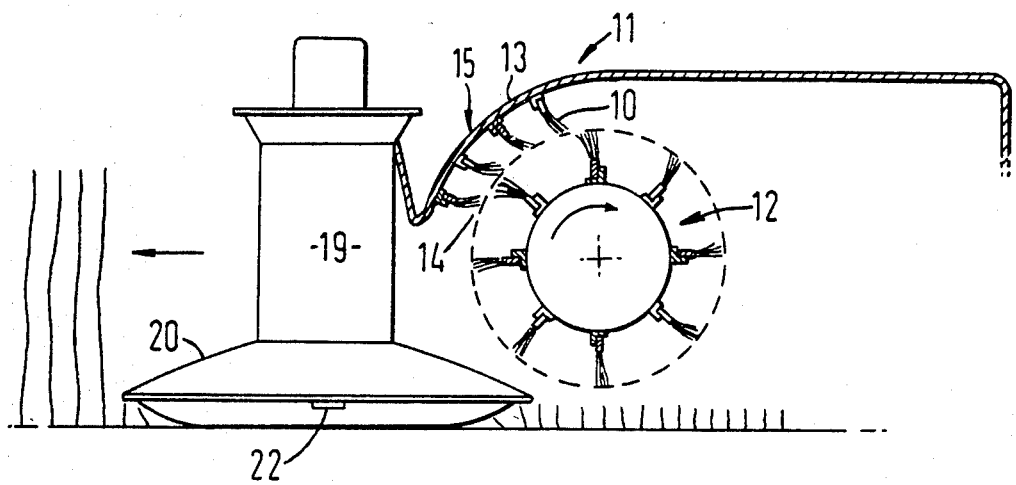
FIG. 1 is a diagrammatic side view of a crop conditioning apparatus embodying the invention.
Figure 2:
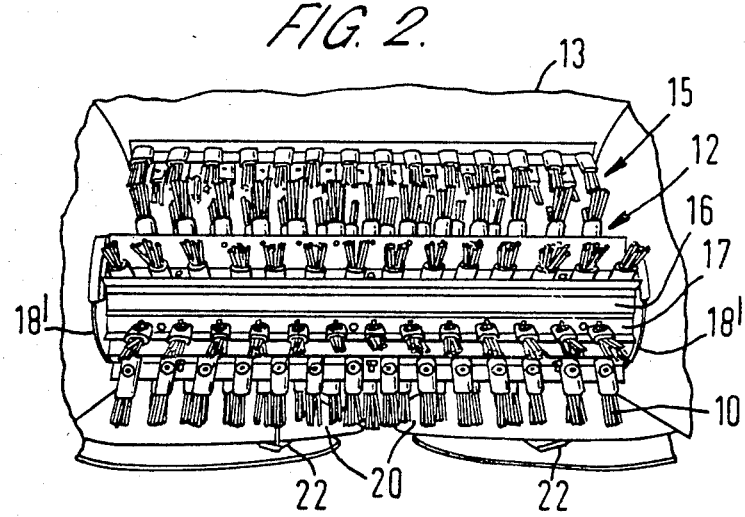
FIG. 2 is a rear view of the conditioning apparatus shown in FIG. 1.
Figure 10:
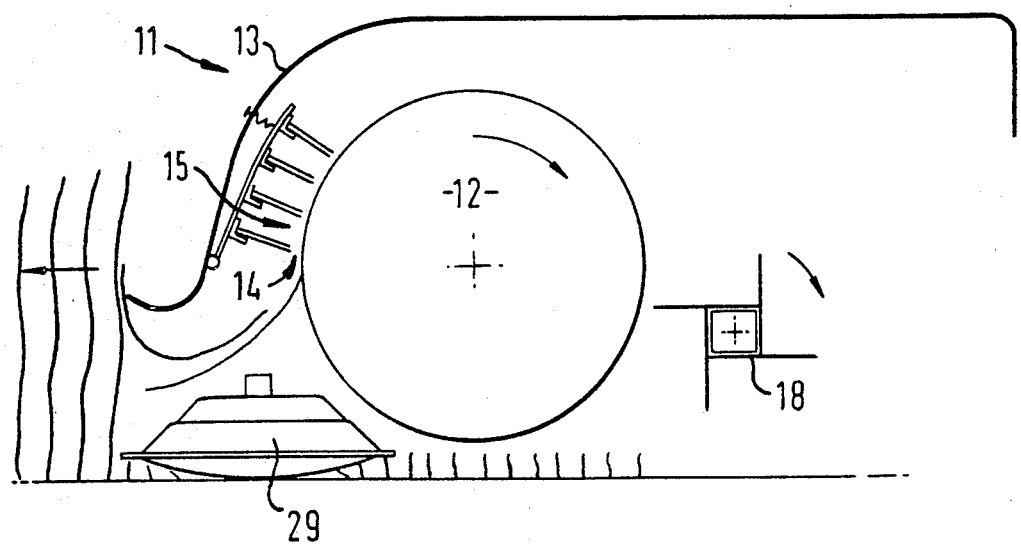
Figure 9A:
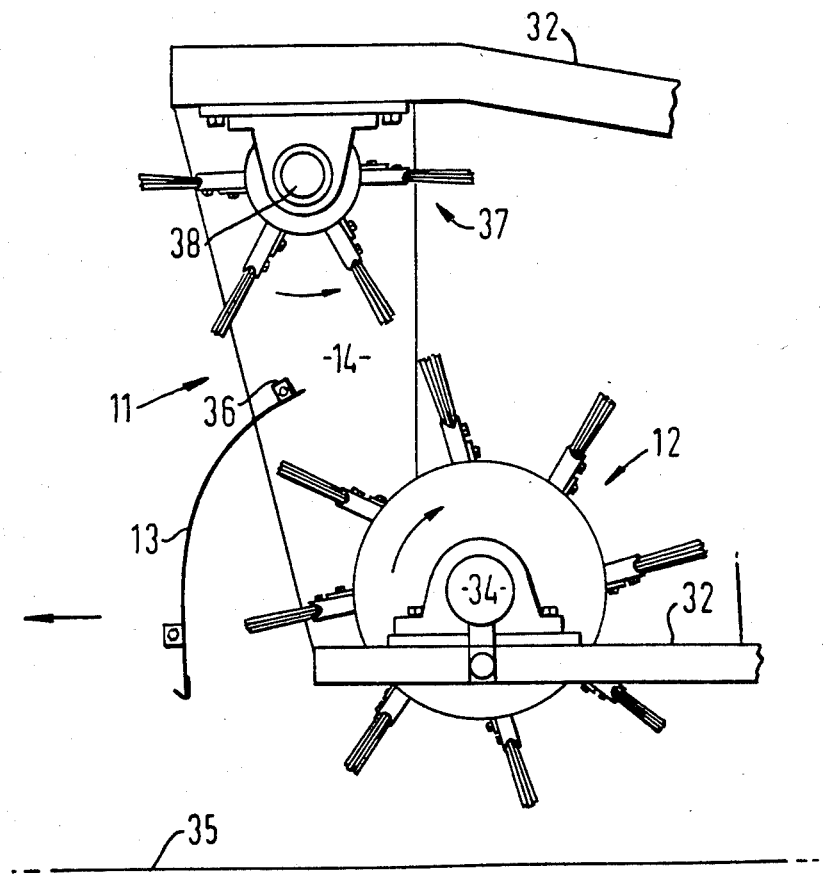
FIG. 9(a) is a side view of a conditioning apparatus embodying the invention including some components previously shown in the aforesaid Figures, but modified by the addition of a second rotary conditioning device.
Figure 9B:
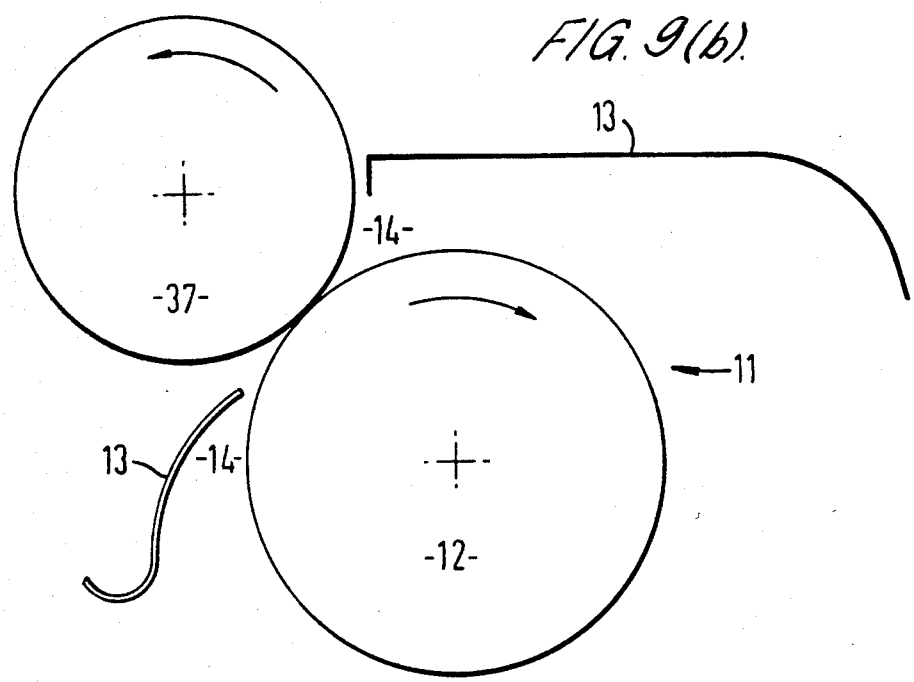
Figure 9C:
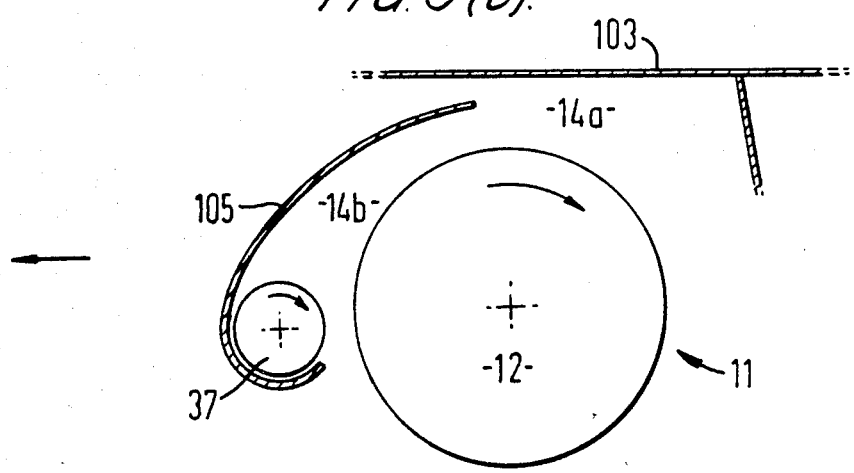
Figure 9D:
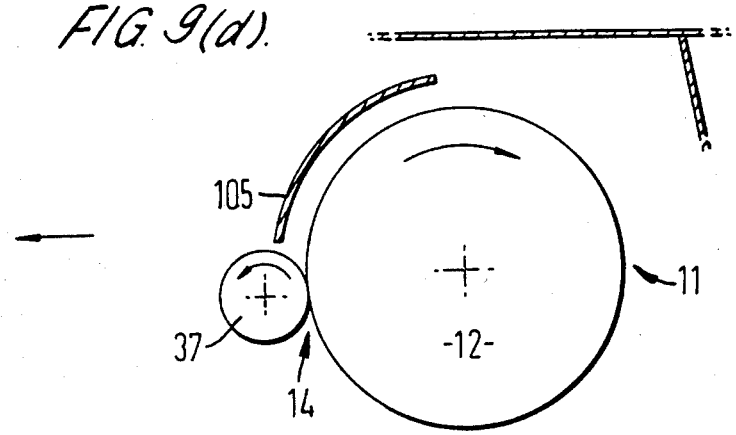
Figure 9E:
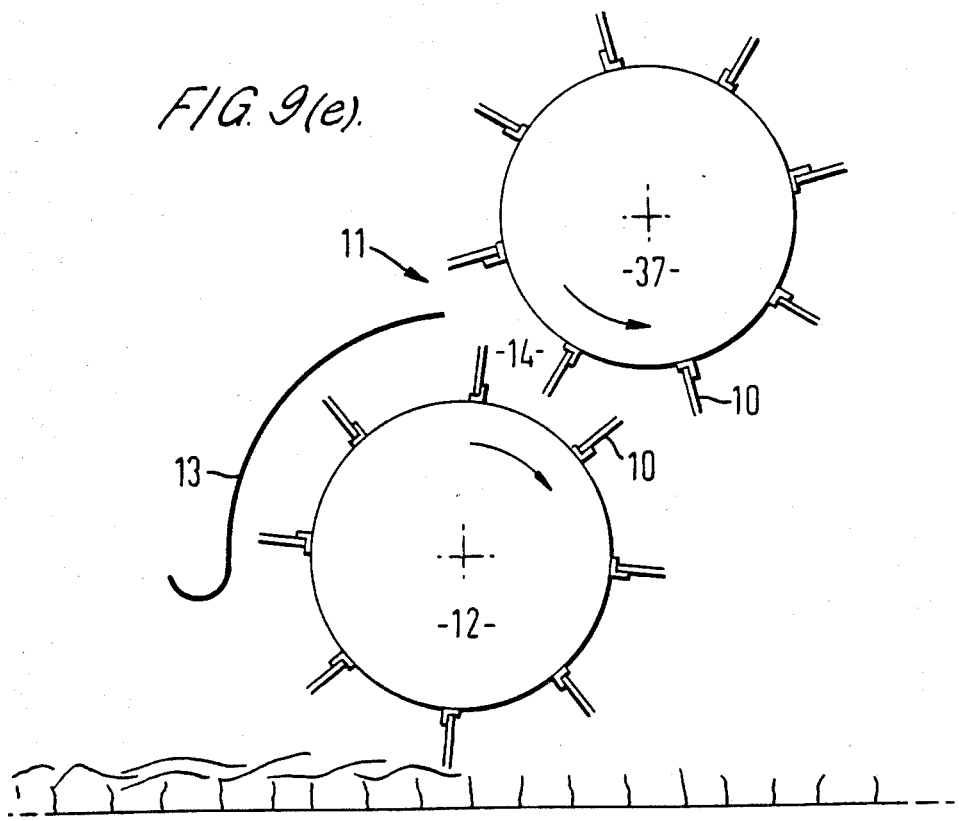
Figure 10A:
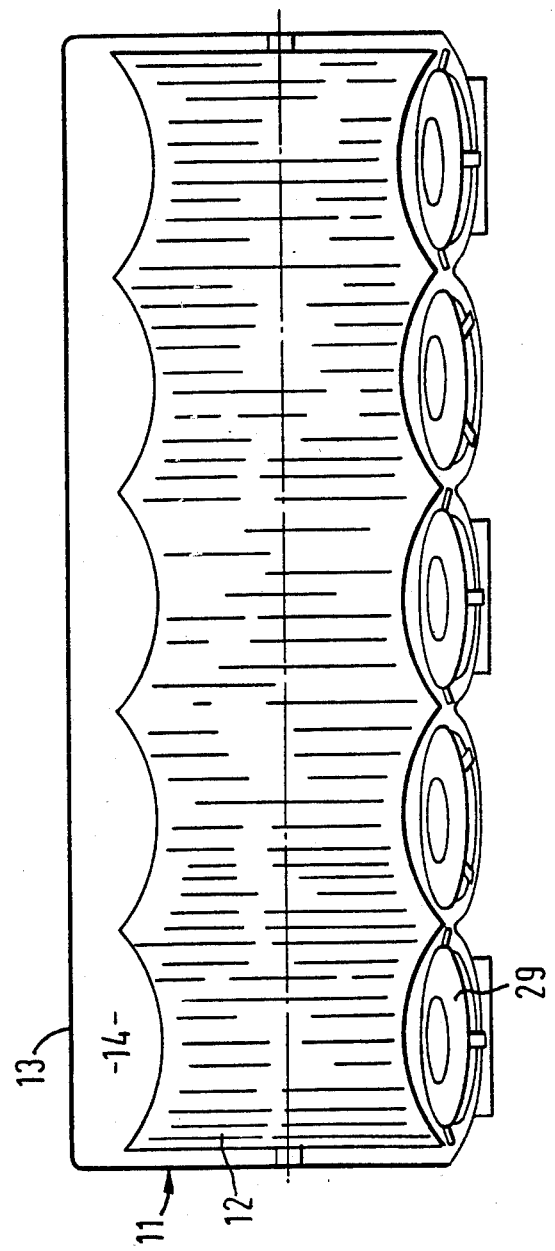
Figure 11:
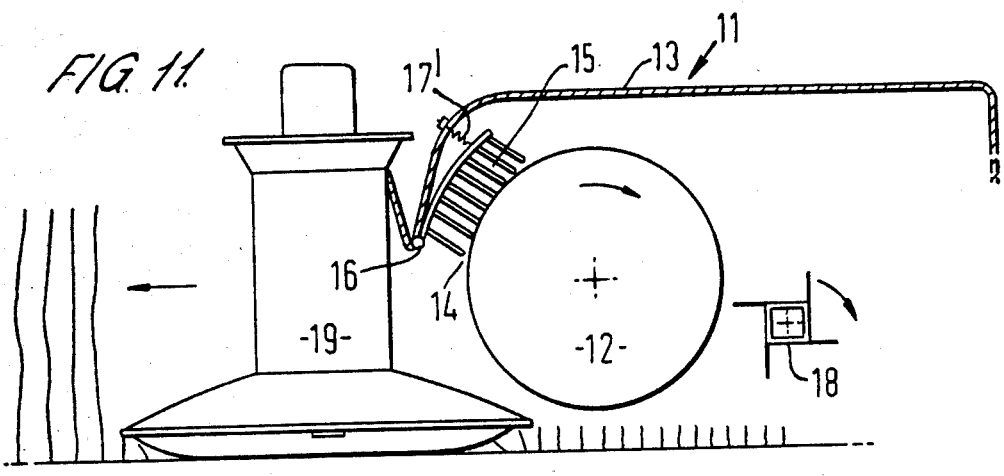
Figure 12:
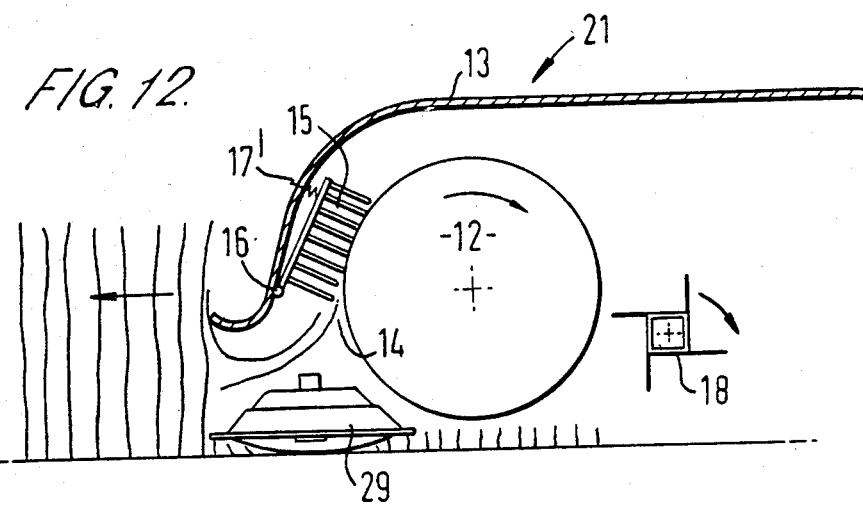
Figure 13:
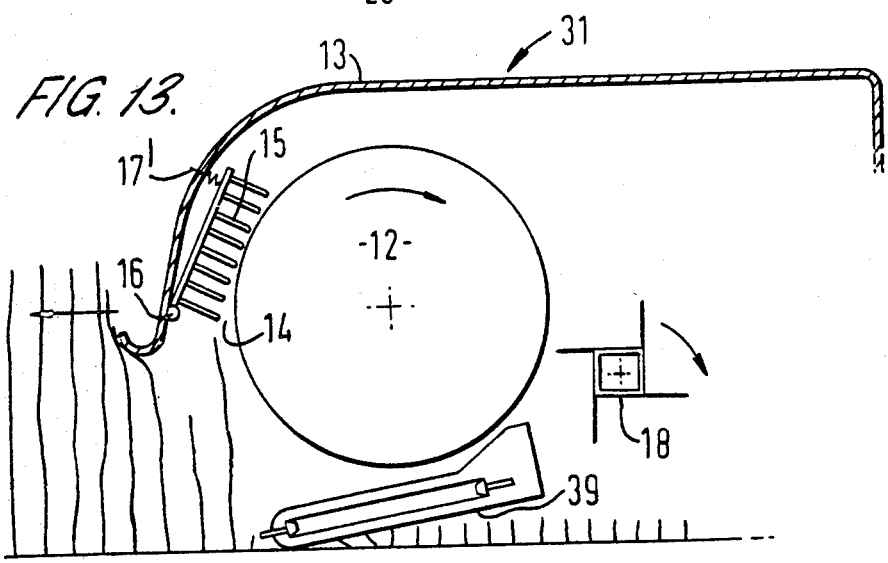
Figure 14A:
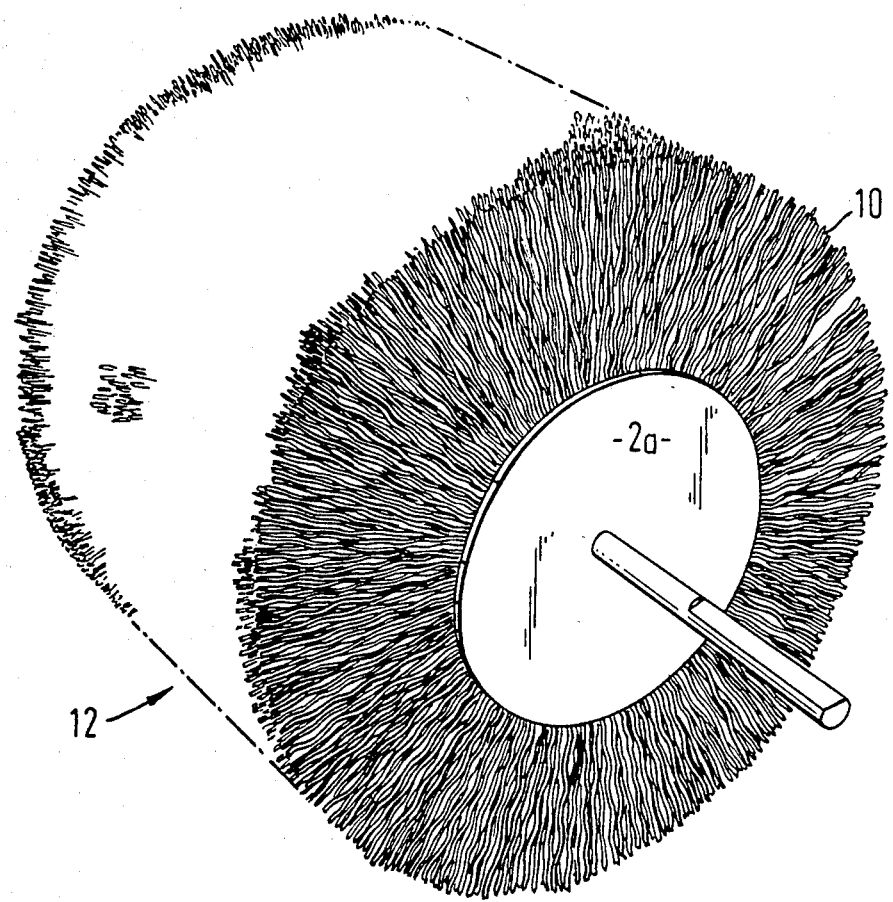
Figure 17:
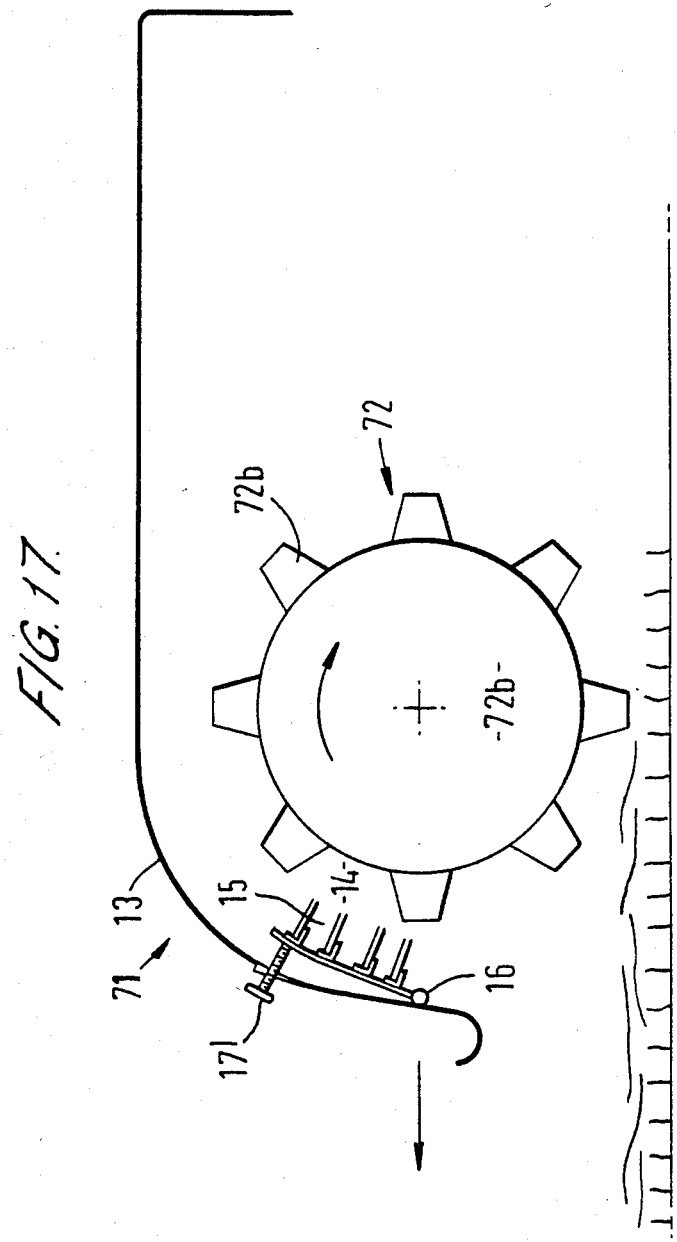
Figure 18:
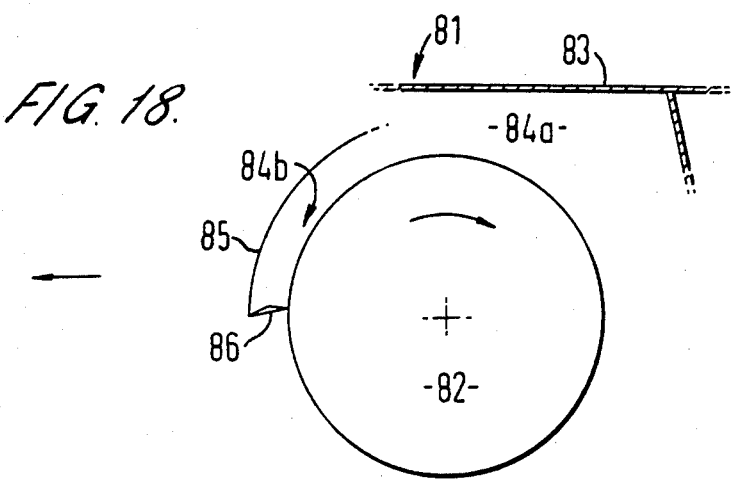
Figure 18A:
Figure 21:
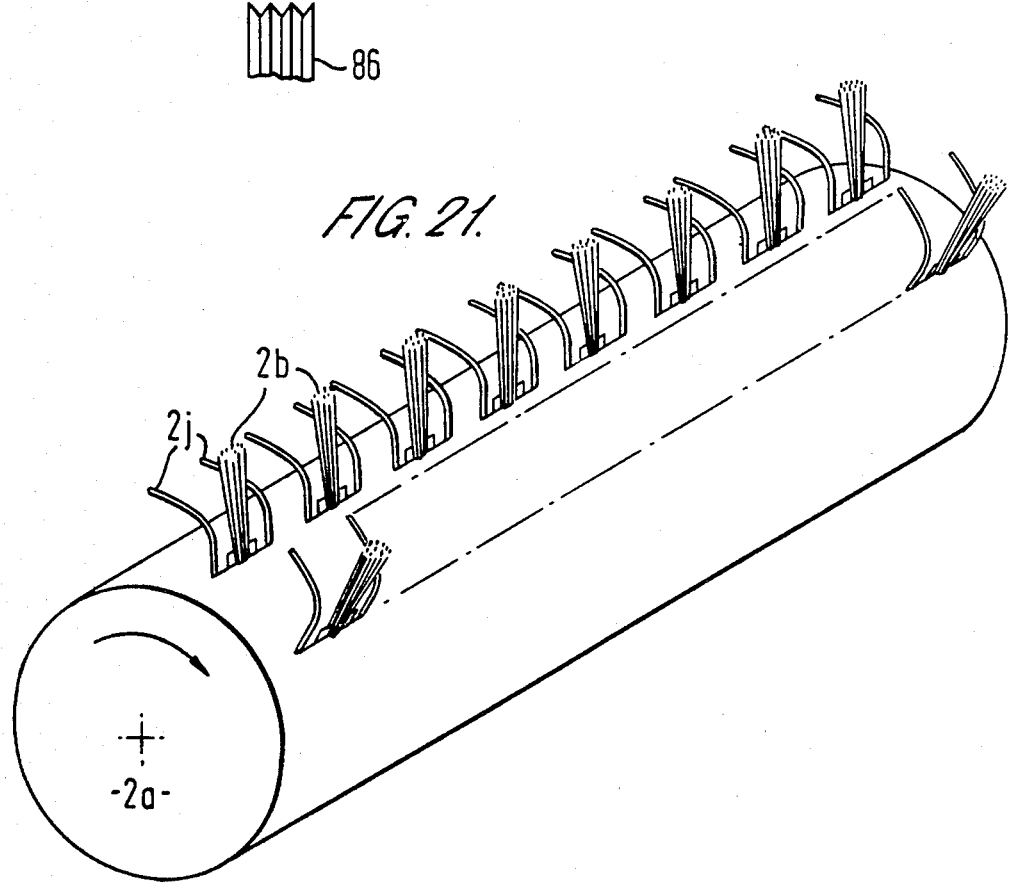
Figure 22:
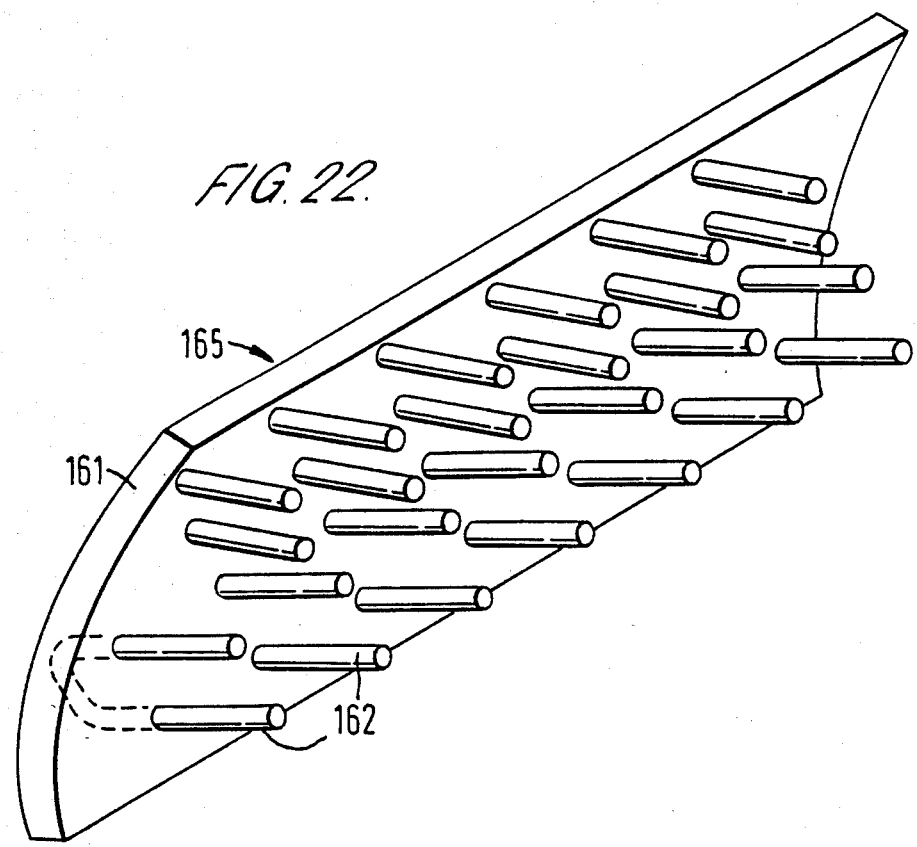
Figure 23:
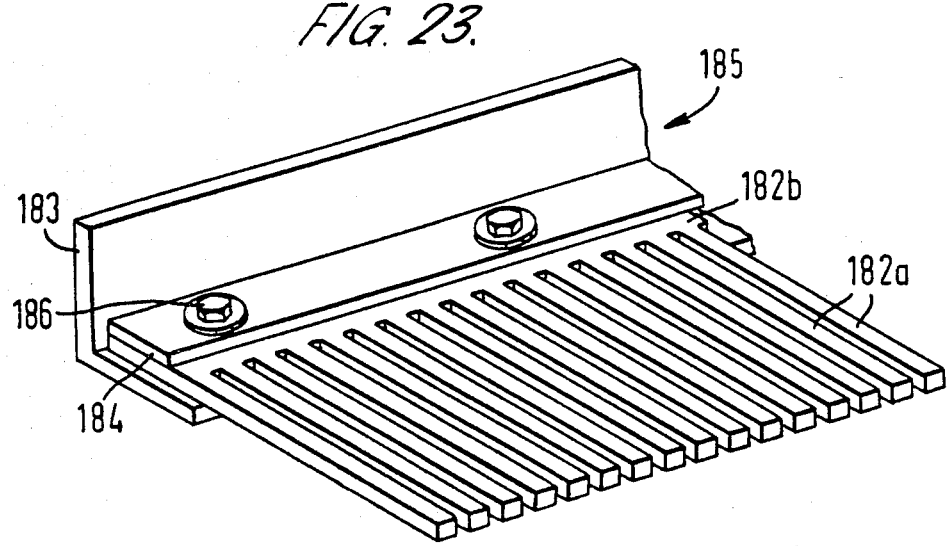
Figure 16:
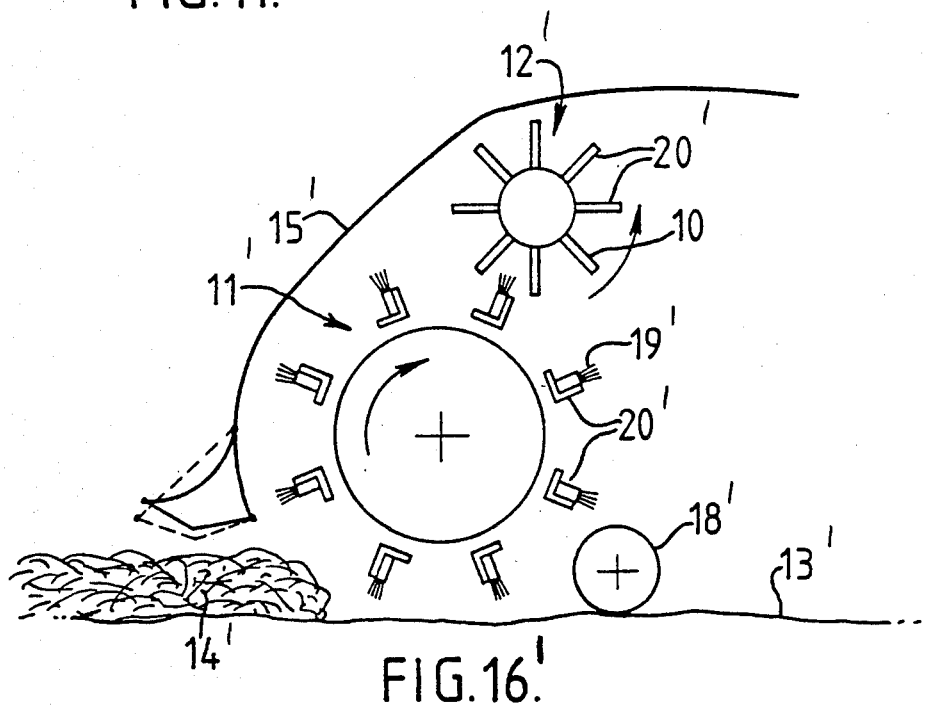
Figure 12:
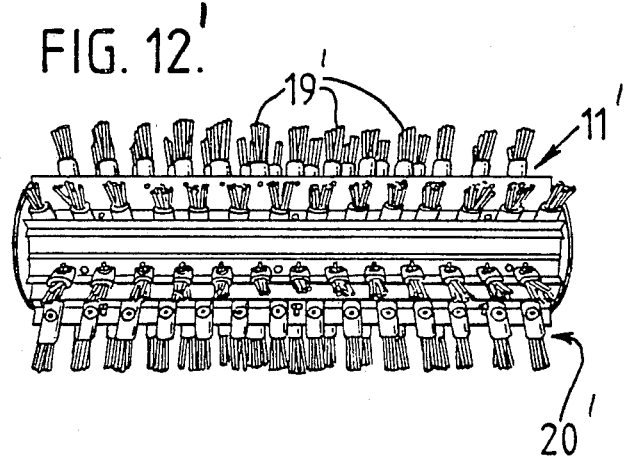
Figure 13:
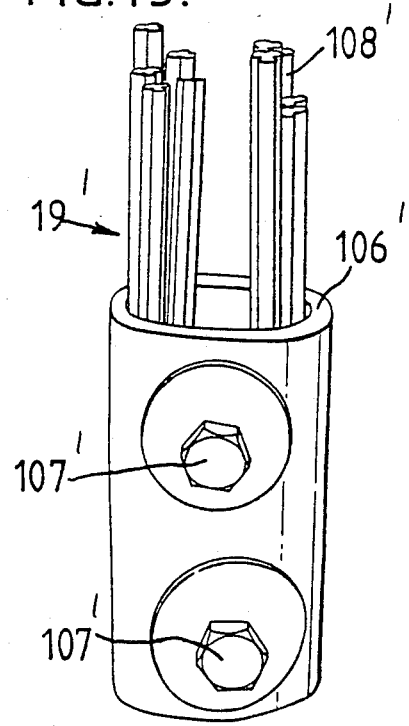
Figure 14:
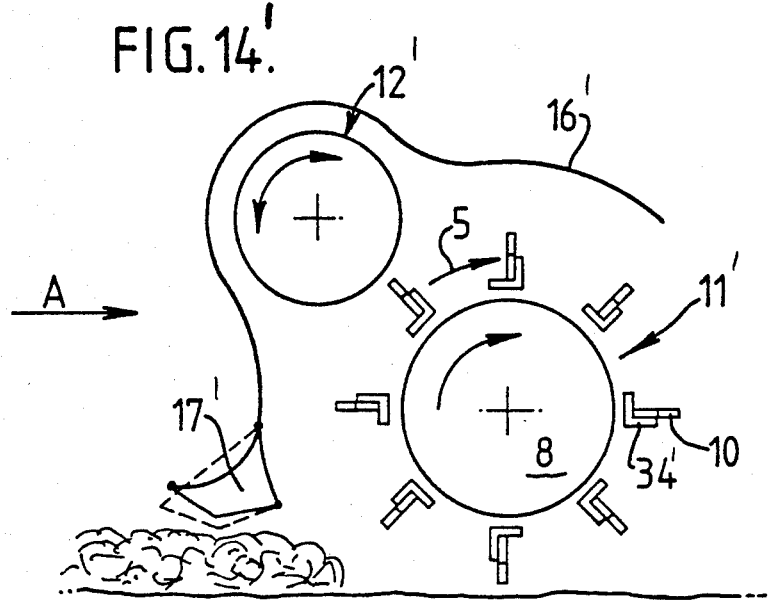
Figure 20B:
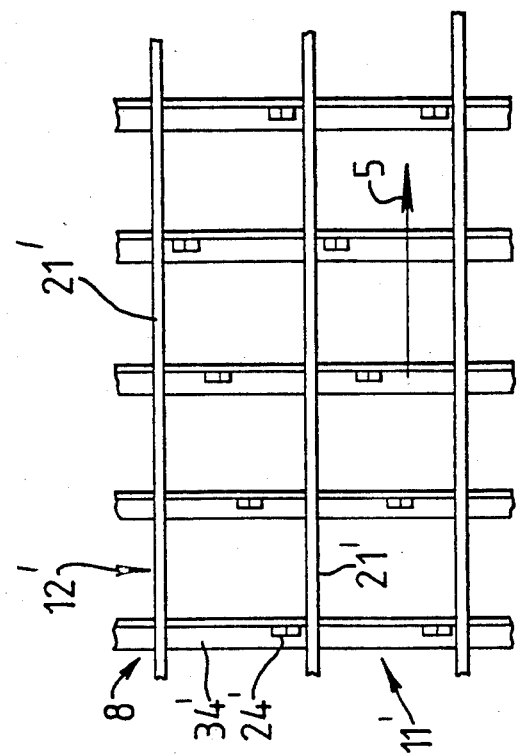
Figure 20A:
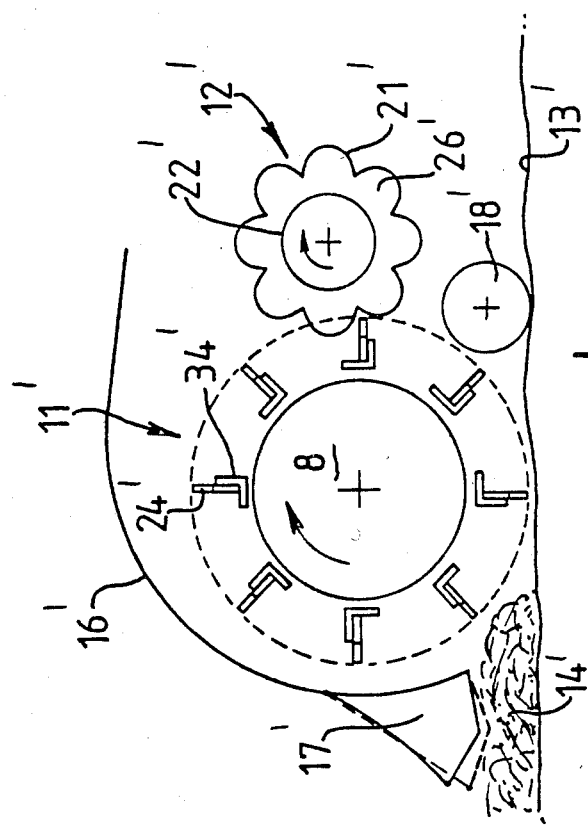
Figure 21:
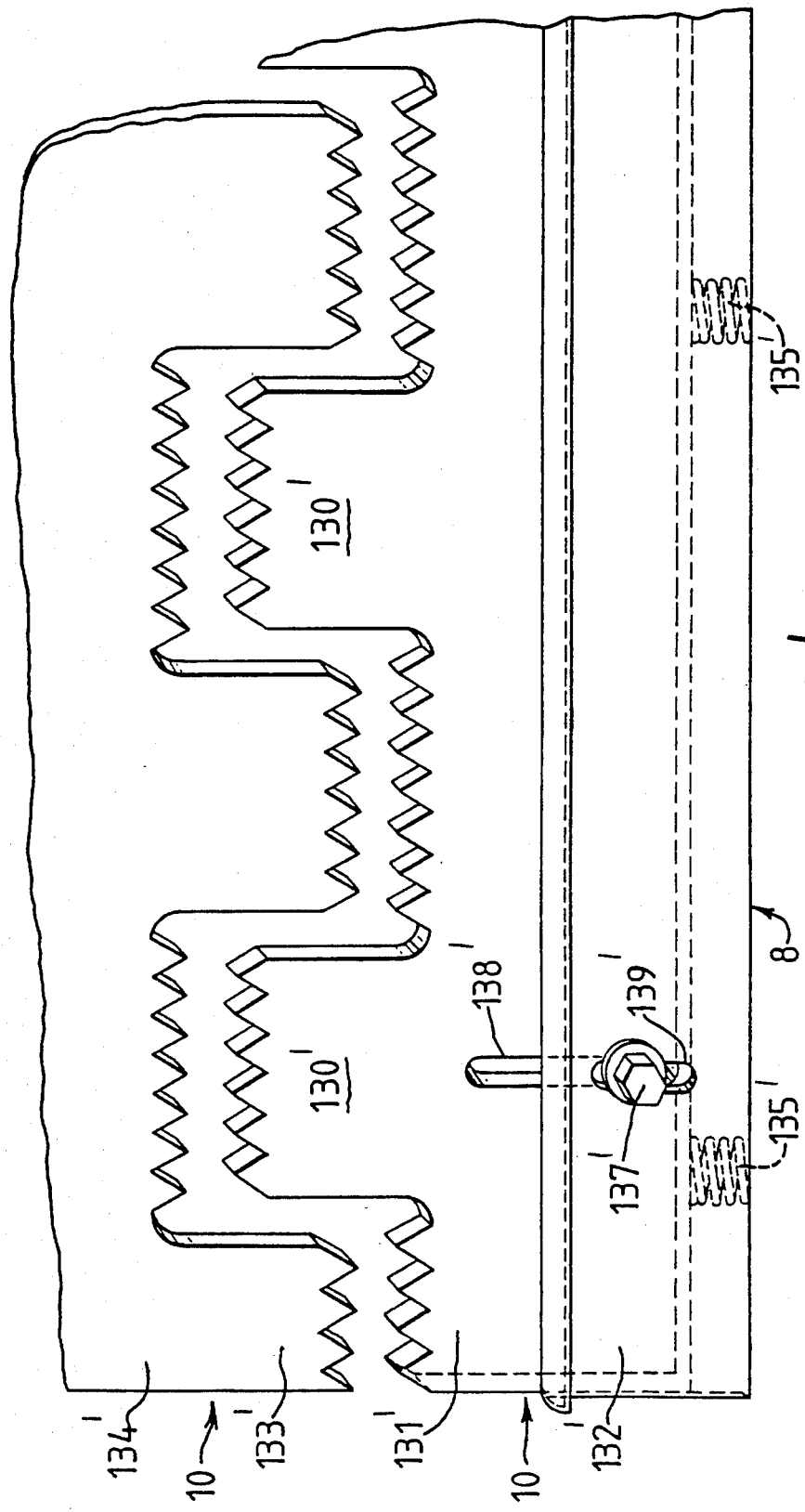
Figure 29A:
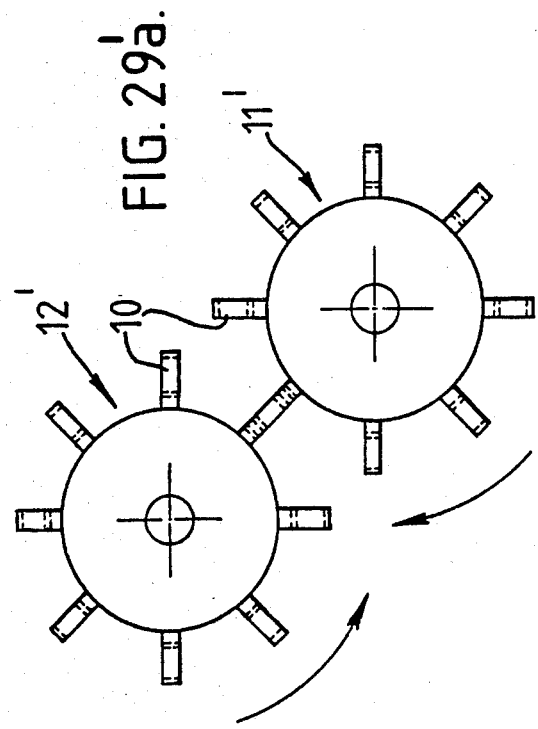
Figure 29B:
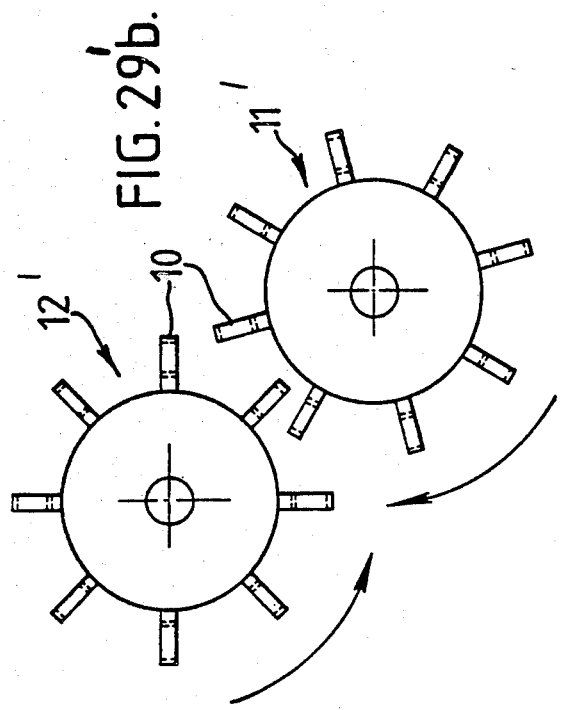
Figure 29C:
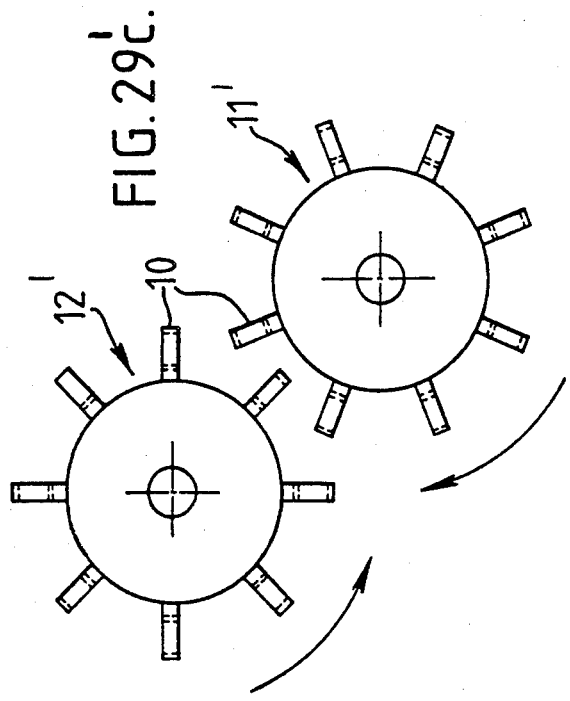
Figure 29D:
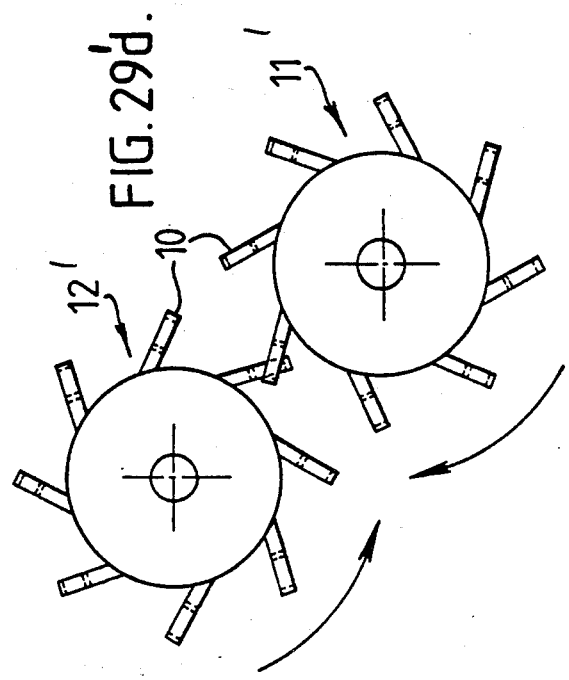

FIGS. 9(b) 9(d) and 9(e) show modifications of the conditioning apparatus shown in FIG. 9(a), in which the position of the second rotary conditioning device is moved and in FIG. 9(c) also has its direction of rotation reversed;

FIGS. 10 and 10(a) are diagrammatic side views of modifications of the conditioning apparatus of FIG. 1, in which disc mowers are used in the apparatus;

FIG. 11 is a diagrammatic side view of a modification of the conditioning apparatus shown in FIG. 1, in which an alternative form of stationary conditioning device is provided;

FIG. 12 is a diagrammatic side view of a modification of the crop conditioning apparatus of FIG. 11 in combination with a disc mower;

FIG. 13 is a diagrammatic side view of a modification of the crop conditioning apparatus of FIG. 12 in combination with a belt mower; FIG. 14 is a diagrammatic side view of a modification of the crop conditioning apparatus shown in FIG. 1 including a brush having a different construction from that shown in FIGS. 1 to 10;

FIG. 14(a) shows a further slightly modified brush of the same general type as the main pick up rotary brush shown in FIG. 14;

FIGS. 15 to 19 are diagrammatic side views of crop conditioning apparatus of further modified forms embodying the invention, FIG. 18(a) showing a detail of an element of FIG. 18;

FIG. 20 is a perspective view of a rotary brush embodying the invention of a kind suitable for use in the apparatus shown in FIG. 16;

FIG. 21 is a perspective view of a further rotary brush slightly modified from the brush shown in FIG. 20;

FIG. 22 shows an alternative conditioning device suitable for use in the embodiments of the preceding Figures;

FIG. 23 shows an alternative brush part which may be used in combination with further similar brush parts in similar manner to that shown in FIG. 22;

FIG. 1'(a) shows in diagrammatic side view apparatus for picking up cut crop from the ground, which may incorporate aspects of the invention;

FIG. 1'(b) shows in diagrammatic side view apparatus for conditioning crop by a single pick-up and conditioning rotor, which may incorporate aspects of the invention;

FIG. 1'(c) shows in diagrammatic side view apparatus for conditioning crop by co-operation of two conditioning rotors, which may incorporate aspects of the present invention;

FIG. 2' is a diagrammatic perspective view from the rear of a single crop engaging element secured to a main support member of a crop engaging rotor, and which forms an embodiment of the invention in one aspect;

FIG. 2'(a) is a diagrammatic plan view of the element shown in FIG. 2'.

Figure 3:
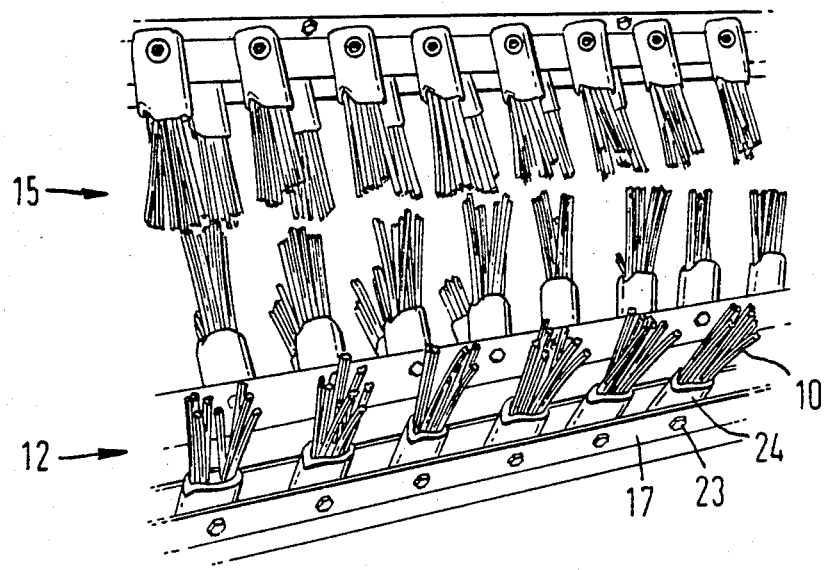
FIG. 3 is a perspective view showing in detail tufts of conditioning elements forming part of the conditioning apparatus shown in FIGS. 1 and 2.
Figure 4:
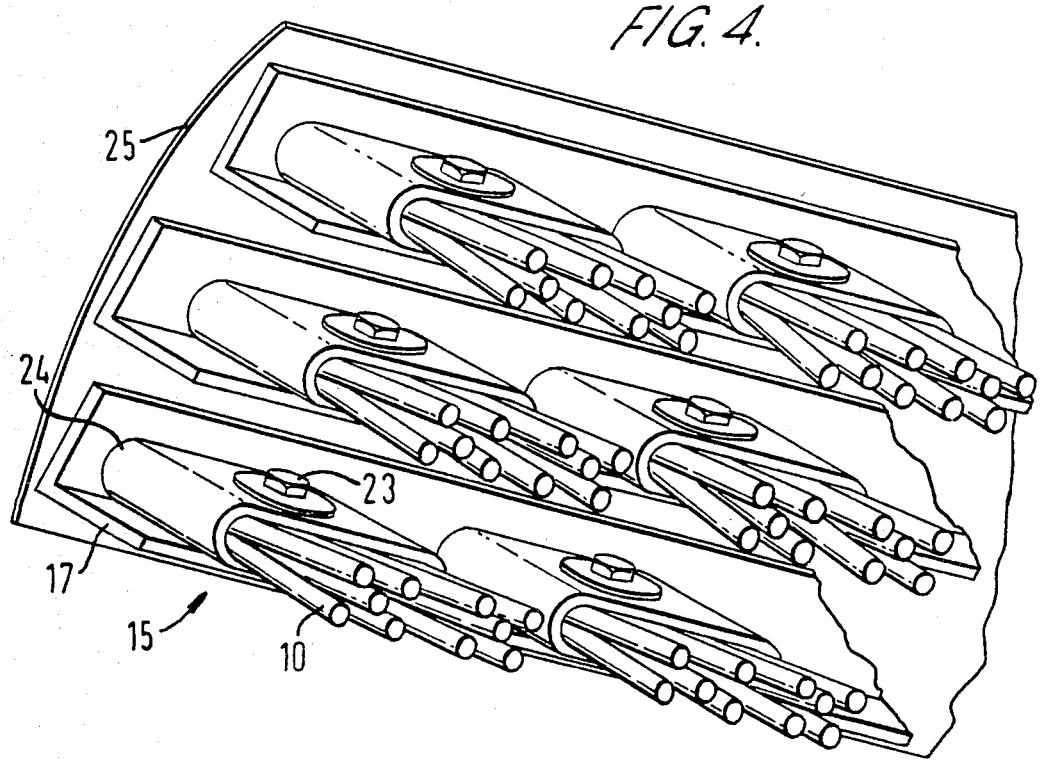
FIG. 4 is a perspective view of the underside of the stationary crop conditioning device shown in FIGS. 1, 2 and 3.
Figure 8A:
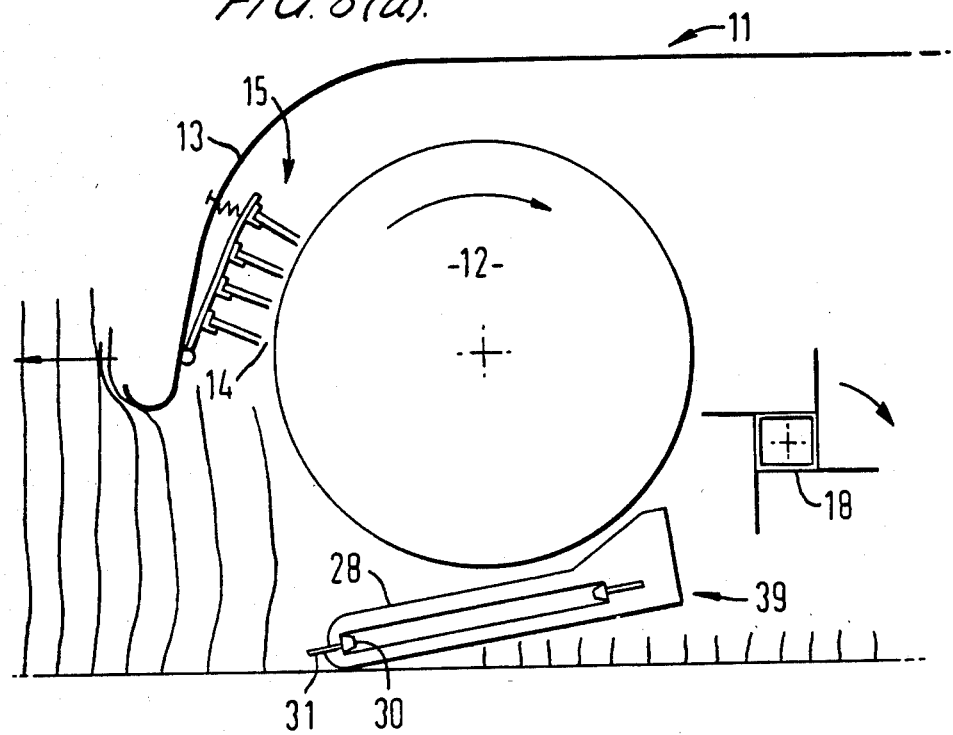
FIG. 8(a) is a diagrammatic side view of a crop conditioning apparatus similar to that shown in FIG. 1 but arranged for use with a belt mower.
Figure 8B:
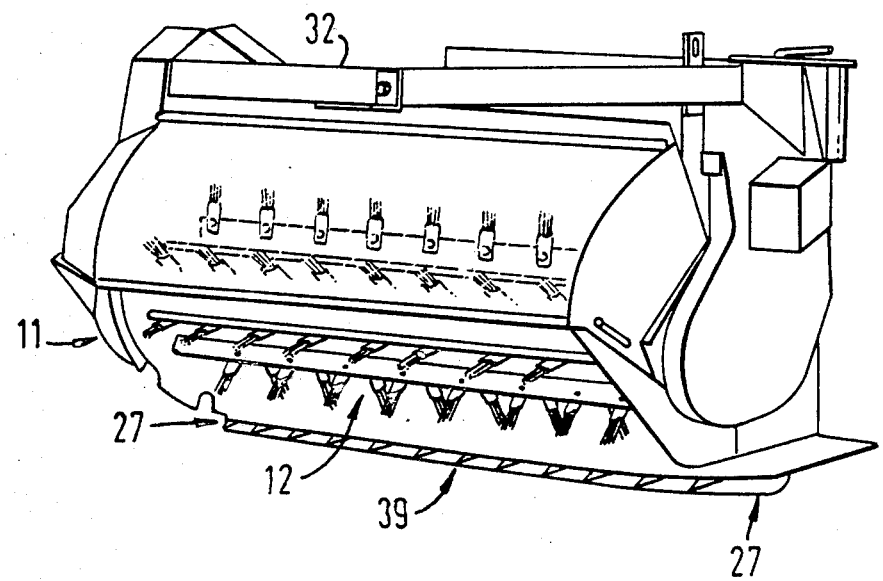
FIG. 8(b) is a front perspective view of the apparatus shown in FIG. 8(a)
Figure 8C:
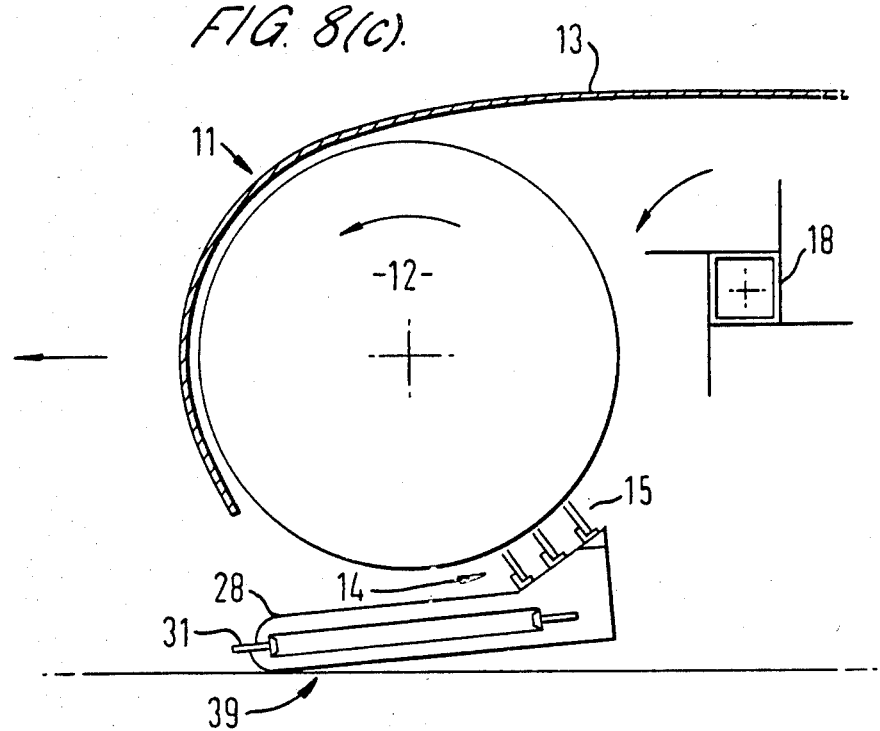
FIG. 8(c) is a diagrammatic side view of a modification of the apparatus shown in FIG. 8(a) the modification including reversal of rotation of a conditioning rotor shown in the apparatus and addition of a crop stripping and flow diverting rotor.
Figure 8:
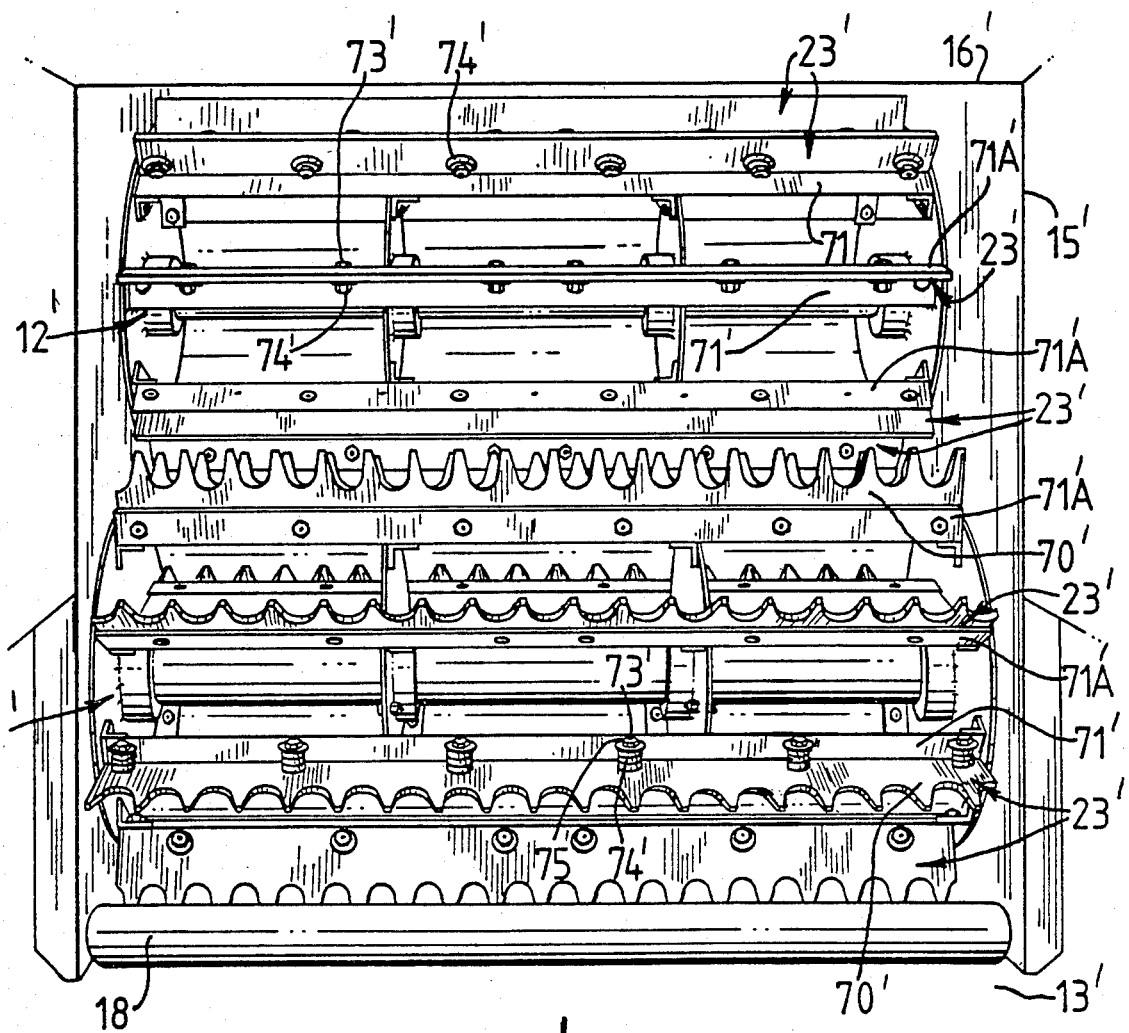
Figure 11:
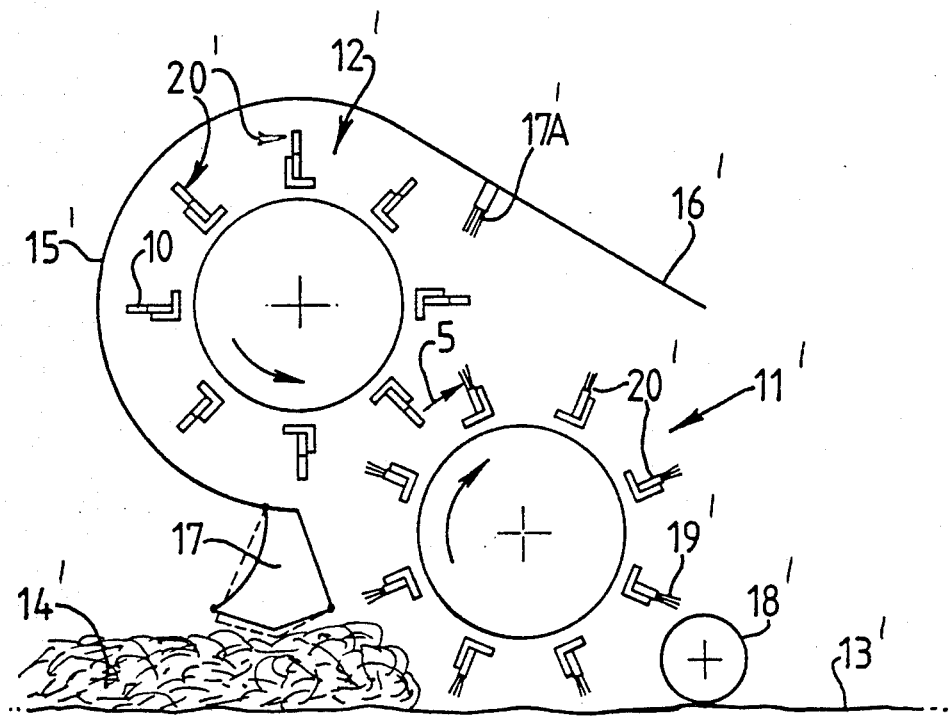
Figure 19B:
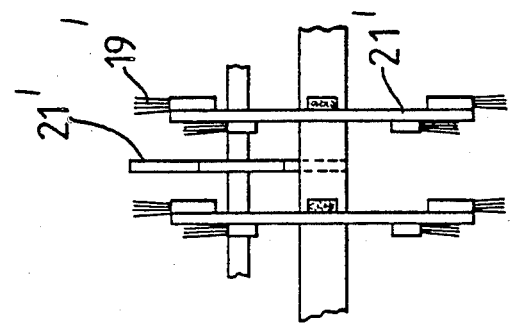
Figure 19A:
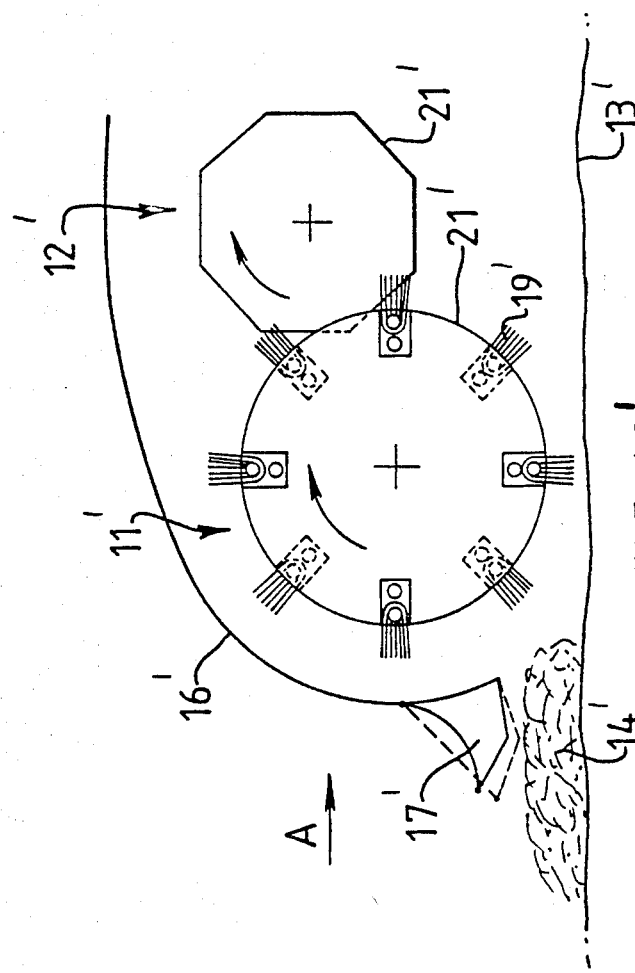
Figure 30A:
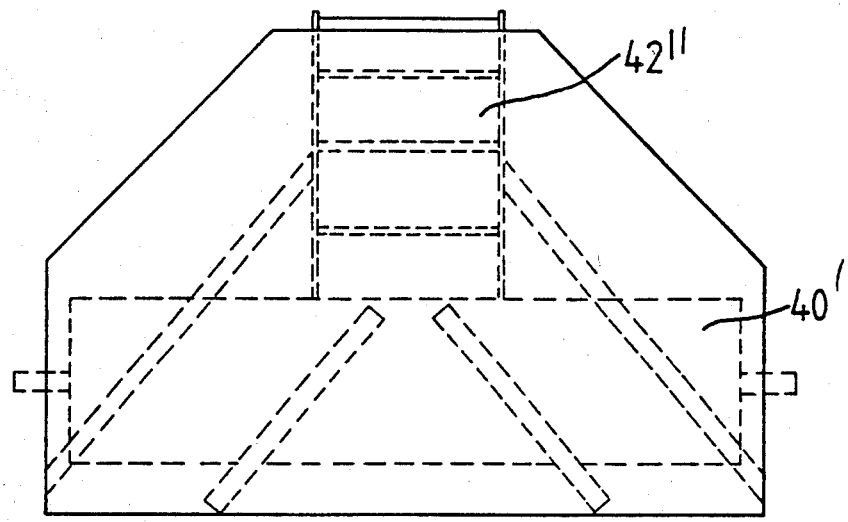
Figure 30B:
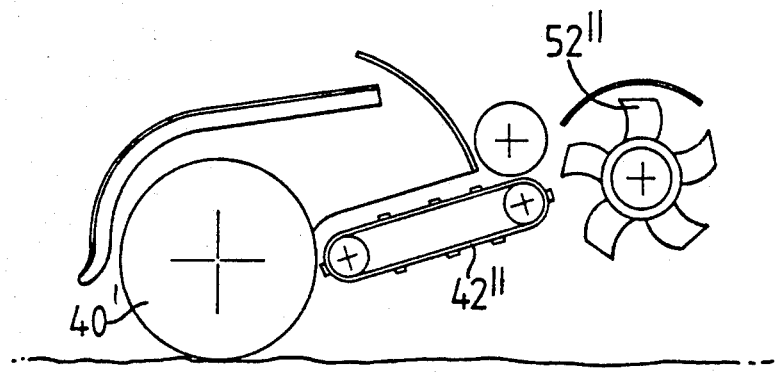

FIG. 3' shows a modified form of the crop engaging element of FIG. 2';

FIG. 4', shows a further modified form of the crop engaging element of FIG. 2';

FIGS. 4'(a) and 4'(b) show diagrammatically plan and side views respectively of a short section of a crop engaging rotor including elements as shown in FIG. 4';

FIGS. 5'(a) and 5'(b) show side and rear views respectively of a further form of crop engaging element embodying the invention, and FIG. 5'(c) shows a further modified form of the crop engaging element of FIGS. 5'(a) and 5'(b);

FIGS. 6'(a) and 6'(b) show in side view two forms of crop engaging element embodying the present invention in which the resilience characteristics of the element are selected by variation in thickness of the element;

FIGS. 7'(a) and 7'(b) show side perspective and side views respectively of part of a crop engaging rotor embodying the invention having outwardly extending rib-like crop engaging elements;

FIG. 8' is a rear view of a crop conditioning apparatus comprising two cooperating crop engaging rotors embodying the invention;

FIG. 9' shows in side view a detail of an alternative mounting for crop engaging elements of FIGS. 7'(a) and 7'(b);

FIG. 10' shows diagrammatically how two conditioning rotors of the form shown in FIGS. 7'(a) and 7'(b) may be arranged to interdigitate for conditioning crop;

FIG. 11' shows in diagrammatic side view apparatus for picking up cut from the ground, and for conditioning the crop, embodying the invention;

FIG. 12' shows a view from above of one form of conditioning rotor which may be used in the embodiment of FIG. 11';

FIGS. 13', shows a perspective view of a tuft of conditioning elements suitable for use in the conditioning rotor of FIG. 12';

FIGS. 14' and 15' show side and end views of a crop pick-up and conditioning apparatus consisting of a modified form of the apparatus of FIG. 11';

FIG. 16' shows in diagrammatic side view a crop pick-up and conditioning apparatus consisting of a modified form of the apparatus of FIG. 11';

FIG. 17'(a) is a diagrammatic side view of an alternative form of the crop pick-up and conditioning apparatus of FIG. 11';

FIG. 17'(b) is a diagrammatic view of part of the rotors of the apparatus of FIG. 17'(a), taken in the direction A in FIG. 17'(a), with the cover of the machine omitted;

FIG. 17'(c) is a diagrammatic view of part of the upper rotor of FIG. 17'(a) and of a development of part of the envelope of the lower rotor of FIG. 17'(a);

FIG. 18' is a diagrammatic side view of a modified form of the crop pick-up and conditioning apparatus of FIG. 17'(a);

FIG. 19'(a) is a diagrammatic side view of a further modification of the crop pick-up and conditioning apparatus of FIG. 17';

FIG. 19'(b) shows part of the rotors of FIG. 19'(a) when viewed from the front along the direction of the arrow A in FIG. 19'(a);

FIG. 20'(a) shows a diagrammatic side view of a further modification of the crop pick-up and conditioning apparatus of FIG. 17'(a);

FIG. 20'(b) is a diagrammatic representation of a development of the rotors of FIG. 20'(a), showing an example of the inter-relationship of crop engaging elements on the two rotors;

FIG. 21' shows in diagrammatic perspective view the inter-meshing relationship of crop engaging elements on two co-operating rotors in a further modified form of the crop handling apparatus shown in FIG. 11';

FIG. 21'(a) is a diagrammatic side view showing the attachment of crop engaging elements to a main structure of the lower rotor shown in FIG. 21';

FIG. 21'(b) is a diagrammatic side view of a modified form of the crop engaging element shown in FIGS. 21' and 21'(a);

FIG. 22' is a diagrammatic side view of a crop pick-up apparatus embodying the invention, and illustrating a use of the crop engaging rotor shown in preceding figures;

FIG. 23' is a diagrammatic side view of a modified form of the crop pick-up apparatus shown in FIG. 22', and FIG. 23'a shows an alternative form of intermediate or cop transfer rotor which may be used in the embodiment of FIG. 23';

FIG. 24 is a diagrammatic plan view of the crop pick-up apparatus shown in FIG. 23';

FIG. 25' is a diagrammatic perspective view from the front of a further form of crop pick-up apparatus, shown for use with means for spraying a chemical additive on to the crop;

FIG. 26' is a diagrammatic side view of a yet further modified form of pick-up apparatus, including a longitudinal auger positioned behind the pick-up rotor;

FIG. 27' is a side view in diagrammatic form of a further modified pick-up rotor embodying the invention, and incorporating lateral crop collecting augers and a centrally placed feed auger behind the pick-up rotor;

FIG. 28' shows a development, in a diagrammatic form, of a mounting arrangement of crop engaging elements on a rotor;

FIGS. 29'(a) to 29'(d) show diagrammatic representations of different modes of interation of twin rotor conditioning units; and FIGS. 30'(a) and 30'(b) show diagrammatic plan and side views of an arrangement of a crop gathering pick-up rotor.

FIGS. 1', 1'(a), and 1'(b) show diagrammatically three basic layouts of crop engaging apparatus which may embody various aspects of the present invention.

DESCRIPTION OF EMBODIMENTS OF THE INVENTION

Referring firstly to FIG. 1 there is shown diagrammatically in side view and partly in section, a crop conditioning apparatus in accordance with one preferred embodiment of the invention. The apparatus is indicated generally by the reference numeral 11 and comprises a driven rotary brush indicated generally at 12. The brush 12 is covered by a hood 13 which defines therewith a passage 14 through which cut crop is to be conveyed by the brush 12. An arcuate stationary brush indicated generally by the reference numeral 15 is secured to the underside of the hood 13 and extends along the passage 14 to restrain the crop flow therethrough.

Each of the brushes 12 and 15 embodies a conditioning device as hereinbefore defined and comprises rows of stiff, resilient, elongated conditioning elements 10 which in the following description will be referred to as brush filaments. The brush filaments 10 may for example be made of polypropylene or nylon, and are yieldable generally in the longitudinal direction of the passage 14 but also in response to forces from other directions. In the case of the rotary brush 12, the filaments 10 will yield at least in the anticlockwise sense as viewed in the Figure when the brush is rotated in the direction of the arrow as shown. The filaments of the stationary brush 15 will yield at least in the opposite sense when viewed in the said direction.

As will become apparent, the brushes 12 and 15 can each be formed in a number of alternative arrangements as will be described hereinafter, but for the sake of simplicity the embodiment will firstly be described with the brushes 12 and 15 constructed in the same manner.

FIG. 2 shows a perspective rear view of the rotary brush 12 and the stationary brush 15, viewing the brushes under the rear part of the hood 13. FIG. 3 shows a detail of a construction of mounting means for the filaments, and FIG. 4 shows a detail of the construction of the stationary brush 15.

With reference to FIGS. 2 and 3 there will firstly be described the construction of the rotary brush 12. The brush 12 consists of a support rotor 16 formed by eight axially extending angle iron bars 17 fixed between end side plates 18'. The support rotor 16 is mounted for driven rotation on a main frame (not shown) of the apparatus which also supports for driven rotary movement (in known manner) a pair of cutting drums 19 shown generally in FIG. 1. The skirts 20 and cutting elements 22 of the drums 19 are visible in FIG. 2 beneath the rotary brush 12.

Mounted on each angle bar 17 is a row of tufts of filaments 10. Each tuft is formed from a bundle of filament lengths which are bent over into a U-shape and secured to the bar 17 by a bolt 23 passing through a supporting and protective sleeve 24 for each tuft. The sleeve conveniently consists of reinforced rubber tubing, the outer rubber layer being reinforced by fibrous threads running along the length of the tubing or hose. As shown in FIG. 3, the single bolt 23 slightly compresses the sleeve 24 and produces a bundle of substantially parallel filaments distributed with a degree of randomness at their tips.

The tufts of filaments 10 are bolted to the outstanding flange of the angle bar 17 on the trailing face of the outstanding flange of the bar, relative to the direction of rotation of the rotor. In use the front wall of each angle bar 17 shrouds the lower part of the tuft of filaments 10 in the channel of the angle bar.

In FIG. 4 there is shown from the underside a perspective view of the stationary brush 15 shown in FIGS. 1 and 2. The tufts of filaments 10 may conveniently be identical to the filament tufts shown in FIG. 3, except that the angle bars 17 are bolted to a support plate 25 (omitted from FIG. 1 for simplicity) secured to the underside of the hood 13.

In FIGS. 2, 3 and 4, the filaments 10, conveniently of polypropylene or nylon rods, are shown as having a circular cross-section. Whilst such a cross-section gives an acceptable performance, a preferred cross-section is trilobate. Such a cross-section is shown in FIGS. 5, 6 and 7, which also illustrate an alternative form of mounting of the tufts of filaments 10. In the modification of FIGS. 5, 6 and 7, the tufts of filaments are held within the protective sleeves 24 by two bolts 23' and 23" and the outer bolt 23' has an internal spacing washer 26 which maintains the filaments on either side of the washer in two separate tufts, rather than a single tuft emerging from the sleeve 24 as shown in FIGS. 2, 3 and 4.

Returning now to consideration of the general principle of operation of the apparatus shown in FIGS. 1 to 4, the conditioning apparatus 11 is positioned as has been described behind a drum type rotary mower, and the entire assembly is either tractor mounted or tractor towed in known manner, and is driven from the power take-off (p.t-o.) of the tractor. In use the cut crop from the cutter 19 is conveyed into the passage 14 by the rotary brush 12. The presence in the passage 14 of the stationary brush 15 restrains the conveyed crop and thereby causes slippage between the crop and the rotary brush 12. Relative movement of the crop rearwardly relative to the filaments of the rotary brush 12 and forwardly relative to the filaments of the stationary brush 15 is thus induced. Said movement causes the filaments of both brushes 12 and 15 to condition the crop by surface damage. Although the precise conditioning effect will vary according to the crop and the operating conditions, it is expected that normally the conditioning is effected by the filaments of the brushes abrading the surface of the crop, although in some cases surface damage by multiple lesions and gentle multiple impact of the tips of the conditioning elements may also cause surface damage. The object of such surface conditioning of the crop is the removal or displacement of the epicuticular wax and surface damage of the cuticle. Conveniently the rotor 12 is rotated at a speed such as to throw off the crop to fall downwardly to the ground. In some arrangements there may be provided an optional stripping rotor of known kind (shown in latter Figures) for stripping off the rotor any crop remaining as the filaments approach the arcuately downward portion of their paths. Such a stripping rotor would operate in the same sense of rotation as the rotor 12. Crop from the conditioning device falls onto the stubble in a loosely structured swath or windrow which has good resistance to settling.

The conditioning devices of the present invention are susceptible to a wide measure of variation, and there will now be described a large number of alternative forms of the conditioning devices themselves, and of the configurations of such devices within a conditioning apparatus. It will be appreciated that the various different conditioning devices (generally called brushes in this description) are interchangeable within the various configurations described.

Referring firstly to FIG. 4, it will be noted that the tufts of filaments 10 are fairly closely spaced together, and that tufts in succeeding rows are offset from each other so that a tuft in one row fills the gap between tufts in a preceding tow. The tufts on the rotary brush 12 are similarly offset from each other. In modifications of such tuft arrangements, the tufts may be spaced apart more widely and the gaps between tufts in one row may be filled not entirely by tufts in the succeeding row but by combinations of staggered tufts in the next two or even more rows. With such an arrangement it may be advantageous to set the tufts of filaments along helical patterns so as to exert on the crop a degree of movement along the axis of the rotary brush, that is to say transversely relative to the passage 14.

There will now be described with reference to FIGS. 8(a) and 8(b) a modification of a cutter and conditioning device combination embodying the invention which makes particular use of the helical patterns of tufts referred to above. FIG. 8(a) shows a diagrammatic side view corresponding generally to FIG. 1 of a conditioning apparatus indicated generally again at 11 and positioned over a belt mower 39. Such a belt mower 39 is known in itself and comprises a flat casing 28 in which are housed two horizontally spaced pulleys (the positions of which are indicated generally at 27 in FIG. 8(b)) around which is entrained a belt 30 carrying outwardly directed cutting elements 31. The cutting is effected (in known manner) by unidirectional movement of the knives 31 over substantially all of the front traverse of their path although some cutting is effected by a part circular path of the cutting knife 31 as it moves around the pulleys 27. The conditioning device 11 operates in generally the same manner as described with reference to FIG. 1, the brushes 12 and 15 being indicated diagrammatically by the same reference numerals as in previous Figures. In FIG. 8(b) there is shown the main frame 32 on which the conditioning device 11 and the belt cutter 39 are both mounted, to be driven from the p.t-o. of the tractor on which the frame 32 is mounted.

Where a rotary brush 12 is used in connection with a belt cutter 39, two particular advantages arise in addition to the improved conditioning effected on the crop. Firstly, the filaments or tufts of filaments can be arranged in a helical pattern along the axis of the rotary brush so as to impart to the crop a sideways force along a direction parallel to the axis of the rotary brush and in a sense opposite to the sideways force applied to the crop by virtue of the unidirectional movement of the cutters 31. Such a compensating force applied to the crop can provide improved cutting, and improved transport of the crop away from the cutters. A second advantage which can be provided by a rotary brush with a belt cutter is that the brush can be arranged to grip the crop before the crop is cut, and to tension the crop so gripped against the cutters of the belt cutter to provide a degree of shear cutting which is not normally available with a belt cutter. These two advantages occur to a much greater degree than would arise say with a known spoke conditioning rotor. This is due to the greatly increased gripping action of the filaments of a conditioning device as hereinbefore defined in accordance with the invention.

In FIG. 8(c) there is shown a modification of the apparatus shown in FIGS. 8(a) and 8(b) in which the sense of rotation of the rotary brush 12 is reversed so that the rotary brush clears crop away from the belt mower 39 by sweeping the crop rearwardly across the top of the casing 28 rather than lifting the crop up and over the rotor 12. To the rear of the casing 28 of the belt mower 39 is provided a stationary brush 15 acting as a conditioning device and producing a conditioning action corresponding to the action of the stationary brush 15 in the preceding embodiments. In this embodiment, the passage 14 through which the crop is conveyed is defined between the rotary brush 12 and the top of the casing 28 continued back to the stationary brush 15. Behind the stationary brush 15 is a stripping rotor 18 (of known kind) which rotates in the same sense as the rotary brush 12, and strips crop from the brush 12 and directs it downwardly to the ground.

The two advantages outlined above in connection with combining the rotary brush 12 and a belt mower 39, are also provided in the modification of FIG. 8(c) and indeed are accentuated by the reverse, 'undershot' sense of rotation of the rotor 12. In particular the shear element thus introduced into the impact cutting is very beneficial to the efficiency of cutting.

In the machines described with reference to FIGS. 1 to 8(c), the stationary brush 15 has in each case constituted a crop flow modifying means (also referred to as a crop slippage means) for producing or enhancing slippage of the crop passing through the passage 14, the slippage occurring both relative to the stationary brush 15 and the rotating brush 12. In each case the crop flow modifying means has taken the form of a stationary restraining means for effecting the crop slippage by restraining movement of the crop through the passage 14.

There will now be described with reference to FIG. 9(a) an alternative arrangement of conveying rotor and crop flow modifying means in which the crop flow modifying means is active rather than stationary. FIG. 9(a) is a side view in cut-away form of a conditioning apparatus 11 suitable for trailing behind a tractor and for conditioning previously cut crop lying on the ground. (It will be appreciated that the use of the device to be described is not precluded from operation with a cutting means for cutting standing crop in modifications of the apparatus.) The conditioning apparatus 11 has several elements in common with the previously described apparatus and such common elements will be indicated by like reference numerals. The apparatus 11 comprises a rotary brush 12 mounted for rotation in bearings 34 mounted on part of the main frame 32 of the conditioning apparatus. The frame is mounted for movement over the ground level indicated at 35 in the direction from right to left in the Figure as indicated by the arrow, and the rotary brush 12 is coupled by gearing (not shown) to the p.t-o. of the towing tractor and arranged to be driven in a clockwise direction as indicated by the arrow.

A hood 13 extends from a position in front of the rotor 12 upwardly and rearwardly to terminate at a supporting member 36 positioned at about the '11 o'clock' position in relation to the rotor 12. Above and slightly to the right of the member 36 is positioned a second conditioning device in the form of a second rotary brush 37 constructed in similar manner to the main rotary brush 12, but of smaller diameter, and having fewer rows of tufts of filaments angularly spaced around the rotor. The rotary brush 37 is mounted for rotation in bearings 38 suspended from an upper frame member also forming part of the main framework 32 of the apparatus. The rotary brush 37 is coupled to the gearing of the main brush 12 and arranged to be driven in the opposite sense to the rotation of the main rotor 12, as indicated by the arrow.

In different arrangements of this embodiment, the second rotor 37 may be positioned at different angular positions relative to the rotor 12 (for example between the 9 o'clock and 12 o'clock positions). Other factors which can be varied include the relative and absolute rates of rotation of the brushes 12 and 37, the brush diameters and the degree of spacing apart, or overlap, of the tips of the opposed filaments of the two brushes.

Considering firstly the relative rates of rotation of the two brushes, the second brush 37 preferably constitutes a crop flow modifying means for producing or enhancing relative movement, or slippage, of crop passing between the brushes, this being achieved by a difference in the linear velocities of the tips of the opposed filaments.

It is preferred that the relative rates of rotation of the two brushes shall be such as to produce a difference in the tip linear velocities. In such a case the second brush 37 acts as crop flow modifying means for producing or enhancing slippage of the crop relative to the filaments, and such slippage contributes to the conditioning of the crop.

As can be seen from FIG. 9(a), the mountings of the filaments may correspond exactly to the mountings described with reference to FIGS. 2, 3 and 4, or as modified in FIGS. 5, 6 and 7. By way of example the diameter of the rotary brush 12 may be 560 mm, and the diameter of the secondary rotary brush 37 may be 410 mm. By wa of example of ranges of diameters which may be used, the diameter of the lower rotos 12 may be in the range 350 mm to 700 mm, and the diameter of the rotor 37 may be in the range 700 mm to 350 mm. Preferably the rates of rotation are arranged, in conjunction with the diameters of the rotors, to be such that the velocity at the tips of the filaments of the rotor 12 is in the range 10 to 40 m per second, most preferably in the region of 24 m per second, and the differential velocity between the tips of opposed filaments is in the range ±50%, conveniently in the region of ±30%. Where the filament tips of the second rotor 37 have a greater linear velocity than the filament tips of the rotor 12, the brush 37 acts as an accelerating rotor tending to move the crop over the main rotor 12. Where the secondary brush 37 has a tip velocity less than the tip velocity of the main rotor 12, the secondary brush 37 acts as a restraining means tending to restrain movement of the crop.

FIG. 9(b) shows in diagrammatic form a slightly modified arrangement of the embodiment of FIG. 9(a), in which the rotor and hood configuration are varied.

FIG. 9(c) shows in diagrammatic form a modifiaction of the embodiment of FIG. 9(a), in which the secondary rotor 37 is arranged to rotate in the same sense as the main rotor 12. The secondary rotor 37 is repositioned at a position corresponding to '9 o'clock', and the hood 13 of FIG. 9(a) is replaced by a two-part hood around the main rotor. A plate 103 extends horizontally to define with the brush 12 a downstream part 14a of the passage, and a curved front plate 105 extends in front of the brush 37 to define therewith an upstream part 14b of the crop passage. In use the main rotary brush 12 is rotated clockwise as shown in FIG. 9(c) and the secondary rotary brush 37 is rotated in the same sense at a rate of rotation which provides a substantially slower velocity at its filament tips than at those of the main brush 12. The two sets of the filaments abrade and thereby condition the crop in generally the same manner as has been described in the preceding embodiments, with each acting as crop stripping means for the other.

Referring now to FIG.9(d), a crop conditioning apparatus generally indicated at 11 is of similar construction to the device 11 in FIG. 9(c), and identical reference numerals are used to identify similar parts. However in the apparatus of FIG. 9(d) the secondary brush 37 is arranged to be driven in the opposite rotational sense to the main brush 12 and the front plate 105 is shorter and shaped to terminate slightly rearwardly and below the upper extremity of the secondary brush 37. The apparatus 11 operates in similar manner to the apparatus of FIG. 9(c) except that the filaments of the brushes 37 and 12 are moving in the same linear direction but at different speeds when they contact the crop. FIG. 9(e) shows a further alternative arrangement, similar to that of FIG. 9(d).

The crop conditioning apparatus of FIG. 9(c) and 9(d) can be used as pick-up conditioners for collecting previously cut crop on the ground, or as replacements for the crop conditioning apparatus shown in preceding embodiments in combination with a mower.

It is to be appreciated that there may be provided in accordance with the invention in some aspects a two brush arrangement in which both brushes are of equal size and driven at identical peripheral linear speed and direction, but the cooperating position of the brushes is such that transverse rows of filaments intermesh in the manner of two gear wheels, that is to say have a negative clearance.

There will now be described a number of other variations and modifications of the filaments which may be used, and of the configurations of conditioning devices, passageways and cutting devices which may be used. It will be appreciated that many of these variations may form permutations not specifically indicated among the various features described.

FIG. 10 illustrates in diagrammatic side view, partly in cross-section, a modification of the crop conditioning apparatus shown in FIG. 1, in which the drum mower 19 is replaced by a disc mower 29. The hood 13 is extended forwardly over the disc mower 29, as compared with the device of FIG. 1. The apparatus shown in FIG. 10 includes a stripping rotor 18, which has been mentioned as an optional feature, and which can be utilised in combination with the apparatus of FIGS. 1 and 8(a) and as appropriate with other embodiments. In FIG. 10, the stripping rotor 18, which may be of known design but with its paddles consisting preferably of yielding material, is rotated in the same sense as the rotary brush 12, and acts to strip crop off the brush 12.

FIG. 10(a) shows a modification in which the brush conveying means is contoured to match the shape of a disc mower. A similar arrangement may be used with drum mowers.

In FIG. 11 a further modification of the apparatus shown in FIG. 1 includes a modified stationary brush 15 which is arcuate and is pivoted at 16 to the hood 13 at the forward end of the passage 14 and extends rearwardly along the passage to restrain the crop flow therethrough. (Similar pivoted arrangements have been shown but not described in earlier Figures). The distal end of the brush is supported by spring loaded support 17' extending from the hood 13 and adjustable to vary the angular position of the brush 15 about its forward pivot 16. An optional stripping rotor 18 is provided to remove conditioned crop from the brush 12 and discharge it onto the ground in a swath or windrow. The brush 15 of FIG. 11 may be of the same form as described with reference to FIG. 1, and other Figures, or alternatively may comprise individual filaments, not in tufts, and of somewhat larger diameter than those described hereinbefore. Such a brush will be described in more detail hereinafter with reference to FIG. 22.

Referring to FIG. 12, a crop conditioning apparatus 21 differs from FIG. 11 in that the stationary brush 15 is straight not arcuate. Further, the conditioning apparatus is combined with a disc mower 29 instead of the drum mower 19 of FIG. 11. The combined mower conditioner of FIG. 12 operates in substantially the same manner as that of FIG. 11 except for the manner in which the crop is cut and delivered to the crop conditioning apparatus from the disc mower, this manner of delivery being generally known in itself.

FIG. 13 shows a crop conditioning apparatus 31 modified from that shown in FIG. 12 in that the disc mower 29 is replaced by a belt mower 39.

FIGS. 14 and 14(a) show a crop conditioning apparatus 41 which can be used as a pick-up conditioner (i.e. for picking up cut crop from the ground, conditioning it and returning it to the ground in a swath or windrow) or in combination with a mower in a mower-conditioner of the kinds shown in FIGS. 11 to 13. In this connection, it should be appreciated that the crop conditioners of FIGS. 11 to 13 can readily be adapted as pick-up conditioners by removal of the cutter and appropriate choice of rotary brush construction. Modification of the hood 13 may also be required to ensure proper direction of the picked-up crop into the passage 14. The said pick-up conditioner can be tractor-mounted or trailed in the same manner as the mower-conditioners of FIGS. 11 to 13. The brush shown in FIG. 14 is applicable also to a twin brush arrangement of conditioning apparatus.

The crop conditioning apparatus 41 of FIG. 14 differs from the crop conditioning apparatus of FIG. 11 in that the construction of the rotary brush 12 is specified (and will be described hereinafter), the support 17' is not spring-loaded and the optional stripping rotor 18 has been omitted.

Figure 15:
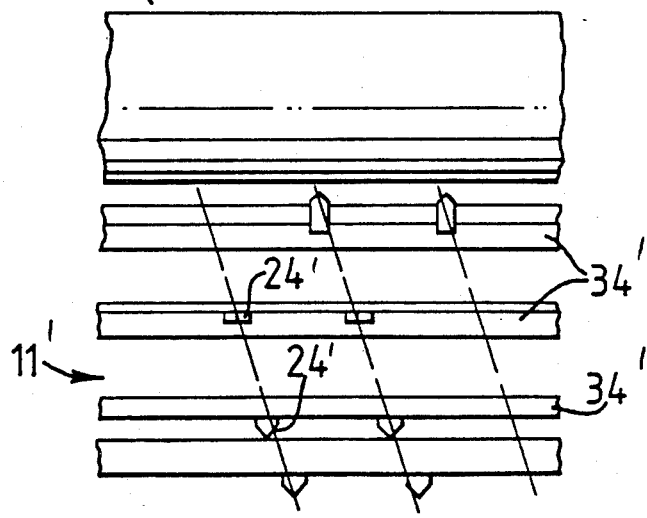
Figure 17A:
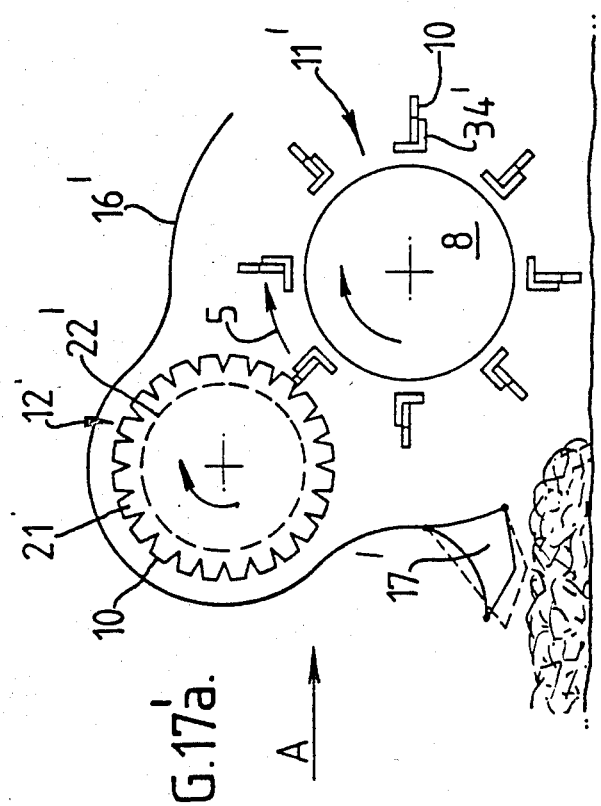
Figure 17C:
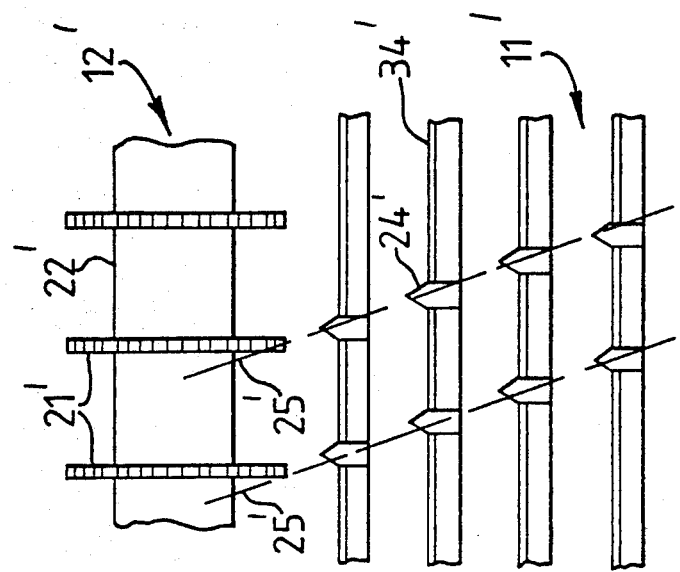
Figure 17B:
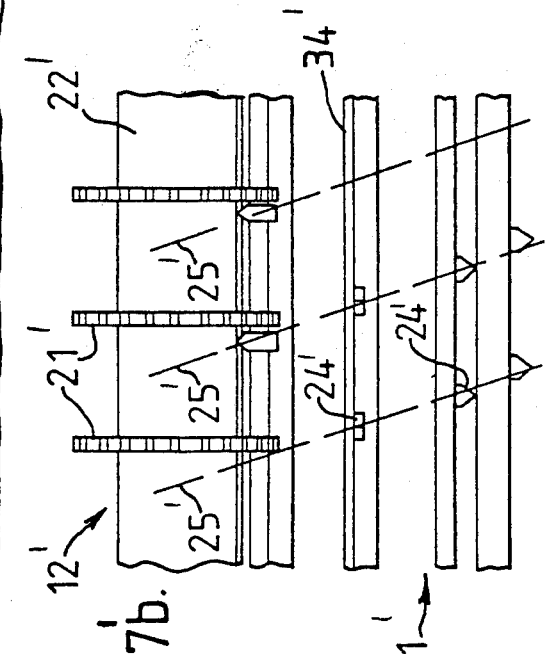
Figure 18:
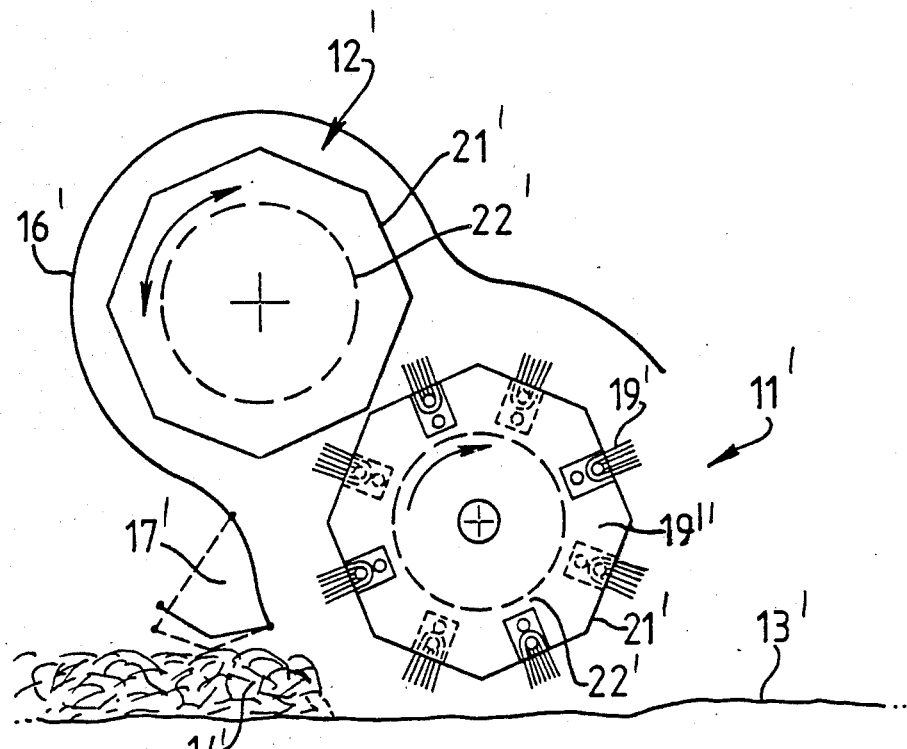

Referring now to FIG. 15, there is illustrated another crop conditioning apparatus (generally indicated at 51) which can replace the apparatus of FIG. 14 as a pick-up conditioner or in a mower-conditioner. This apparatus differs from the apparatus in FIG. 14 in the construction of the rotary brush 12 which will be described hereinafter.

FIG. 16 also illustrates an alternative crop conditioning apparatus (generally indicated at 61) to that of FIG. 14. The apparatus of FIG. 16 differs from apparatus in FIGS. 14 and 15 in the construction of the rotary brush which will be described hereinafter.

The manner of operation of the conditioning apparatus 41, 51 and 61 of FIGS. 14, 15 and 16 are substantially identical with that of apparatus 11 and therefore will not be described.

Referring now to FIG. 17, a crop conditioning apparatus generally indicated at 71 differs from the previously described devices of FIGS. 14 to 16 in that the brush 12 is replaced by a rotary conveyor 72. The conveyor 72 comprises a drum 72a having circumferentially spaced axially extending ribs 72b protruding radilly therefrom. These ribs 72b are of generally trapezoidal cross-section to facilitate crop slippage during conveying and subsequent conditioning by the stationary brush 15.

The apparatus 71 cannot be used very effectively as a pick-up conditioner without providing a rotary brush or other means for raising cut crop from the ground and delivering it to the passage 14. The apparatus 71 is intended primarily for use in combination with a cutter in a mower-conditioner or as a stationary mechanism. For example, it can replace machines 11, 21 and 31 in the mower-conditioners of FIGS. 11, 12 and 13 respectively.

The apparatus 71 operates in a similar manner to the device of FIG. 11 as previously described except that the rotor 72 has abrasion causing edges instead of filament tips.

Referring now to FIG. 18, a crop conditioning apparatus generally indicated at 81 comprises a driven rotary brush 82 identical with the previously described brush 12. A guide plate 83 extends substantially horizontally over the brush 82 to define therewith the downstream part 84a of a crop passage. The upstream part 84b of said passage is defined between the brush 82 and an arcuate front plate 85 which is adjustably mounted to vary the clearance thereof from the brush 82. The gap between plates 83 and 85 provides an inlet for air into the passage part 84a. At the upstream end of the plate 85 there is provided an inclined restrictor plate 86 having a serrated distal edge facing the brush 82 (as shown in FIG. 18(a)). The plate 86 serves the purpose of restraining crop flow into the passage 84b thereby causing slippage between the crop and the brush 82, which is rotated in a clockwise direction as viewed in FIG. 18. Said slippage results in abrasion of the crop by the filaments of the brush 82 and the serrated edge of the plate 86. In this manner cuticular damage is caused and epicuticular wax is abraded from the crop surface and the crop thus conditioned.

Apparatus 81 can be used as a pick-up conditioner or as a replacement for the crop conditioning machines 11, 21 and 31 of the mower-conditioners of FIGS. 11 to 13.

Referring now to FIG. 19, a crop conditioning apparatus is generally indicated at 91 in a mode intended for use as a pick-up conditioner. The apparatus 91 can readily be adapted for use in a mower by replacing the intake plate 96 (see below) with a shorter plate or removing said plate 96. The brush 92 of apparatus 91 can be any of the rotary brushes described above. Similarly, brush 95 can be any of the "stationary" brushes described above, although (as shown) the construction of FIG. 4 is preferred. The brush 95 is pivoted at 98a to a support plate 98 which is spatially fixed relative to the brush 92. A spring 99 acts between the support plate 98 and the lower end of the brush 95 to urge the upper end of the brush 95 against a stop 98b on the plate 98. The intake plate 96 depends below the brush and is fixed relative to support plate 98. A curved swath deflector plate 97 is provided to direct conditioned crop passing between the brush 92 and a hood 93 into a substantially horizontal path on leaving the conditioning device. The plate 97 causes the swath to be spread upwards into a more loosely arranged swath than if it fell, or was driven, onto the ground from above.

In use, the apparatus 91 operates in similar manner to machine 41 of FIG. 14 except that the sprung and pivotal mounting of the brush 95 automatically compensates for variations in the rate of feed of crop into the device.

Referring to FIGS. 14 and 14(a) the rotary brush comprises end plates between which are clamped a plurality of evenly spaced annular metal rings in the circumferential surface into which are wedged or otherwise secured tufts 2b of polypropylene rods. FIG. 14(a) shows that the tufts 2b of filaments 10 merge into each other before protruding from the end plates 2a. Said tufts 2b each are constituted by rods of 3 mm diameter circular cross-section or, preferably, rods of trilobate cross-section corresponding to three parallel 3 mm diameter circular cross-sectional rods welded together. Suitable there are about 10 of the cylindrical rods or 4 to 6 of the trilobate rods per $cm^2$.

The rotor 12 shown in FIG. 15 has a plurality of circumferentially spaced axially extending ribs 2c from each of which protrude two parallel rows of 6 mm diameter polypropylene rods 2d. Each pair of circumferentially adjacent rods 2d is constituted by the respective ends of a "U"-shaped length of rod having its base secured in the respective rib 2c. The ribs 2c are of similar shape to the ribs 72b of device 71 of FIG. 17.

FIGS. 16 and 20 show examples of brushes in which a plurality of circumferentially spaced axially extending ribs 2c project from a cylindrical drum 2a. These ribs 2c have a radially extending rear (with respect to the direction of rotation of the brush) face and a shorter radially extending front face, said faces being joined by a convexly arcuate upper face. Tufts 2b protrude radially immediately forwardly of the front face. Each pair of adjacent tufts 2b is constituted by a bundle of cylindrical polypropylene rods of 3 mm diameter or trilobate polypropylene rods of 3 mm diameter lobes. Suitably there are about 50 of the cylindrical rods or 6 to 8 of the trilobate rods in each bundle. The bundle is bent into a "U"-shape and the base thereof is clamped to the front face of the rib 2c by a metal plate (not shown) in similar manner to that described herein with reference to FIG. 3. In use, the ribs 2c constitute a shroud for the lower part of the following tuft 2b and the curved upper face of the ribs 2c limit the extend to which the preceding tuft 2b can bend.

Referring to FIG. 21, a brush has the same basic construction as that of FIG. 20 described above. However it also has pairs of rearwardly curved bars 2j protruding from the drum 2a to provide guards for the tufts 2b. The bars 2j of each pair are located on respective sides of a tuft 2b whereby the tuft can bend between the bars and thereby be protected against excessive bending and shear or impact damage by stones or other extraneous lumps of material.

FIGS. 22 and 23 show suitable brush parts for use in the stationary brush 15 in the machines of FIGS. 11 to 16 and 19.

Referring to FIG. 22, the brush part 165 has a base 161 from which protrude two rows of polypropylene rods 162. The rods 162 are constituted by the respective ends of "U"-shaped lengths of rod which are secured in the base 161 (see ghost lines in FIG. 22) and arranged so that the rods 162 of one row are staggered relative to the rods 162 of the other row.

However the brush of FIG. 4 is presently preferred for use as the stationary brush in the devices of FIGS. 11 to 16 and 19. It is constructed in similar manner to the preferred rotary brush of FIG. 2 in that tufts are formed of rod bundles bent into a "U"-shape and clamped to angle member 17 by a bolt and domes plastic washer 23. Two or more of such tuft-carrying angle members are secured to a support plate 25 to form the brush 15.

A brush part 185 of FIG. 23 has a plurality of polypropylene rods 182a aligned in a row and connected at a common base 182b to form a comb-like structure. The base is clamped to an angle member 183 by means of a clamping plate 184 and bolts 186. A similar construction to that of brush 185 can be used for part of the rotary brush in the crop conditioning apparatus of preceding Figures.

It will be appreciated that the invention is not restricted to the details described above with reference to the drawings but that numerous modifications and variations of said details can be effected without departing from the scope of the invention. In particular, the rods of the brushes can be of other materials than polypropylene which have the desired stiffness and wear characteristics, for example nylon. Further, the rods can be of other cross-sections than circular or trilobate, for example annular, triangular, rectangular or square, and can be secured in the brush in any suitable manner. Moreover, the crop-conditioning devices illustrated can readily be adapted for use at a stationary location to which cut crop is fed by, for example, a belt conveyor.

Typically, the main rotary brushes 12, and the rotary conveyor 72 will have an overall diameter of 560 mm and will be rotated at 500 to 1000 rev/min. Their axial length, and that of brushes 15, and plate 96, will be chosen having regard to the desired width of cut crop to be conditioned and the severity of treatment required. The free length of the rods of said brushes (both rotary and stationary) is between 50 and 100 mm; the individual rods or tufts in each row are spaced between 35 and 130 mm apart; and the adjacent rows are spaced apart by about 25 mm in the stationary brushes and rows 2d on each rib 2c of device 51, about 90 mm in brush 12 of device 41, or about 220 mm in the brush 12 of FIG. 16.

As has been mentioned, there may be provided adjustment of severity to crop treatment. The principal variables are stiffness of the filaments, rotor diameter and speed and the clearance between the conveying and slip inducing means, i.e. crop flow modifying means. Stiffness of filaments is determined largely by their free length, their cross-sectional area and shape and the type of material from which they are made.

It is to be appreciated that the brush rotors are not limited to being used in the horizontal attitude only. In practice two counter rotated brushes fitted vertically or inclined rearwardly, so as to cover the opening between the drums of two-drum mowers, are very effective and lead to very simple swath forming arrangements. Furthermore, the brushes do not need to be cylindrical, but can be of any other convenient shape, e.g. conical.

In FIG. 1'(a) there is shown a crop pick-up apparatus comprising a rotor 11' mounted on a mobile main frame (not shown) for movement over the ground 13' to pick-up previously cut crop shown at 14'. A hood 15' extends around the rotor 11' and rearwardly at 16' above a guide plate 16A' to form a crop channel 16B' leading to a receptacle or to further crop processing machinery such as the chopping mechanism of a forage harvester. The rotor 11 picks up cut crop and passes the crop upwardly over the rotor and rearwardly between the hood extension and the guide plate 16A' along the crop channel 16B'.

The rotor 11' has a plurality of stiff resilient outwardly directed crop engaging elements indicated generally at 10, which may incorporate any of the features to be described in accordance with the invention hereinafter, or which have been described hereinbefore. The elements 10 are mounted on support means, referred to generally as a support 8', which may for example comprise a number of transverse angle section bars mounted on spaced apart discs to form a squirrel-cage type of rotor base. However other forms of rotor support means may be used as will be described hereinafter.

FIG. 1'(b) shows diagrammatically a crop pick-up and conditioning apparatus which has generally the same construction as the apparatus of FIG. 1'(a) except that the elements 10 are arranged to perform a crop conditioning function in addition to a crop pick-up function, and there is provided an optional additional stationary crop engaging device 9' under the hood 15' for co-operating with the rotor 11' to effect conditioning. The crop engaging device 9' may be of the same general form as the crop engaging elements 10 on the rotor, or may be any one of a number of other forms to be described hereinafter. The conditioned crop is returned to the ground at the rear and is guided downwardly by the hood extension 16', which in this arrangement is inclined downwardly.

In FIG. 1'(c) there is shown a crop pick-up and conditioning apparatus having a number of components in common with the arrangement of FIG. 1'(a), but including a second rotor 12' which is mounted to rotate in co-operation with the first rotor 11'. In the example shown the second rotor 12' rotates in counter-rotation to the rotor 11' to effect crop conditioning in the overlap region between the two rotors, in addition to the conditioning which takes place due to slip during acceleration of the crop 14' on first contact with rotor 11'. In other examples to be described hereinafter, the rotors may rotate in the same sense, or in the opposite sense with different speeds of rotation.

The elements of one or each rotor may comprise elements in accordance with aspects of the present invention, or one of the rotors may comprise a brush conditioning rotor of the kind described.

It is to be appreciated that many variations of the arrangments shown in FIGS. 1'(a), 1'(b) and 1'(c) are available, for example there may be provided additional crop slowing, or accelerating, devices, and the co-operating rotors of FIG. 1'(c) may be of different sizes and may be rotated clear of each other at different speeds, and in the same or different senses. Many such variations will be described hereinafter; FIGS. 1'(a), 1'(b) and 1'(c) are provided as a general introduction to the types of configuration which may be used.

Next there will be described a series of forms of crop engaging elements suitable for use in the apparatus shown in FIGS. 1'(a), 1'(b) and 1'(c), and in other arrangements. Preferably the elements to be described are formed of stiff flat resilient synthetic plastics material (for example sheeting material), and have two main forms, namely a relatively narrow outwardly directed fin-like element, or a relatively wide transverse rib-like element. In general, in the following description crop engaging elements are indicated by the general reference numeral 10 where the element can comprise a fin-like element or a rib-like element, or indeed other forms of crop engaging element. Where the element is particularly a fin-like element, a general reference numeral 24' is used, and where the element is particularly a rib-like element a general reference numeral 23' is used. In other embodiments to be described hereinafter, disc-like crop engaging elements are indicated generally by the reference numeral 21', and brush filaments forming tufts of brushes and constituting crop engaging elements are indicated generally by reference numeral 19'. These latter elements do not embody the present invention in themselves, but may form part of embodiments of the invention in some aspects. The crop engaging elements may be arranged for crop conditioning or other crop treatment such as threshing, crop pick-up or crop conveying, or any combination of these functions.

In FIGS. 2' and 2'(a) a crop engaging element 24' comprises a planar fin 30' cut from synthetic plastics material and having an outer pointed end 31'. The fin 30' is secured in a flexible tubular sleeve 32' by a bolt 33', and the sleeve 32' is in turn secured to a transverse angle bar 34' by a bolt 35'. The bar 34' forms part of a squirrel cage rotor composed of a series of axially extending bars 34' which form a support 8' for the element 24'.

In operation the rotor formed by the bars 34' will normally be rotated in a sense such that the bar 34' in FIG. 2' moves downwardly into the page. In such a case an upstanding flange 34A' of the bar 34' leads the sleeve 32' and protects the securement point of the sleeve. The movement of the bar 34' is indicated diagrammatically at arrows X in FIG. 2(a)'. If the bars 34' form part of a conveying rotor, such as the rotor 11' in FIG. 1'(a), the general, overall, direction of crop flow will be the same as the direction of movement of the bar 34', and the general direction of crop flow in such a case is shown at 5 in FIG. 2'(a). It is to be noted particularly that the crop may also have superimposed on this general direction of movement a lateral movement by interaction with the angled fin 30', and indeed such additional lateral movement is a particular feature of the invention in many aspects. A direction of crop reaction to contact with the angled fin 30' is indicated generally at 5' in FIG. 2(a), the angle 1' between the general direction of crop flow 5 and the direction of crop reaction 5' being dependent on the shape and width of the element, in addition to dependence on crop factors and rotor speed. Where the term general direction of crop flow is used, what is meant it the overall main direction of movement of crop. This overall main movement of the crop may either be effected by the crop engaging elements (acting as crop conveying elements) or may be effected by other means and may be a crop movement past the crop engaging means (for example where the crop engaging elements are stationary).

The case to be described with reference to FIG. 2'(a) is the simple case where the element 10 is a crop conveying element which is moving the crop by driven movement of the element. Both the element 10 and the crop are moving in the same overall direction, with the element 10 moving faster than the crop, so that the principal load on the element 10 is in the direction indicated at Y, i.e. the opposite direction to the crop flow direction 5.

It is particularly to be appreciated that the various angles and directions indicated in FIG. 2'(a) are not intended to indicate precise directions but are given to assist understanding of the invention. In practical circumstances the invention is concerned with overall effects on the crop, and general directions in which the elements yield, and convey the crop.

The fin form element 24' may be arranged with the fin 30 parallel to the angle bar 34', that is to say generally perpendicular to the directions of crop flow, and generally parallel to the axis of rotation of the rotor, but it is preferred that the fin 30' is inclined at a skew angle to the axis of the rotor, as shown. Thus in FIG. 2'(a), the principal plane of the crop engaging element 24' is indicated diagrammatically at 2, and is inclined at an angle 3 to the general direction 5 of crop flow. The angle 3 is conveniently 45°.

The effect of the sleeve 32' is to provide for yielding of the tip 31' in a preferred direction relative to the direction of crop flow 5. By a preferred direction of yielding is meant that the fin yields more easily in one direction than another. In the case shown in FIG. 2' and 2'(a), the effect of the flattening of the sleeve at the bolts 33' and 35' is that the fin 31' yields most easily in a direction intermediate between the direction 5 of crop flow, and a direction perpendicular to the principal plane 2. The preferred direction of yielding is indicated diagrammatically at 6, and is inclined at an angle 1 to the direction Y of principal load on the element 30' due to crop flow. The angle 1 may be in the range 20° to 25° for the arrangement shown. The region of yielding of the element 24' is indicated at 7 and is formed by the portion of the sleeve 32' between the bolts 33' and 35'. The region of yielding is spaced from the crop engaging region 4 of the element 24' and is closer to the support 8 than to the outer tip 31' of the element.

FIG. 3' shows a modification of the crop engaging element 24' of FIG. 2' in which the outer end of the fin 30' is formed with a series of stepped serrations 36'. Attention is drawn to the stepped and raked-back leading edge of the fin 30' of the crop engaging element 24'. An advangtage of this design is that the abrasiveness of the tip regions is increased, and the tendency for crop to "hairpin" is greatly reduced. As a result of the latter, crop leaves a conditioning rotor cleanly, and none is driven hard into the stubble where it can obstruct the inflow of air beneath the swath. It is to be appreciated that this feature of the stepped and raked-back leading edges of the crop engaging element provide an independent inventive aspect of the present invention.

FIG. 4' shows another version of a resiliently mounted conditioning element 24' of fin form, but with the outer tip surface substantially parallel to the ground to give maximum crop lifting effect. The outer tip surface is optionally serrated, and the principal plane of the fin is again inclined at an angle to the axis of the rotor.

The elements of FIGS. 2', 3' and 4' conveniently can be mounted so that elements on successive mounting bars are offset from each other so as to be arranged in a helical formation. A split helix can be devised either to move the crop towards the centre region or towards the outer regions of the rotor (FIG. 28'). The effect is achieved by all the crop engaging elements on the pick-up rotor in one half relative to its fore and aft centre line being angled in the same direction, and those in the other half being angled in the opposite direction. If the development of such a rotor shows the apex of the chevron formation of elements leading, the crop stream will be teased out laterally. If the apex is trailing, the crop stream will be concentrated towards the centre. On pick-up rotors it is useful to achieve even distribution of crop laterally from windrows, which are usually heap-shaped in cross-section, so that machines such as in-line balers are fed more uniformly with material, to form well-packed bales. Gathering spread crop or concentrating a windrow into a more solid crop stream can lead to design simplification, for example obviating the need for header augers in forage harvesters or other feed simplifications (FIGS. 30'(a) and 30'(b)).

The crop engaging elements shown in FIGS. 2', 3' and 4' are specifically useful for pick-up and conveying rotors where no specific conditioning effect is required, as well as for use in conditioning rotors where damage to the crop is required. The crop gathering and release chracteristics of these elements are such that pick-up rotors in particular can run at relatively low speed and, hence, use less power than brush type rotors.

FIGS. 4'(a) and 4'(b) are top and side views respectively of part of a crop engaging rotor 100' on which crop engaging elements as shown in FIG. 4' are mounted in alternate rows so that the fins are inclined in opposite directions to the transverse rotor axis 101'. Each element 24' extends outwardly along a direction indicated at 102', which may be perpendicular to the rotor axis 101'. The various angles of inclination discussed above are to be found correspondingly in the arrangement of FIGS. 4'(a) and 4'(b). It is to be appreciated that the width of the rotor shown is much less than that required for normal use. Suitably the rotor may be for example 2 m wide with crop engaging elements across the width at, for example, intervals of 15 cm.

FIGS. 5'(a) and 5'(b) show a crop engaging element 24' made of a strip of synthetic plastics sheeting material twisted at a region 7 so that one end lies at right angles to the other. Attachment to a mounting bar 34 on a rotor support 8 may be such that when the crop engaging element engages crop it either presents a narrow or wide face to the crop. The element of FIG. 5'(a) is shown in FIG. 5'(b) in rear view. FIG. 5'(c) shows a similar element which is twisted less so that its extreme ends lie at 45° to each other.

A specific advantage of the angled and twisted elements described in FIGS. 2' to 5' is that under excessive tip loads the elements tend to be deflected rearwardly and at an angle laterally.

In FIGS. 6'(a) and 6'(b) there are shown in diagrammatic side view two alternative forms of crop engaging element 10 which may be used. In both FIGS. 6'(a) and 6'(b), the element may be in the form of an outwardly directed fin 24', or may be in the form of an elongate transverse rib 23' (or indeed in a form between the two). Thus the cross-section shown is useful in both main forms of the crop engaging element described herein. Where the cross-section is thicker at the base region as in FIG. 6'(a), the tip 4 will bend away smoothly and easily under the influence of a load. This is of particular advantage in a pick-up rotor so that unwanted foreign objects on the field surface are readily passed over instead of being lifted with the crop. When the tip 4 is thicker as in FIG. 6'(b), its momentum and transverse rigidity will tend to be maintained under the influence of a load and it will tend to remain straight, any bending taking place mainly at the thinner base region 7. This is of advantage where heavy windrows need to be teased out effectively, yet an adequate response is necessary to heavy entrained objects. The conditioning elements of tapering cross-section in FIGS. 6'(a) and 6'(b) are fixedly secured to angle bars 34' by bolts 34A', the yielding of the elements 10 being provided by virtue of the resilience of the material of the element.

In FIGS. 7'(a) and 7'(b) there are shown side perspective and side views respectively of a crop engaging rotor indicated generally at 72', and having outwardly directed crop engaging elements 29' each comprising a transverse serrated rib 70' bolted by bolts 73' to an angle bar 71'. Each bolt 73' passes through a domed resilient washer 74' formed of synthetic platics material, which allows yielding of the rib 70' by a rocking motion against the angle bar 71', the washers 74' being deformed by the rocking motion. In this embodiment, the element 23' is yieldable preferentially in a preferred direction 6' which is aligned generally along the direction of crop flow, indicated at 5.

In the case of the embodiment shown in FIGS. 7'(a) and 7'(b) the principal plane 2 of each crop engaging element 70' is generally perpendicular to the general direction of crop flow 6, when the element 70' engages the crop at the top centre position indicated at 2'A.

In FIG. 8' there is shown a rear view of a crop conditioning apparatus, comprising two cooperating rotors 11' and 12', arranged generally as shown in FIG. 1'(c) or as shown in FIG. 29'(b) or FIG. 29'(c). Referring to FIG. 8', each rotor has transverse rib-like elements 23' mounted on a supporting core 8, and the elements 23' may be generally mounted as shown in FIGS. 7'(a) and 7'(b) or as in FIG. 9'. The two rotors 11' and 12' are rotated in counter rotation with the elements 23' of one rotor interleaving with the elements 23' of the other rotor, to achieve conditioning of crop generally as will be explained hereinafter with reference to FIG. 11'. Thus the lower rotor 11' is arranged to rotate in the manner known as the overshot mode, with the elements 23' moving at their lowest positions in the opposite direction to the direction of movement of the apparatus over the ground, so that crop is picked up from the ground, or from a cutter, and is carried upwardly and rearwardly over the rotor 11'. It is a feature of the arrangement shown in FIG. 8' that the rib-like elements 23' of the upper rotor 12' are plain transverse ribs e.g. formed of sheets of synthetic plastics material, and the rib-like elements 23' of the lower rotor 11' are similar but are shaped with deep serrations so as to form outwardly directed spikes.

In FIG. 9' there is shown in side view details of and attachment for the rib 70'. The rib 70' may be fixedly secured or additional resilience is achieved if the hole through the rib 70' for the bolt 73' is slightly larger than the diameter of the bolt and a coil spring washer 74' is inserted between the trailing face of the rib 70' and a self-locking nut 75', as shown in FIG. 9'. The extent of tightening of the nut 75' determines the resistance of the rib to deflection. FIG. 10' shows diagrammatically how two rotors as shown in FIG. 7', or one rotor and a stationary serrated crop retarding plate as shown in FIG. 1(b)', can be made to inter-mesh to achieve conditioning of crop.

There will now be described a series of applications of the conditioning elements shown in the preceding figures, and of other crop conveying and conditioning arrangements embodying the invention.

Referring firstly to FIG. 11' there is shown a crop pick-up and conditioning apparatus comprising a first rotor 11' and second rotor 12', both mounted on a mobile main frame (not shown) for movement over the ground 13' to pick-up and condition previously cut crop shown at 14'. A hood 15 extends around the second rotor 12', and rearwardly at 16 over the first rotor 11'. A forwardly projecting portion 17' of the hood 15' is adjustable or self-adjusting at the lower end as shown so as to be positioned in close proximity to the cut crop 14'. An optional, height adjustable ground roller 18' is positioned immediately behind the first rotor 11'.

The first and second rotors 11' and 12' are mounted for counter rotation about parallel horizontal axes for passage of crop between the two rotors. The first rotor 11' is a crop conditioning rotor comprising a brush-like structure having a multiplicity of stiff resilient outwardly directed conditioning elements indicated generally at 19' for conditioning crop by relative movement between the conditioning elements and the crop and by a spiking action in the overlap zone between the two rotors. The conditioning elements 19' are arranged in a series of elongate formations 20' comprising spaced apart rows, the rows being transverse rows generally along the direction of the axis of the rotor. Conveniently the first rotor 11' may consist of a conditioning device of the type specified hereinbefore, conveniently a brush conditioning rotor of the kind described, and shown by way of explanation in FIGS. 12' to 15'. In FIGS. 12' and 13' the conditioning elements 19' are in the form of tufts of brush elements 108', the tufts being spaced apart along the rows. The tufts are conveniently formed of double-over lengths of synthetic plastics rod material secured by bolts 107' in flexible supporting sleeves 106'. In comparison with the brush conditioning rotors described in our previous pending application, it is preferred that there is a greater density of brush tufts across the width of the rotor, ideally the elongate formations 20' comprising virtually continuous rows of plastic rods or spikes, with distinct gaps between the tuft rows around the circumference.

Referring again to FIG. 11', the second rotor 12' comprises a feeding rotor having a plurality of outwardly directed crop engaging elements also arranged in a formation of spaced apart, transverse, elongate formations 20' generally extending in the direction of the axis of the rotor. Each elongate formation of the feeding rotor 12' is indicated at 20' and may be formed for example by a single rib-like element of stiff material which either has a degree of resilience itself or is fitted to mounting means so that the outer edge can deflect circumferentially under atypical loads imposed by crop or foreign objects. Each elongate formation 20' on the feeding rotor 12' may either be formed by a single crop engaging element consisting of a single rib formed of a flat stiff resilient synthetic plastics material (for example a sheet of material) extending across the length of the rotor, or may be formed by a row of outwardly directed fins, also conveniently of stiff resilient synthetic plastics material. In the following description it will be assumed that the elongate formations 20' on the feed rotor 12' comprise transverse rib like elements 23', and the elongate formations 20 on the conditioning rotor comprise rows of brush-like elements 19'.

The two rotors 11' and 12' are driven in synchronism by drive means (not shown) conveniently driven from the pto of a tractor, and are arranged to rotate with the outer perimeters of the rotors overlapping and with regular inter-meshing of the rows of each rotor with the rows of the other. Thus the rib or sheet crop engaging elements 23' overlap the envelope of the brush tufts 19' and are synchronised with the rows 20' of brush tufts so as to intrude into the gaps between the rows 20' of brush tufts in such a manner that the crop engaging elements 23' press the crop into the gaps between the rows 20' of brush tufts 19' so that the crop is laid across the abrading and spiking tips of the conditioning elements 19' to produce particularly effective conditioning of the crop. Both rotors are driven at identical speed, and the synchronisation can be varied so that the elongate formations 20' on the feeding rotor intrude into the crop stream immediately behind, centrally, or in front of, the corresponding rows 20' of brush tufts 19' on the conditioning rotor 11'. P The effect derived consists of stuffing or packing by the rib-like elements 23' of the feeding rotor 12' which press the crop downwardly into and onto the conditioning elements 19' of the conditioning rotor 11', thus causing a more thorough conditioning treatment. In some circumstances such a packing action requires an increase in speed of both rotors above the normal threshold speed of the brush rotor to ensure stripping of crop, compared with conditioning without the packing action. In the arrangement of FIG. 11', the packing action is a peripheral packing action in which the plastics elements 23' on the feeding rotor urge the crop against the brush conditioning elements 19' by pressing the crop into the gaps between the rows so that it is laid across the ends of the brush tufts generally in the direction of crop flow. The rotors are rotated at a speed several times greater than the speed of movement of the conditioning rotor over the ground so that the conditioning action is one of abrasion and scraping across the crop surfaces by the brush tufts during acceleration of the crop by the rotors. To this conditioning treatment is added a spiking treatment in the overlapping zone between the two rotors.

In some operating conditions the crop spiking effect of the brush rotor is enhanced if the packing rotor is made up of ribs having straight leading edges. In place of a brush type lower rotor, types of rotor as shown in FIGS. 4' and 7' may be used, the former particularly when the conditioner is fitted directly onto a mower.

By making provision to move rotor 12' further away from the centre of rotor 11', the conditioning effect can be moderated. At a spacing when there is no longer an overlap between the two rotors, the need to drive both rotors in synchronisation no longer exists. If a difference in circumferential speed is introduced by changing the drive ratio, the crop passing between the rotors is subjected to a more severe scrubbing action. This effect has been found to be particularly pronounced when the peripheral speed of feeding rotor 12' is less than that of pick-up rotor 11'.

With both rotors set apart a further variation is to drive feed rotor 12' in the same direction of rotation as the pick-up rotor 11'. When both rotors co-rotate, a particularly severe and effective form of conditioning is achieved. It is most probably due to the crop, after its first acceleration by rotor 11', being thrown into the path of secondary rotor 12'; this decelerates and immediately re-accelerates the herbage material, forcing it into a new path defined by the front housing 15'. It is these speed and directional changes which cause the surface damage to the crop. By spacing the rotors even further apart, so that a substantial gap is created between them, a proportion of the crop can be allowed to pass straight through without being re-directed by the secondary rotor 12'. It is a particular advantage that crop permitted to pass through the gap originates in the lower swath region and has been exposed most to the conditioning effect of the pick-up rotor during the first acceleration.

Returning now to consideration of the overall arrangement shown in FIG. 11', the arrangement of the hood portion 17', and roller 18', together with the overall configuration, gives rise to a suction effect upwardly behind the front baffle 17' between the baffle and the primary upwardly rotating rotor 11'. To achieve this, the baffle 17' is arranged to be a pivoted, height variable baffle at the front of the machine, and an optional sealing brush 17A' may be provided between the hood 15' and the secondary rotor 12'. The effect of these two, together with the ground roller 18', is to at least partially seal the routes of normal air ingress and thus to reduce air pressure above the crop at the front, so as to assist the lifting.

FIG. 14' shows in side view a modification of the arrangement of FIG. 11', in which the feeding rotor 12' comprises a plain cylindrical rotor, for example, of steel or plastics material, which holds the crop against the conditioning rotor 11', and also slows the crop flow. The rotor 12' may be freely rotating or braked or driven at a different speed and/or in a different direction from the conditioning rotor 11'. Essentially such a feed rotor 12' is a non-clogging rotary device for holding the crop in contact with the spike tips of the conditioning rotor 12' and for retarding the crop flow. FIG. 15' shows a diagrammatic view along the arrow A in FIG. 14'.

FIG. 16 shows a modification of the arrangement of FIG. 11 in which the feeding rotor 12' has a number of transverse ribs 23' or rows 20' of fins 24', and is rotated at a speed of rotation such that two ribs 23' or rows 20' of fins enter each gap between succeeding rows 20' of brush tufts 19' during the synchronised rotation. Pairs of ribs 23' or rows of fins 24' straddle a row of conditioning tufts 19' and press the crop particularly effectively against the tufts at their leading and trailing edges in rapid succession.

FIGS. 17'(a), 17'(b) and 17'(c) show a major modification of the arrangements shown in the preceding Figures, in that the elongate formations 20' of the rotor elements on one rotor 12' are circumferential formations formed generally in planes transverse to the direction of the axes of the rotors, instead of lateral formations as have been described in the previous Figures. In FIGS. 17'(a), (b) and (c) elements corresponding to elements shown in preceding Figures are indicated by like reference numerals. Referring firstly to FIG. 17'a, the apparatus comprises a first, conditioning, rotor 11' and a second, feeding, rotor 12', the rotors being positioned in similar relationship to that shown in FIG. 11', with the feeding rotor 12' positioned at a higher level than the conditioning rotor 11' and by way of example forwardly of the conditioning rotor. The feeding rotor 12' comprises a plurality of discs 21' spaced apart along the axis of the rotor and orientated generally perpendicular to the axis of the rotor 12'. The outer perimeter of each disc 21' is notched or serrated.

The spaced discs 21' on the rotor 12' are also shown in FIG. 17'(b) which is a diagrammatic perspective view along the direction of the arrow A in FIG. 11'. Conveniently the discs 21' are cut from synthetic plastics sheet material and are secured along a tubular drum-like core 22' of the rotor 12'.

As shown in FIG. 17'(b), the conditioning rotor 11' is formed of a series of right-angle bars 34' extending parallel to the axis of the rotor 11' and spaced angularly round the rotor. Each angle bar 24' carries a number of conditioning elements 24' each of which consists of a short elongate outwardly directed conditioning element generally in the shape of a fin and having a pointed outer end. Each conditioning element 24' can conveniently be cut from synthetic plastics sheet material or can be moulded, and is arranged with the width of the elongate fin generally transverse to the direction of crop flow. A main modification of the embodiment of FIGS. 17'(a) and 17'(b) over that of FIG. 11' is that the conditioning elements 24' on the rotor 11' are arranged in a formation of spaced apart circumferential rows indicated diagrammatically by broken lines 25'. It will be seen that in the embodiment of FIG. 17'(b), the spaced apart rows 25' form part of a helix of conditioning elements 24' which winds around the conditioning rotor 11', with appropriate lateral gaps for the discs 21' to register. However in other embodiments the conditioning elements 24' may be arranged in discrete spaced apart rows each of which follows the path of a circle around the axis of the rotor 11' so that the plane of the row of conditioning elements 24' is generally perpendicular to the axis of the rotor 11'. In FIG. 17'(c) there is shown a diagrammatic development of the envelope of the rotor 11 showing how the conditioning devices 24' intrude into the spaces between the discs 21' on the rotor 12' at progressively displaced positions between adjacent discs.

It is to be understood that the feed rotor 12' can be placed into other positions relative to pick-up rotor 11'. For example it may be fitted in the 12 o'clock, or top-dead-centre position, or in the 1, 2 or 3 o'clock positions.

It is a particular feature of the present invention, in its broadest aspect, that the crop engaging rotor 12' shown in FIG. 17'(a), may find use in other applications in addition to the twin rotor conditioner shown in that Figure. For example the crop engaging rotor 12' may be used as a pick-up rotor for collecting cut crop lying on the ground, and alternatively, or in addition, may be used as a crop conditioning rotor operating without any further co-operating conditioning rotor. For example the rotor 12 may be positioned in close proximity to the ground for picking up cut crop lying on the ground, and the rotor may be covered by a hood means providing a channel for crop to be carried up and over the rotor 12 and deposited back on the ground for drying. In such circumstances the crop may be conditioned by relative movement between the rotor 12' and the crop during acceleration of the crop when engaged by the rotor. To impede the acceleration and free flow of crop engaged by the rotor, and so increase the conditioning effect, stationary crop engaging elements may be fitted transversely underneath the hood means.

Returning now to consideration of the embodiment shown in FIG. 17'(a), the discs 21' are inter-digitated with the conditioning elements 24' along the axis of the rotor, so that the discs 21' press the crop against the conditioning elements 24' by a lateral packing action at intervals across the conditioning rotor, in contrast to the peripheral packing action of the embodiment of FIG. 1.' In the embodiment of FIG. 17'(a), the feed rotor 12' need not be driven at all, may be fitted with a simple braking device, or can be a driven rotor which is driven faster or slower than the conditioning rotor 11' or in the opposite direction to it. The disc spacing on the feed roller 12' can be narrower to match alternative patterns of elements on the conditioning rotor. Across the width of the rotor, the disc spacing can be varied at different positions, for example the discs 21' can be closer in areas of consistently heavy crop flow. For example, where a rotor is positioned across a series of pairs of counter rotating disc cutters, crop flow will be heavier where counter rotating discs draw the cut crop together, and here the discs 21' may be positioned closer together. Thus the disc spacing on the feed rotor 12' may have a direct relationship to the volume of crop flowing in specific areas across the width of the rotor.

In other arrangements, for example as described with reference to FIGS. 14' and 15' to eliminate the lateral intermittency of the discs 21', feed rotor 12' can be constructed in the form of a full-width roller, for example of continuous cylindrical surface, for forcing and holding cut crop against a closely adjacent conditioning rotor.

FIG. 18' shows a modification of the embodiment of FIG. 17'(a), in which the pick-up rotor 11' is made up of a series of spaced-apart discs and the fin form crop conditioning elements 24' are replaced by brush tufts 19' of the kind described with regard to FIG. 11' and attached to alternate sides of individual discs 19'. The discs 21' of the feeding rotor 12' are shaped by way of example with octagonal perimeters in place of the serrated perimeters shown in FIG. 17'(a).

In FIGS. 19'(a) and 19'(b) there is shown a further modification of the embodiment shown in FIG. 18 in which the secondary rotor 12' is positioned to the rear of the pick-up and conditioning rotor 11', and is shown as being rotated in the same sense as the conditioning rotor 11'. The effect is that the secondary rotor 12' strips the crop positively off the conditioning/pick-up rotor so that no stray material is driven downwardly into the stubble. FIG. 19'(a) is a diagrammatic side view of the apparatus, and FIG. 19'(b) shows a diagrammatic view from the front of the apparatus in the direction of the arrow A.

FIGS. 20'(a) and 20'(b) show a modification of the preceding embodiment in which a co-rotating secondary stripping rotor 12' interdigitates with pointed-fin shaped crop engaging elements arranged in transverse rows on the conditioning/pick-up rotor 11'. The rotor 12' comprises a series of discs 21' spaced apart along the length of the axis of the rotor, and each disc has its periphery shaped with a series of lobes 26'.

In FIG. 21' there is shown a further modification in which the principles of packing or feeding crop into a conditioning rotor by a feed rotor is achieved by a pair of co-operating rotors having identical construction. FIG. 21' merely shows a detail of two such rotors, but illustrates the principle involved. In FIG. 21' a series of conditioning elements 10' combine aspects of both the fin-form elements 24' and rib-form element 23' previously described. The combined form elements are referred to as elements 130' and are formed by cutting a castellated and optionally serrated shape from a sheet of thick stiff material 131', which is mounted in a channel section 132' forming part of a first rotor on the apparatus. The channel 132' forms one of a series of angularly spaced bars corresponding to bars in other embodiments indicated at 34' positioned parallel to the axis of the rotor in the form of a squirrel cage. A series of conditioning elements 133' of similar construction formed from a sheet of material 134' are mounted on a second rotor in similar manner to the first, the two rotors being positioned so that the conditioning elements 133' and 130' inter-digitate along the transverse length of the rotors, and are in register where the sheets approach each other during rotation in synchronism of the two rotors. It will be appreciated that two such rotors achieve both lateral and peripheral packing of the crop between the rotors by the effect of the sheets 131' and 134', and by the effect of the castellated conditioning elements 130' and 133' along the length of the sheets. It will be further appreciated that individual castellations need not be parallel sided laterally but can be tapered, that is converging from a broad base towards a narrower distal edge.

The crop engaging element of FIG. 21' is also illustrated in cross-section in FIG. 21'(a). In both figures the radial springs 135' and sliding provision for the transverse ribs can be seen. If an excessive amount of crop or a foreign object becomes entrapped between opposing ribs, either or both may move momentarily towards the rotor centre by virtue of slots 138' in the ribs, to allow passage of the obstruction without damage to the rotor. Set bolt 137' passing through a collar 136', which is slightly longer than the thickness of the rib material, can be tightened in different positions within slots 139' in the channel 132'. This determines the working clearance between pairs of opposing ribs and the amount of rib deflection possible. Radial adjustment of the set bolt is an optional feature, as is the accurate phasing of opposing ribs. If the ribs are not castellated but parallel sided with serrated distal edge, and the two rotors are driven so that the ribs thereof are out of phase to a variable degree with a substantial radial overlap, then the crop stream is subjected to treatment by abrasion, splitting, spiking and bending.

It is to be appreciated that many variations of the arrangement shown in FIG. 21' are available, for example there may be different numbers of sheet constructions 131' and 134' on the two rotors, or the same number on the two rotors. Recesses for the crop engaging elements may be formed by means other than a parallel-sided channel section, and the coil springs shown may be replaced by leaf or band springs or by non-metallic resilient elements or known damping means. The crop engaging element of FIGS. 21' and 21'a is equally suitable for use as a pick-up rotor and a crop conditioning rotor.

One variation of the embodiment of FIGS. 21' and 21'(a) is shown in FIG. 21'(b). Here a rib-like crop engaging element 200' extends transversely across the principal direction of crop flow 5, the rib-like element being shown diagrammatically in cross-section in FIG. 21'(b). The base of the element 200' has a series of triangular fins 201' set across the rib 200' at right angles thereto, and the base region of the rib 200' and the fins 201' are mounted in a housing 203' having sloping side walls matching the edges of the fins 201'. The rib-like element 200' is maintained in an outward position by a resilient bias means 202' consisting of a hollow tube of rubber or other elastomeric material which is deformed by inward movement of the base of the element 200'. The rubber tube 202' may run along the length of the housing 203'. The effect of the cooperation between the sloping walls of the housing 203' and the fins 201' is two fold. First, the fins 201' centre the rib 200' in a required outward direction. Second, if the rib 200' strikes an object likely to cause damage, the rib 200' can deflect inwards against the action of the bias means 202', and in addition can tilt in or against the direction of crop flow.

The embodiments of both FIGS. 21', 21'(a) and 21'(b) are shown only diagrammatically, and in practice there will normally be made provision for substantially greater amounts of radial deflection than shown in the drawings.

In FIG. 22' a rotor 11', referred to particularly in this and following embodiments as rotor 40' with individual crop engaging elements 41' is shown lifting a crop and delivering it into an auger feed mechanism 42' as used on forage harvesters and some balers. An advantage of a pick-up rotor of this kind is that the crop engaging elements can be so spaced on their mounting means that all the ground beneath the rotor is swept at least once per rotor rotation, and the high peripheral speed thins out and evens out the crop windrow. The interface between the rotor 40' and subsequent processing machinery 42' is very important. It is particularly advantageous to guide the crop so that it meets the auger 42' from the front-dead-centre position downwards, and this can be achieved by crop guide bars shown in broken outline at 46'a. In front of the auger a funnel is created between the auger flights 43' and the auger trough 44' for the crop to enter readily. The leading edge of the auger trough 44' is formed by a roller 45' which may be driven to avoid crop accumulations. A vertical gap between the rotor cover 46' and auger cover 47' allows the operator to see whether or not the feed mechanism is functioning correctly.

FIG. 23' shows a modified form of the apparatus of FIG. 16'. In FIG. 23' the feed roller 45' at the leading edge of the auger trough 44' is considerably larger in diameter and, by being octagonal in cross-section, is more positive as a crop conveying device. At the same time it acts as a stripping means for the pick-up rotor 40'. An alternative cross-section of an intermediate rotor 45' is shown in FIG. 23'a. The four flexible paddles secured in the manner shown in FIG. 23a to a central square section shaft 49' also give positive stripping and conveying, but afford a degree of flexibility if uneven feeding should occur or an unwanted solid object be encountered. FIG. 24' shows the arrangement of FIG. 23' in plan view.

As previously stated the advantages of angling the crop engaging portions of individual elements relative to the transverse rotor axis are that when used on pick-up rotors the elements can be used to concentrate the crop stream, or to tease out laterally the crop stream, depending upon the sense of inclination of the elements. In FIG. 25' an arrangement is shown from the front in which the elements attached to a rotor 40' are angled in opposite directions in each half of the rotor. If a heap-shaped windrow is picked up centrally by this rotor, then the orientation of the elements will cause a lateral teasing out effect to be obtained. This effect can be further enhanced by fitting guide vanes 50' to the underside of the front and top section of the rotor cover 46' in the manner indicated in the rear view of FIG. 19(b)'. The overall effect of these measures individually or in combination is improved transverse distribution of the crop between the intake at the lower front position and the exit from the rotor hoursing. This has the advantage that, should it be desired to spray chemicals such as hay preservatives onto the crop at harvesting, for example by spray nozzles 51', a more uniform distribution is achieved.

Another advantage of angling the crop engaging elements relative to the transverse rotor axis is illustrated in FIG. 26', in side view only. If the elements are angled in the opposite directions to those shown in FIG. 25', then crop, even if it lies scattered in the field, will be conveyed towards the centre of the rotor 40' as it pases through the pick-up unit. As a result the crop can be fed into a longitudinal auger such as 52' or other type of conveyor positioned centrally behind the pick-up unit. Guide vanes in the form of a V or open V, this time with the apex trailing, will also enhance the gathering effect.

If it is desired to first spread the crop for mixing additives therewith, and then to convey it into a harvesting machine, an arrangement such as shown in FIG. 27' may be used. FIG. 27' shows a side view of a combination of pick-up rotor 40' and auger 52'. With the angles of the crop engaging elements 41' set to spread crop, the crop is picked up spread outwardly by the pick up rotor 40'. Behind the pick-up rotor 40', the crop is gathered and moved inwardly, into the path of a central longitudinal conveying auger or other type of conveyor 52', by a subsidiary transverse collecting auger or augers 53'.

Reference will now be made to FIGS. 28' and 29', which show various configurations of rotors and crop engaging elements which find application in many of the embodiments described hereinbefore.

FIGS. 29'(a) to 29'(d) show diagrammatically a summary of the modes of operation which are possible with counter-rotating twin-rotor crop conditioning systems. In each case two rotors 11' and 12' carry crop engaging elements 10. Conveniently the crop engaging elements may be ribs, or fins, or any other of the crop engaging elements which have been described hereinbefore. For convenience, the case will be described where the crop engaging elements 10 are ribs. In FIG. 29'(a) the ribs 10 are shown to be perfectly aligned along the axis common to both rotors 11' and 12'. The effect on crop trapped between two opposing ribs is that it is compressed and consequently bruised. In FIG. 29'(b) the two rotors are slightly out of phase. If the ribs are parallel sided, then the crop will be sharply bent, stretched and scratched. In FIG. 29'(c) the ribs on one rotor intermesh centrally between pairs of ribs of the other. Treatment will be more gentle than that described in FIGS. 29'(a) and 29'(b) above. The essential feature of FIG. 29'(d) is that the ribs or other conditioning elements are reclined at their tips in the direction of rotation, and this may have advantages, particularly vis a vis FIG. 29'(a) in respect of the severity of crop treatment and the possibility of foreign objects becoming trapped between opposing ribs; entrapped crop or objects are more likely to cause angular deflection of the ribs or elements.

FIG. 28' shows a development of a configuration of crop engaging elements 10' on support bars 34' of a rotor 11'. Suitable crop engaging elements to constitute the elements 10 would be twisted crop engaging fins such as are shown, for example, in the previous FIGS. 2' to 5'. The effect of the layout of FIG. 30' is either to gather or to spread out crop, depending upon the sense of rotation of the rotor.

Referring now to FIGS. 30'(a) and 30'(b) there is shown an arrangement of a crop gathering pick-up rotor generally of the kind which has been described in FIGS. 22' to 27'. In FIGS. 30'(a) and 30'(b) a pick-up rotor 40 collects crop from the ground and passes it to a belt conveyor 42" which takes the place of the auger 42' in the previous arrangements. The belt conveyor 42" then passes the crop to a chopping mechanism 52". A major advantage of the crop gathering pick-up rotor of FIGS. 30'(a) and (b) is that the conventional transverse auger mechanism can be completely omitted, which results in design simplification and consequent cost saving, in that it is a system highly suited to forage harvesters and balers.

Returning now to consideration of general aspects of the present invention, reference has been made to both ribs and fins, as suitable forms of crop engaging elements. However it is to be appreciated that crop engaging elements may also be provided in accordance with some aspects of the invention, in which the width of the element is equal to the length. In some aspects, the distinction between crop engaging elements of a rib like nature and crop engaging elements of a fin like nature, may lie in that the former may be regarded as transversely or circumferentially continuous, whereas the latter may be regarded as being intermittent outwardly extending elements.

With regard to dimensions and other data which may be adopted in constructing embodiments of the present invention, as a general rule the data given in our copending British Patent Application No. 8012426 relating to rotor diameters, tip and peripheral speeds, clearances and extent of overlap, and so on, are appropriate also to the rotors which have been described in the present specification. Suitable materials for the crop engaging elements are, for example, polyethylene, nylon, and polypropylene. Depending on the various applications illustrated in the Figures, rotor diameters may vary from approximately 0.3 to 1.0 m diameter, the preferred range being 0.4 to 0.6 m diameter. Tip speeds of the crop engaging elements may vary within the approximate range of 3 to 30 m/s, mainly 10 to 23 m/s.

I claim:

1. Apparatus for treating crop comprising
   two cooperating rotors mounted for counter rotation about parallel axes for passage of crop between the rotors,
   at least one rotor comprising a crop treating rotor having a plurality of stiff, resilient, outwardly directed crop engaging elements having sharp tips on the outer ends thereof for treating crop, and the other rotor having a plurality of stiff, resilient, outwardly directed crop engaging elements,
   the arrangement being such that in operation the rotors rotate with the outer perimeters of the rotors overlapping and with regular inter-meshing of crop engaging elements on one rotor with crop engaging elements on the other rotor in such a manner that the crop engaging elements of the said other rotor tend to press crop into gaps between the crop treating elements on the said one rotor which has the sharp tips so that the crop is laid across the outer ends of the elements on the said one rotor for treating the crop at least predominantly by a spiking action.

2. Apparatus according to claim 1 in which at least one of said two rotors comprises a brush-like structure having a multiplicity of stiff, resilient, elongate conditioning elements for conditioning the crop by an action consisting predominantly of surface damage to the crop, the elements being yieldable in response to engagement with the crop, and being yieldable at least predominantly by bending of the elements along at least part of the crop engaging portions of the lengths thereof, and the elements being sufficiently stiff to return to their undeflected dispositions when free from engagement with crop at least predominantly by virtue of the stiffness of the elements.

3. Apparatus according to claim 1 in which the conditioning elements are arranged in rows transverse to the direction of crop movement between the rotors, and in which the rotors are arranged to be rotated in operation with transverse rows of elements on one rotor intermeshing into transverse gaps on the other rotor.

4. Apparatus according to claim 2 in which the said conditioning elements are yieldable by bending substantially along the whole of the free lengths thereof.

5. Apparatus according to claim 2 in which the said conditioning elements are arranged in spaced-apart tufts of elements.

6. Apparatus according to claim 5 in which each tuft is formed of one or more lengths of material doubled over and secured to a supporting base in the region of the fold of the doubled over length or lengths.

7. Apparatus according to claim 2 in which each element or group of elements in a tuft, is supported and protected at the base thereof by a sleeve of resilient material.

8. Apparatus according to claim 2 in which the maximum cross-sectional dimension of an element is in the range 1 mm to 20 mm.

9. Apparatus according to claim 2 in which the said elements are formed of synthetic plastics material.

10. Apparatus according to claim 1 in which the crop engaging elements of each rotor are arranged in elongate formations which traverse the general direction of crop flow, the arrangement being such that in operation the rotors rotate with the outer perimeters of the rotors overlapping and with regular inter-meshing of one or more of the elongate formations of each rotor with one or more elongate formations of the other in such a manner that the crop engaging elements of one rotor press crop into gaps between the elongate formations on the other rotor.

11. Apparatus according to claim 10 in which on at least one rotor each element comprises a rib-like element extending transversely across the direction of crop flow to a greater extent than it extends outwardly from the axis of rotation of the rotor, the said rib-like elements constituting the said elongate formations.

12. A device according to claim 11 in which each rib-like element is secured to the support means by a coupling member which allows movement between the element and the support means, there being provided resilient biassing means which biasses the element towards an outwardly extending operating position, the arrangement allowing yielding of the element by rocking or pivotting movement of the element relative to the support means against the action of the biassing means.

13. A device according to claim 12 in which the element is a generally flat element and is secured to a cooperating flat surface of the support means by the said coupling member which passes through the element, the said resilient biassing means acting to bias the element towards the flat surface and the element being yieldable by a rocking motion away from the flat surface against the effect of the biassing means.

14. Apparatus according to claim 11 in which each rib-like element extends along the direction of the rotor axis and lies substantially in a radial plane, and in which each rib-like member is yieldable inwardly towards the rotor axis upon encountering an object likely to damage the element, or an excessive crop load, and is urged outwardly by bias means to a normal operating position.

15. A device according to claim 14 in which each rib-like element has at its base a widened portion having sloping sides, the base of the rib-like element being captive in a housing which cooperates with the said sloping sides of the rib-like element to centre the rib-like element to a required outwardly directed operating position while allowing the rib-like element to tilt when moved inwardly against the bias means.

16. Apparatus according to claim 11 in which each rib-like element is formed from thick, stiff, resilient, and generally flat, sheet like material.

17. Apparatus according to claim 11 in which each element is formed from synthetic plastics material.

18. A device according to claim 10 in which each element comprises a fin-like element extending outwardly from the support means to a greater extent than it extends transversely across the direction of crop flow, each fin having a principal plane which traverses the general direction of crop flow, the fin-like elements being arranged in rows constituting the said elongate formations.

19. A device according to claim 18 in which each element is mounted in and secured to a flexible sleeve, the sleeve being fixedly secured to the support means and being arranged to allow yielding of the element by flexing of the sleeve.

20. Apparatus accordance to claim 1 in which on at least one rotor each crop engaging element has a principal plane which traverses the general direction of crop flow, each crop engaging element being arranged to be yieldable preferentially in a selected preferred direction relative to the general direction of crop flow, the said preferred direction of yielding including at least a component along the direction of principal load on the element due to the crop flow, each crop engaging element being yieldable at least predominantly by yielding movement at a region spaced from the distal, crop-engaging, region of the element, and the yielding arrangement having sufficient stiffness for the elements to be capable of returning after yielding to their undeflected dispositions at least predominantly by virtue of the resilience of the yielding arrangement.

21. Apparatus according to claim 1 in which the crop engaging elements of each rotor are arranged in elongate circumferential formations which are generally transverse to the axis of rotation of the rotor, the arrangement being such that in operation the rotors rotate with the outer perimeters of the rotors overlapping and with regular inter-meshing along the axis of the rotor of one or more of the elongate formations of each rotor with one or more elongate formations of the other in such a manner that the crop engaging elements of one rotor press crop into gaps between the elongate formations on the other rotor.

22. Apparatus according to claim 21 in which on at least one rotor crop engaging elements comprise disc-like elements positioned generally transverse to the axis of rotation of the rotor and spaced apart along the length of the rotor, the said disc-like elements constituting the said elongate circumferential formations.

23. Apparatus according to claim 1 in which both of the rotors have sharp outwardly directed tips on the outer ends of the crop engaging elements thereof.

24. Apparatus for treating crop comprising
two cooperating rotors mounted for counter rotation about parallel axes for passage of crop between the rotors,
one of said rotors comprising a crop treating rotor having a plurality of stiff, resilient, outwardly directed crop engaging elements having sharp tips on the outer ends thereof for treating crop, the tips being arranged in rows transverse to the general direction of crop flow,
the other of said rotors having a plurality of stiff, resilient, outwardly directed crop engaging elements, each said element comprising a rib-like element extending transversely across the direction of crop flow to a greater extent that it extends outwardly from the axis of rotation of the rotor,
the arrangement being such that in operation the rotors rotate with the outer perimeters of the rotors overlapping and with regular inter-meshing of the rows of tips of the crop engaging elements on the said one rotor with the rib-like crop engaging elements on the said other rotor in such a manner that the rib-like elements of the said other rotor tend to press crop into gaps between the rows of sharp tips of the crop treating elements on the said one rotor so that the crop is laid across the outer ends of the elements on the said one rotor for treating the crop at least predominantly by a spiking action.

25. Apparatus for conditioning crop comprising two rotors positioned opposite each other and mounted for counter rotation about parallel axes for passage of crop between the rotors, each rotor having a plurality of outwardly extending crop engaging elements,
- at least one rotor comprising a plurality of disc-like elements, constituting the crop engaging elements of that rotor, positioned generally transverse to the axis of rotation of the rotor and spaced apart along the length of the rotor, and a central core of the rotor on which the disc-like elements are mounted and which is of sufficient size to prevent significant wrapping of crop around the core,
- the other of the two rotors being a brush-like structure having a multiplicity of stiff, resilient, elongate conditioning elements for conditioning the crop by an action comprising predominantly of surface damage to the crop, the elements being yieldable in response to engagement with the crop, and being yieldable at least predominantly by bending of the elements along at least part of the crop engaging portions of the lengths thereof, and the elements being sufficiently stiff to return to their undeflected dispositions when free from engagement with crop at least predominantly by virtue of the stiffness of the elements,
- the rotors being positioned sufficiently closely for one of the rotors to press crop against the other to effect treatment of the crop.

26. Apparatus for conditioning crop comprising
a housing,
- two cooperating rotors positioned opposite each other and mounted for counter rotation about parallel axes for passage of crop between the rotors, each rotor having a plurality of stiff, resilient, outwardly extending crop engaging elements, said housing and said rotors defining a crop flow passage leading between the rotors, and
- drive means for driving the rotors in counter rotation so as to convey crop along the passage between the rotors,
- at least one rotor comprising a plurality of disc-like elements, constituting the crop engaging elements of that rotor, positioned generally transverse to the axis of rotation of the rotor and spaced apart along the length of the rotor, and a central core of the rotor on which the disc-like elements are mounted and which is of sufficient size to prevent significant wrapping of crop around the core,
- the other of said rotors comprising a crop treating rotor in which the plurality of stiff, resilient, outwardly directed crop engaging elements has sharp tips on the outer ends thereof for treating crop,
- the arrangement being such that in operation the rotors rotate with the outer perimeters of the rotors overlapping and with regular inter-meshing of crop engaging elements on one rotor with crop engaging elements on the other rotor in such a manner that the crop engaging elements of the said rotor tend to press crop into gaps between the crop treating elements on the said one rotor which has the sharp tips so that the crop is laid across the outer ends of the elements on the said one rotor for treating the crop at least predominantly by a spiking action.

27. Apparatus according to claim 26 in which each element on the said other rotor comprises a fin-like element extending outwardly to a greater extend than it extends transversely across the direction of crop flow.

28. Apparatus according to claim 26 in which the crop engaging elements on the said other rotor are arranged in one or more helical or part helical formations leading around and along the rotor.

29. Apparatus according to claim 26 in which each disc-like element is serrated or otherwise shaped to assist engagement of crop by the disc-like member.

30. Apparatus according to claim 26 in which the disc-like elements are positioned substantially perpendicular to the axis of the rotor, and the rotors are positioned sufficiently closely for the outer perimeters of the rotors to overlap with disc-like elements on one rotor intruding into gaps between crop engaging elements on the other rotor.

31. Apparatus according to claim 26 in which each disc-like element is formed from thick, stiff, resilient, and generally flat, sheet like material.

32. Apparatus according to claim 26 in which each element is formed from synthetic plastics material.

33. Apparatus according to claim 26 in which the spacing between adjacent disc-like elements varies across the width of the rotor, the disc-like elements being closer together at regions of the apparatus at which in operation the volume of crop flow is greatest.

34. A method treating crop comprising the steps of passing crop between two cooperating rotors mounted for counter rotation about parallel axes, at least one rotor comprising a crop treating rotor having a plurality of stiff, resilient, outwardly directed crop engaging elements having sharp tips on the outer ends thereof for treating crop, and the other rotor having a plurality of stiff, resilient, outwardly directed crop engaging elements, rotating the rotors with the outer perimeters of the rotors overlapping and with regular inter-meshing of crop engaging elements on one rotor with crop engaging elements on the other rotor, and utilising the crop engaging elements on the said other rotor to press crop into gaps between the crop engaging elements on the said one rotor which has the sharp tips, so that the crop is laid across the outer ends of the elements on the said one rotor for treating the crop at least predominantly by a spiking action.

35. A method of conditioning crop comprising the steps of
- passing crop between two rotors one of which comprises a brush like structure having a multiplicity of stiff, resilient, elongate conditioning elements, which are yieldable in response to engagement with the crop, and are yieldable at least predominantly by bending of the elements along at least part of the crop engaging portions of the lengths thereof, the elements being sufficiently stiff to return to their undeflected dispositions when free from engagement with crop at least predominantly by virtue of the stiffness of the elements,
- rotating the rotors in contra rotation with the same peripheral speed, and
- conditioning the crop by the elements of the said one rotor predominantly by a spiking action in which the other rotor forces crop onto the tips of the stiff conditioning elements of the said one rotor.

* * * * *